United States Patent
Ogasahara

(10) Patent No.: US 12,442,568 B2
(45) Date of Patent: Oct. 14, 2025

(54) MAGNETIC REFRIGERATOR WITH A PLURALITY OF MAGNETO-THERMAL CONTAINERS

(71) Applicant: Mitsubishi Electric Corporation, Tokyo (JP)

(72) Inventor: Atsushi Ogasahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/863,642

(22) PCT Filed: May 18, 2022

(86) PCT No.: PCT/JP2022/020681
§ 371 (c)(1),
(2) Date: Nov. 7, 2024

(87) PCT Pub. No.: WO2023/223462
PCT Pub. Date: Nov. 23, 2023

(65) Prior Publication Data
US 2025/0164159 A1 May 22, 2025

(51) Int. Cl.
F25B 21/00 (2006.01)
F25B 41/20 (2021.01)
F25B 49/02 (2006.01)

(52) U.S. Cl.
CPC .............. *F25B 21/00* (2013.01); *F25B 41/20* (2021.01); *F25B 49/02* (2013.01); *F25B 2321/002* (2013.01)

(58) Field of Classification Search
CPC ........... F25B 21/00; F25B 41/20; F25B 49/02
See application file for complete search history.

(56) References Cited

U.S. PATENT DOCUMENTS

2010/0212327 A1 8/2010 Barve et al.
2012/0272665 A1* 11/2012 Watanabe ............. F25B 25/005
62/3.1
(Continued)

FOREIGN PATENT DOCUMENTS

CN 104136866 A 11/2014
CN 114264085 A 4/2022
(Continued)

OTHER PUBLICATIONS

International Search Report and Written Opinion mailed on Jul. 12, 2022, received for PCT Application No. PCT/JP2022/020681, filed on May 18, 2022, 8 pages including English Translation.
(Continued)

*Primary Examiner* — Henry T Crenshaw
(74) *Attorney, Agent, or Firm* — XSENSUS LLP

(57) ABSTRACT

A magnetic refrigerator includes: a pipe through which a heat transport medium is transported between a high-temperature end and a low-temperature end through a magneto-thermal container; a pump to transport the heat transport medium through the pipe between the high-temperature end and the low-temperature end; a valve to switch the pipe between an opened state and a closed state; and a controller to control the valve to switch a transport path of the heat transport medium. The controller is configured to switch the transport path between a first mode and a second mode. In the first mode, the magneto-thermal containers are connected in series between the high-temperature end and the low-temperature end to allow transport of the heat transport medium. In the second mode, the magneto-thermal containers are connected in parallel between the high-temperature end and the low-temperature end to allow transport of the heat transport medium.

16 Claims, 29 Drawing Sheets

(56) References Cited

U.S. PATENT DOCUMENTS

| | | | |
|---|---|---|---|
| 2013/0298571 A1* | 11/2013 | Morimoto | B60H 1/32 62/3.1 |
| 2014/0130515 A1 | 5/2014 | Tomimatsu et al. | |
| 2016/0025385 A1 | 1/2016 | Auringer et al. | |
| 2023/0019748 A1 | 1/2023 | Kawabata et al. | |

FOREIGN PATENT DOCUMENTS

| | | |
|---|---|---|
| JP | 2002106999 A | 4/2002 |
| JP | 2014-098495 A | 5/2014 |
| JP | 2017-522532 A | 8/2017 |
| WO | 2021/200666 A1 | 10/2021 |

OTHER PUBLICATIONS

Notification of Reason for Refusal mailed on Sep. 6, 2022, received for JP Application 2022-545400, 4 pages including English Translation.
Decision to Grant a Patent mailed on Oct. 18, 2022, received for JP Application 2022-545400, 5 pages including English Translation.
Chinese Office Action issued Jan. 24, 2025, in corresponding Chinese Patent Application No. 202280096050.7, 19pp.

* cited by examiner

MAGNETIC REFRIGERATOR WITH A PLURALITY OF MAGNETO-THERMAL CONTAINERS

CROSS-REFERENCE TO RELATED APPLICATION

This application is a national stage application, pursuant to 35 U.S.C. § 371, of International Patent Application No. PCT/JP2022/020681, filed May 18, 2022, the entire contents of which are incorporated herein by reference.

TECHNICAL FIELD

The present disclosure relates to a magnetic refrigerator.

BACKGROUND ART

Conventionally, an active magnetic refrigeration (AMR)-type magnetic refrigerator has been known as an environmentally friendly refrigeration technique.

The AMR-type magnetic refrigerator includes a heat pump system utilizing a magnetocaloric effect of magnetocaloric materials. Specifically, the magnetic refrigerator applies a magnetic field to a magneto-thermal container to cause generation or absorption of heat from or by the magnetocaloric material filling the magneto-thermal container, and then uses a pump to transport a heat transport medium in contact with the magnetocaloric material to thereby cause a temperature difference between a high-temperature end and a low-temperature end. The magnetic refrigerator functions as a heat pump system that transports heat from a low-temperature end to a high-temperature end by transporting a heat transport medium between the high-temperature end and the low-temperature end while changing the magnitude of a magnetic field applied to a magnetocaloric material.

Regarding the magnetic refrigerator as described above, Japanese National Patent Publication No. 2017-522532 (PTL 1) discloses a magnetic cooling system including a plurality of pipes connected to an AMR bed serving as a magneto-thermal container and configured to control a valve disposed in each of the plurality of pipes to switch a flow path of a heat transport medium flowing through the AMR bed.

CITATION LIST

Patent Literature

PTL 1: Japanese National Patent Publication No. 2017-522532

SUMMARY OF INVENTION

Technical Problem

The heat pump performance of the magnetic refrigerator, i.e., the temperature difference between the high-temperature end and the low-temperature end as well as the amount of heat transport from the low-temperature end to the high-temperature end, may depend on the shape of a magneto-thermal container. Qualitatively, the temperature difference between the high-temperature end and the low-temperature end is proportional to the distance in which the heat transport medium flows through the magneto-thermal container. In other words, the temperature difference between the high-temperature end and the low-temperature end is proportional to the dimension (the length) of the magneto-thermal container in the direction parallel to the direction in which the heat transport medium flows. Further, the amount of heat transport from the low-temperature end to the high-temperature end is proportional to the cross-sectional area of the magneto-thermal container taken when the heat transport medium flows through the magneto-thermal container. In other words, the amount of heat transport from the low-temperature end to the high-temperature end is proportional to the cross-sectional area of the magneto-thermal container in the direction perpendicular to the direction in which the heat transport medium flows.

Thus, the shape of the magneto-thermal container needs to be determined in accordance with the environment in which the magnetic refrigerator is installed. In an actual environment, however, a target temperature difference between the high-temperature end and the low-temperature end as well as a target amount of heat transport from the low-temperature end to the high-temperature end may change according to an outside temperature, settings by a user, a transient state of the magnetic refrigerator, and the like. On the other hand, as in the magnetic cooling system disclosed in PTL 1, the shape of the magneto-thermal container is determined in advance, and thus, if the shape of the magneto-thermal container is not optimal for the environment, the target temperature difference between the high-temperature end and the low-temperature end as well as the target amount of heat transport from the low-temperature end to the high-temperature end cannot be achieved, which may cause a problem such as deterioration in power efficiency.

The present disclosure has been made to solve the above-described problems, and an object thereof is to provide a magnetic refrigerator capable of improving power efficiency according to an environment.

Solution to Problem

A magnetic refrigerator according to the present disclosure includes: a high-temperature-side heat exchanger; a low-temperature-side heat exchanger; a high-temperature end from which heat on a high temperature-side is supplied to the high-temperature-side heat exchanger; a low-temperature end from which heat on a low temperature-side is supplied to the low-temperature-side heat exchanger; a plurality of magneto-thermal containers each filled with a magnetocaloric material; a plurality of magnetic field application devices each to apply a magnetic field to a corresponding one of the plurality of magneto-thermal containers; at least one pipe through which a heat transport medium is transported through the plurality of magneto-thermal containers between the high-temperature end and the low-temperature end; a pump to transport the heat transport medium through the at least one pipe between the high-temperature end and the low-temperature end; at least one valve to switch the at least one pipe between an opened state and a closed state; and a controller to control the at least one valve to switch a transport path of the heat transport medium. The controller is configured to control the at least one valve to switch the transport path between a first mode and a second mode. In the first mode, the plurality of magneto-thermal containers are connected in series between the high-temperature end and the low-temperature end to allow transport of the heat transport medium. In the second mode, the plurality of magneto-thermal containers are connected in parallel between the high-temperature end and the low-temperature end to allow transport of the heat transport medium.

Advantageous Effects of Invention

According to the present disclosure, the magnetic refrigerator switches the transport path between the first mode in which the plurality of magneto-thermal containers are connected in series between the high-temperature end and the low-temperature end to allow transport of the heat transport medium, and the second mode in which the plurality of magneto-thermal containers are connected in parallel between the high-temperature end and the low-temperature end to allow transport of the heat transport medium, and thereby can change the cross-sectional area and the length of the transport path of the heat transport medium flowing through the plurality of magneto-thermal containers, and therefore, can improve the power efficiency according to an environment.

DESCRIPTION OF EMBODIMENTS

Figure 1:
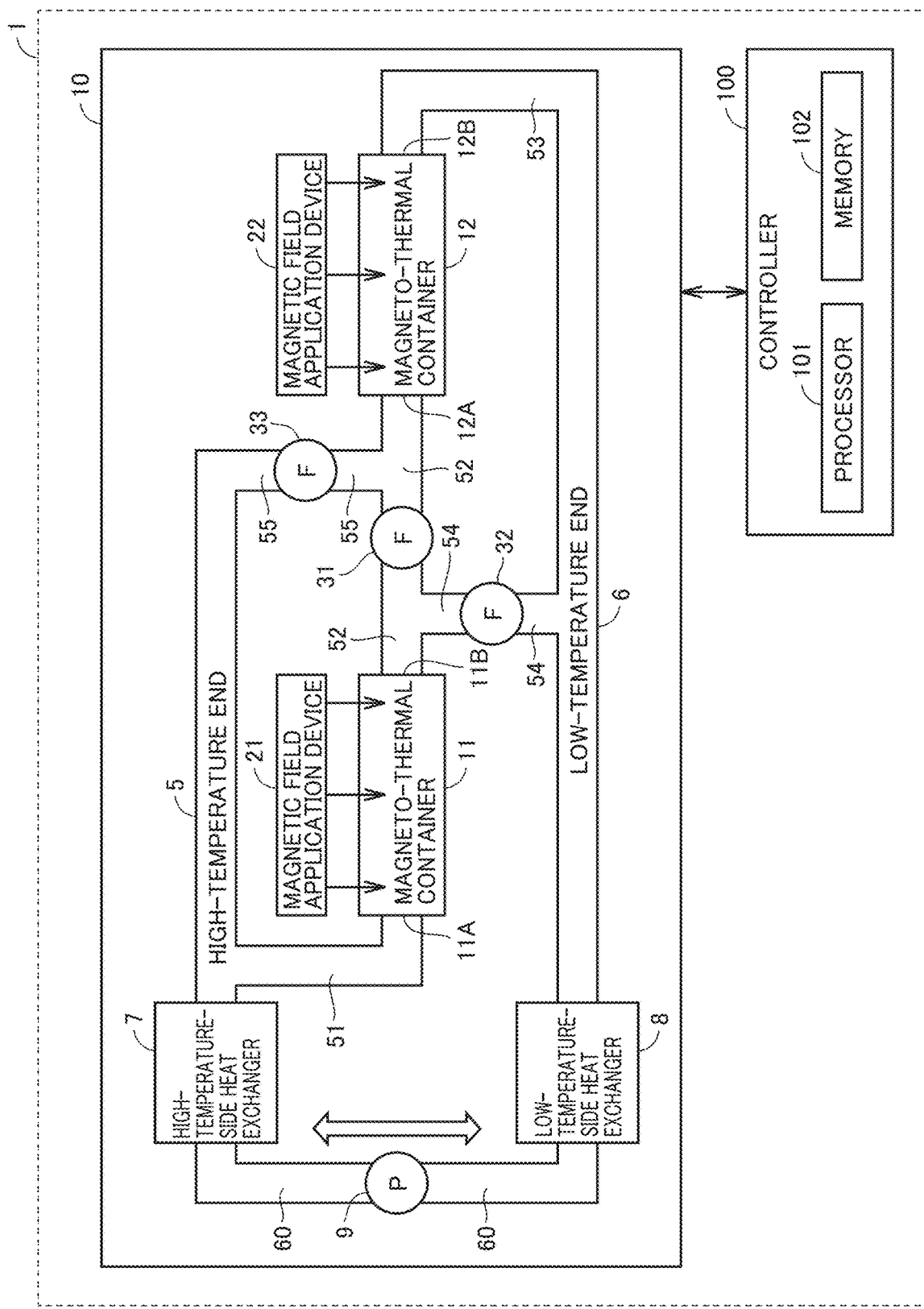
FIG. 1 is a diagram showing a configuration of a magnetic refrigerator according to a first embodiment.

Embodiments of the present disclosure will be hereinafter described in detail with reference to the accompanying drawings. While a plurality of embodiments will be described below, it has been originally intended to combine the configurations described in the embodiments as appropriate. The same or corresponding portions in the accompanying drawings are denoted by the same reference characters, and the description thereof will not be repeated.

First Embodiment

A magnetic refrigerator 1 according to the first embodiment will be described with reference to FIGS. 1 to 7. FIG. 1 is a diagram showing a configuration of magnetic refrigerator 1 according to the first embodiment. As shown in FIG.

1, magnetic refrigerator 1 includes a magnetic refrigeration circuit 10 and a controller 100.

Magnetic refrigeration circuit 10 includes a high-temperature end 5, a low-temperature end 6, a high-temperature-side heat exchanger 7, a low-temperature-side heat exchanger 8, a pump 9, magneto-thermal containers 11 and 12, magnetic field application devices 21 and 22, pipes 51 to 55 and 60, and valves 31 to 33.

High-temperature-side heat exchanger 7 is connected to high-temperature end 5, from which heat on a high temperature-side is supplied to high-temperature-side heat exchanger 7. High-temperature-side heat exchanger 7 exchanges heat between high-temperature end 5 and an external medium located on the high-temperature end 5 side. The temperature of the external medium that exchanges heat with high-temperature end 5 through high-temperature-side heat exchanger 7 is lower than the temperature at high-temperature end 5. High-temperature-side heat exchanger 7 exchanges heat between high-temperature end 5 and the external medium and thereby can heat the external medium.

Low-temperature-side heat exchanger 8 is connected to low-temperature end 6, from which heat on a low temperature-side is supplied to low-temperature-side heat exchanger 8. Low-temperature-side heat exchanger 8 exchanges heat between low-temperature end 6 and an external medium located on the low-temperature end 6 side. The temperature of the external medium that exchanges heat with low-temperature end 6 through low-temperature-side heat exchanger 8 is higher than the temperature at low-temperature end 6. Low-temperature-side heat exchanger 8 exchanges heat between low-temperature end 6 and the external medium and thereby can cool the external medium.

Pump 9 is provided in pipe 60 connecting high-temperature-side heat exchanger 7 and low-temperature-side heat exchanger 8, and serves as a reciprocating pump that reciprocates to transport a heat transport medium back and forth between high-temperature end 5 and low-temperature end 6 through pipes 51 to 55. The heat transport medium is liquid or gas and includes, for example, water, an ethanol solution, or the like. From the viewpoint of preventing deterioration in magnetocaloric material or in use environment in which magnetic refrigerator 1 is used, the heat transport medium may contain a metal rust inhibitor, an antifreeze, oil, ammonia, hydrogen, mercury, or the like.

In magnetic refrigerator 1, pump 9 is connected to high-temperature end 5 through high-temperature-side heat exchanger 7, and is connected to low-temperature end 6 through low-temperature-side heat exchanger 8. Thereby, in magnetic refrigerator 1, pump 9 can produce a flow in the heat transport medium present in each of high-temperature-side heat exchanger 7 and low-temperature-side heat exchanger 8, which makes it possible to enhance the heat exchange efficiency in high-temperature-side heat exchanger 7 and low-temperature-side heat exchanger 8. Note that pump 9 may be connected to high-temperature end 5 without passing through high-temperature-side heat exchanger 7, and may be connected to low-temperature end 6 without passing through low-temperature-side heat exchanger 8.

Magnetic refrigerator 1 may include a plurality of pumps 9, without being limited to one pump 9. For example, in magnetic refrigerator 1, a reciprocating pump may be provided in only one of high-temperature end 5 and low-temperature end 6 while an elastic body such as a syringe expanding and contracting in response to the pressure of the heat transport medium by the pump may be provided in the other one of high-temperature end 5 and low-temperature end 6, so that reciprocating transport of the heat transport medium may be implemented. Alternatively, in magnetic refrigerator 1, a plurality of reciprocating pumps may be provided in each of high-temperature end 5 and low-temperature end 6, and operated in synchronization with each other, so that reciprocating transport of the heat transport medium may be implemented.

Magneto-thermal containers 11 and 12 each are filled with a magnetocaloric material. The magnetocaloric material, which has a magnetocaloric effect, generates heat as the magnetic field applied thereto becomes larger, and absorbs heat as the magnetic field applied thereto becomes smaller. The magnetocaloric material includes, for example, a material having a magnetocaloric effect, such as gadolinium, a lanthanum-based alloy, or a manganese-based alloy.

Magnetic field application devices 21 and 22 are provided in magneto-thermal containers 11 and 12, respectively. Magnetic field application device 21 applies a magnetic field to magneto-thermal container 11 to thereby apply a magnetic field to the magnetocaloric material filling magneto-thermal container 11. Magnetic field application device 22 applies a magnetic field to magneto-thermal container 12 to thereby apply a magnetic field to the magnetocaloric material filling magneto-thermal container 12.

Under the control of controller 100, magnetic field application devices 21 and 22 respectively start or stop applying a magnetic field to magneto-thermal containers 11 and 12 to change the magnitudes of the applying magnetic fields. For example, under the control of controller 100, magnetic field application devices 21 and 22 operate motors to move permanent magnets to thereby change the magnitudes of the applying magnetic fields. Alternatively, under the control of controller 100, magnetic field application devices 21 and 22 change the magnetic force of each of electromagnets to thereby change the magnitudes of the applying magnetic fields. Magnetic field application devices 21 and 22 may have any configurations as long as they can uniformly change the magnetic fields applied to magneto-thermal containers 11 and 12.

Pipes 51 to 55 are disposed such that the heat transport medium can be transported between high-temperature end 5 and low-temperature end 6 through magneto-thermal containers 11 and 12. Pipe 51 connects high-temperature end 5 and a high-temperature-side port 11A of magneto-thermal container 11. Pipe 52 connects a low-temperature-side port 11B of magneto-thermal container 11 and a high-temperature-side port 12A of magneto-thermal container 12. Pipe 53 connects a low-temperature-side port 12B of magneto-thermal container 12 and low-temperature end 6. Pipe 54 branches off from pipe 52 and is connected to low-temperature end 6. In other words, low-temperature-side port 11B of magneto-thermal container 11 and high-temperature-side port 12A of magneto-thermal container 12 are connected to low-temperature end 6 through pipes 52 and 54. Pipe 55 branches off from pipe 52 and is connected to high-temperature end 5. In other words, low-temperature-side port 11B of magneto-thermal container 11 and high-temperature-side port 12A of magneto-thermal container 12 are connected to high-temperature end 5 through pipes 52 and 55.

Valve 31 is provided in pipe 52 and switches pipe 52 between an opened state and a closed state under the control of controller 100. When valve 31 is controlled to be in an opened state to set pipe 52 to be in an opened state, magneto-thermal containers 11 and 12 are connected in series between high-temperature end 5 and low-temperature end 6. Valve 32 is provided in pipe 54 and switches pipe 54 between an opened state and a closed state under the control of controller 100. Valve 33 is provided in pipe 55 and switches pipe 55 between an opened state and a closed state under the control of controller 100. When valve 32 is controlled to be in an opened state to set pipe 54 to be in an opened state, and valve 33 is controlled to be in an opened state to set pipe 55 to be in an opened state, magneto-thermal containers 11 and 12 are connected in parallel between high-temperature end 5 and low-temperature end 6. In addition, it is necessary to select appropriate valves as valves 31 to 33 such that the flow path of the heat transport medium can be opened and closed in accordance with the type and the state of the heat transport medium and also in accordance with the transport pressure of the heat transport medium by pump 9.

In this way, in magnetic refrigerator 1, magneto-thermal containers 11 and 12 are connected in series between high-temperature end 5 and low-temperature end 6, and low-temperature-side port 11B of magneto-thermal container 11 and high-temperature-side port 12A of magneto-thermal container 12 are connected to each other via valve 31. Further, low-temperature-side port 11B of magneto-thermal container 11 and high-temperature-side port 12A of magneto-thermal container 12 are connected to low-temperature end 6 via valve 32, and are connected to high-temperature end 5 via valve 33.

Magneto-thermal containers 11 and 12 and pipes 51 to 55 are filled with a heat transport medium such that the heat transport medium can be transported by pump 9.

Controller 100 includes a processor 101 and a memory 102. Processor 101 is a computing entity (a computer) that executes various programs to execute various processes. Processor 101 is configured, for example, of a central processing unit (CPU), a field-programmable gate array (FPGA), or a graphics processing unit (GPU). Further, processor 101 may be configured of processing circuitry such as an application specific integrated circuit (ASIC). Memory 102 is configured of a volatile memory such as a dynamic random access memory (DRAM) or a static random access memory (SRAM) that temporarily stores program codes, work memory or the like when processor 101 executes various programs. Memory 102 may be configured of a nonvolatile memory such as a read only memory (ROM) or a flash memory that stores various types of data required for processor 101 to execute various programs. Controller 100 may include a storage device such as a solid state drive (SSD) or a hard disk drive (HDD).

In magnetic refrigerator 1 configured as described above, a magnetic refrigeration operation is performed as follows. First, magnetic refrigerator 1 increases the magnetic fields to be applied by magnetic field application devices 21 and 22 to magneto-thermal containers 11 and 12. When the applied magnetic fields are large, the magnetocaloric materials inside magneto-thermal containers 11 and 12 generate heat, and the heat of the magnetocaloric materials is transmitted to the heat transport medium filling, together with the magnetocaloric materials, magneto-thermal containers 11 and 12, so that the heat transport medium is increased in temperature. Then, magnetic refrigerator 1 transports the heat transport medium from low-temperature end 6 to high-temperature end 5 with the use of pump 9. Thereby, the heat transport medium that is increased in temperature due to absorption of heat from the magnetocaloric materials inside magneto-thermal containers 11 and 12 is transported from low-temperature end 6 to high-temperature end 5. Then, magneto-thermal containers 11 and 12 are filled again with a relatively low-temperature heat transport medium from the low-temperature end 6 side.

Then, magnetic refrigerator 1 reduces the magnetic fields to be applied by magnetic field application devices 21 and 22 to magneto-thermal containers 11 and 12. When the applied magnetic fields are small, the magnetocaloric materials inside magneto-thermal containers 11 and 12 absorb heat, and heat is removed from the heat transport medium filling, together with the magnetocaloric materials, magneto-thermal containers 11 and 12, so that the heat transport medium is decreased in temperature. Then, magnetic refrigerator 1 transports the heat transport medium from high-temperature end 5 to low-temperature end 6 with the use of pump 9. Thereby, the heat transport medium that is low in temperature due to removal of heat therefrom by the magnetocaloric materials inside magneto-thermal containers 11 and 12 is transported from high-temperature end 5 to low-temperature end 6. Then, magneto-thermal containers 11 and 12 are filled again with a relatively low-temperature heat transport medium from the low-temperature end 6 side. Magnetic refrigerator 1 repeats the above-described operation to transport heat from low-temperature end 6 to high-temperature end 5, to thereby cause a temperature difference between high-temperature end 5 and low-temperature end 6.

The heat pump performance of magnetic refrigerator 1, i.e., the temperature difference between high-temperature end 5 and low-temperature end 6 as well as the amount of heat transport from low-temperature end 6 to high-temperature end 5, may depend on the shapes of magneto-thermal containers 11 and 12. Since magneto-thermal containers 11 and 12 are filled with the magnetocaloric materials without gaps, a pressure loss occurs when the heat transport medium is transported by pump 9.

The pressure loss is proportional to the dimensions of magneto-thermal containers 11 and 12 in the direction in which the heat transport medium flows therethrough. Thus, the temperature difference between high-temperature end 5 and low-temperature end 6 is proportional to the dimension (the length) of the magneto-thermal containers in the direction parallel to the direction in which the heat transport medium flows. Specifically, as the magneto-thermal container is longer in dimension in the direction parallel to the direction in which the heat transport medium flows, the temperature difference between high-temperature end 5 and low-temperature end 6 is larger.

Further, the pressure loss is inversely proportional to the cross-sectional area of each of magneto-thermal containers 11 and 12 in the direction perpendicular to the direction in which the heat transport medium flows. Thus, the amount of heat transport from low-temperature end 6 to high-temperature end 5 is proportional to the cross-sectional area of each magneto-thermal container in the direction perpendicular to the direction in which the heat transport medium flows. Specifically, as the magneto-thermal container is larger in cross-sectional area in the direction perpendicular to the direction in which the heat transport medium flows, the amount of heat transport from low-temperature end 6 to high-temperature end 5 is larger.

Thus, the shapes of magneto-thermal containers 11 and 12 need to be determined in accordance with the environment in which magnetic refrigerator 1 is installed. In an actual environment, however, a target temperature difference between high-temperature end 5 and low-temperature end 6 as well as a target amount of heat transport from low-temperature end 6 to high-temperature end 5 may change according to an outside temperature, settings by a user, a transient state of magnetic refrigerator 1, and the like. On the other hand, the shapes of magneto-thermal containers 11 and 12 are determined in advance, and thus, if the shapes of magneto-thermal containers 11 and 12 are not optimal for the environment, the target temperature difference between high-temperature end 5 and low-temperature end 6 as well as the target amount of heat transport from low-temperature end 6 to high-temperature end 5 cannot be achieved, which may cause a problem such as deterioration in power efficiency.

Therefore, in magnetic refrigerator 1 according to the first embodiment, controller 100 is configured to switch the transport path of the heat transport medium between high-temperature end 5 and low-temperature end 6. The following specifically describes the switching of the transport path performed by controller 100.

Figure 2:
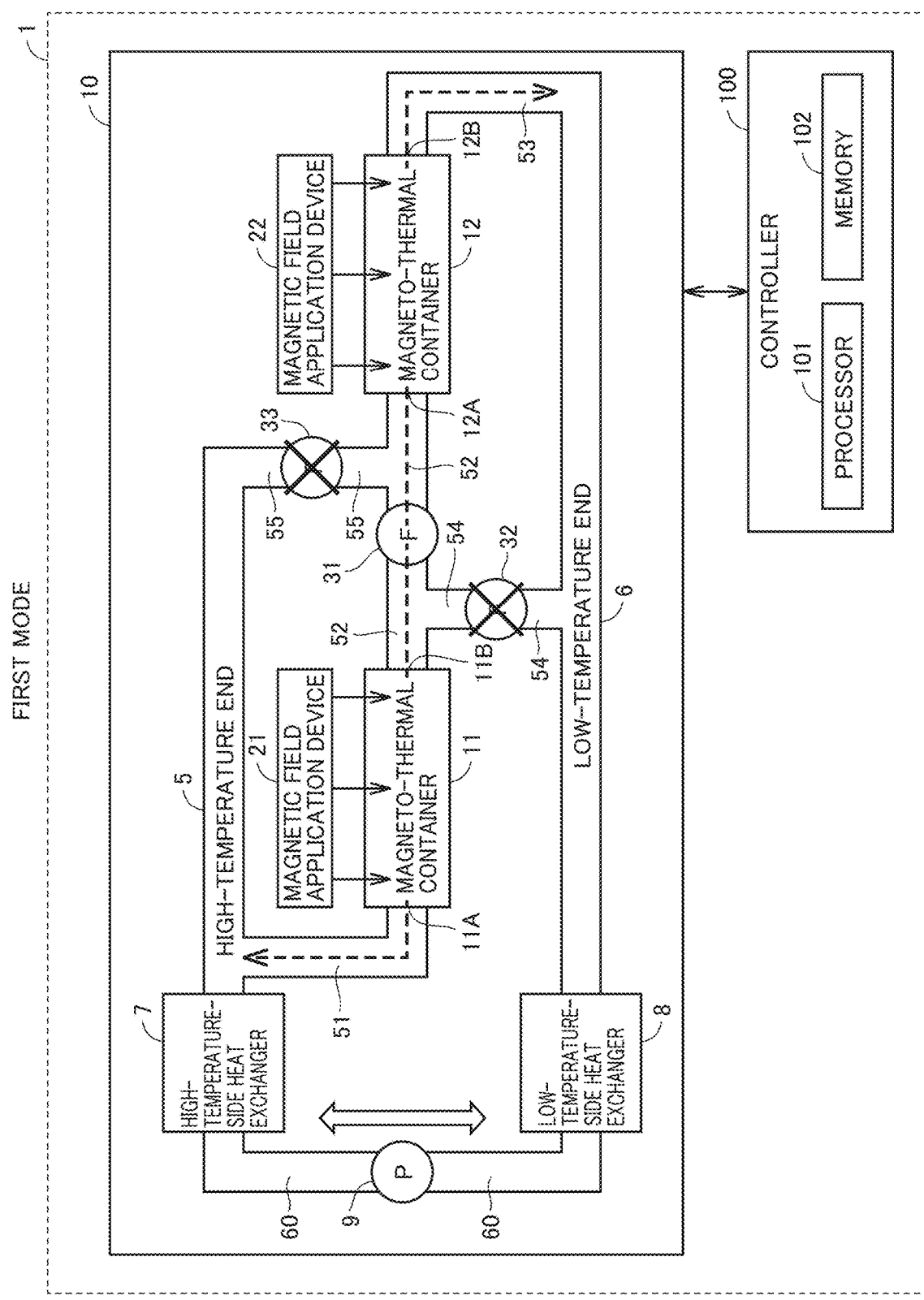
FIG. 2 is a diagram for illustrating a transport path of a heat transport medium in a first mode in the magnetic refrigerator according to the first embodiment.

FIG. 2 is a diagram for illustrating a transport path of a heat transport medium in a first mode in magnetic refrigerator 1 according to the first embodiment. As shown in FIG. 2, controller 100 controls the transport path to be set in the first mode to thereby control valve 31 to be in an opened state and also control each of valves 32 and 33 to be in a closed state. Thereby, magneto-thermal containers 11 and 12 are connected only in series between high-temperature end 5 and low-temperature end 6.

In the first mode in which such a transport path is formed, a transport path is formed such that the heat transport medium flows through pipe 51, magneto-thermal container 11, pipe 52, magneto-thermal container 12, and pipe 53 between high-temperature end 5 and low-temperature end 6. Thereby, between high-temperature end 5 and low-temperature end 6, the heat transport medium flows through both magneto-thermal containers 11 and 12. Thus, the distance in which the heat transport medium flows through the magneto-thermal containers is equal to the sum of the dimensions of magneto-thermal containers 11 and 12 in the direction parallel to the direction in which the heat transport medium flows. On the other hand, the cross-sectional area of each magneto-thermal container in the direction perpendicular to the direction in which the heat transport medium flows is equal to the cross-sectional area of each of magneto-thermal containers 11 and 12.

Figure 3:
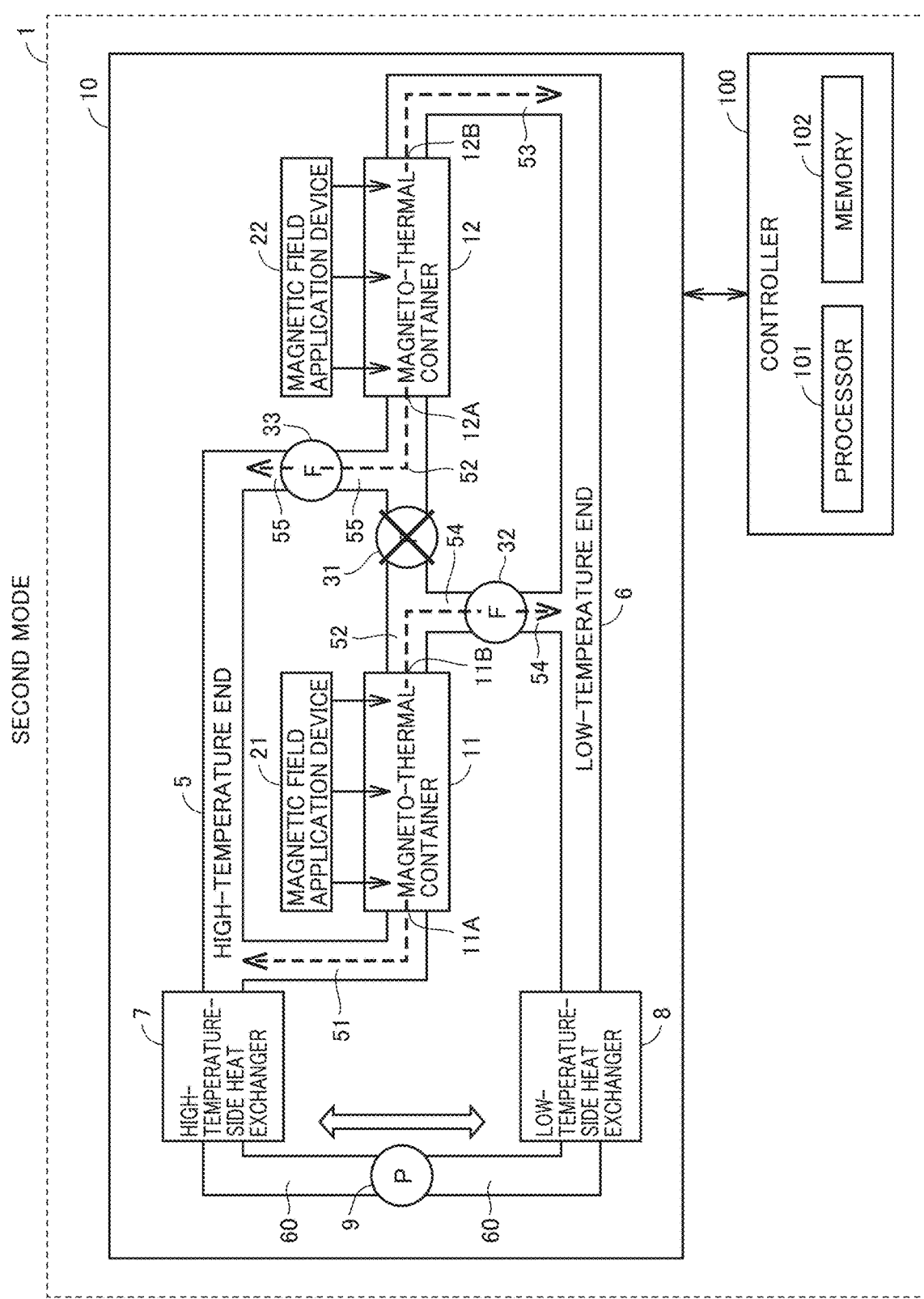
FIG. 3 is a diagram for illustrating the transport path of the heat transport medium in a second mode in the magnetic refrigerator according to the first embodiment.

FIG. 3 is a diagram for illustrating the transport path of the heat transport medium in a second mode in magnetic refrigerator 1 according to the first embodiment. As shown in FIG. 3, controller 100 controls the transport path to be set in the second mode to thereby control each of valves 32 and 33 to be in an opened state and also control valve 31 to be in a closed state. Thereby, magneto-thermal containers 11 and 12 are connected only in parallel between high-temperature end 5 and low-temperature end 6.

In the second mode in which such a transport path is formed, two transport paths are formed that include: a transport path through which the heat transport medium flows through pipe 51, magneto-thermal container 11, pipe 52, and pipe 54 between high-temperature end 5 and low-temperature end 6; and a transport path through which the heat transport medium flows through pipe 55, pipe 52, magneto-thermal container 12, and pipe 53 between high-temperature end 5 and low-temperature end 6. Thereby, between high-temperature end 5 and low-temperature end 6, the heat transport medium independently flows through each of magneto-thermal containers 11 and 12 without flowing through both magneto-thermal containers 11 and 12. Accordingly, the distance in which the heat transport medium flows through the magneto-thermal containers is equal to the dimension of each of magneto-thermal containers 11 and 12 in the direction parallel to the direction in which the heat transport medium flows. On the other hand, the cross-sectional areas of the magneto-thermal containers in the direction perpendicular to the direction in which the heat transport medium flows are equal to the sum of the cross-sectional areas of magneto-thermal containers 11 and 12 in the direction perpendicular to the direction in which the heat transport medium flows.

Figure 4:
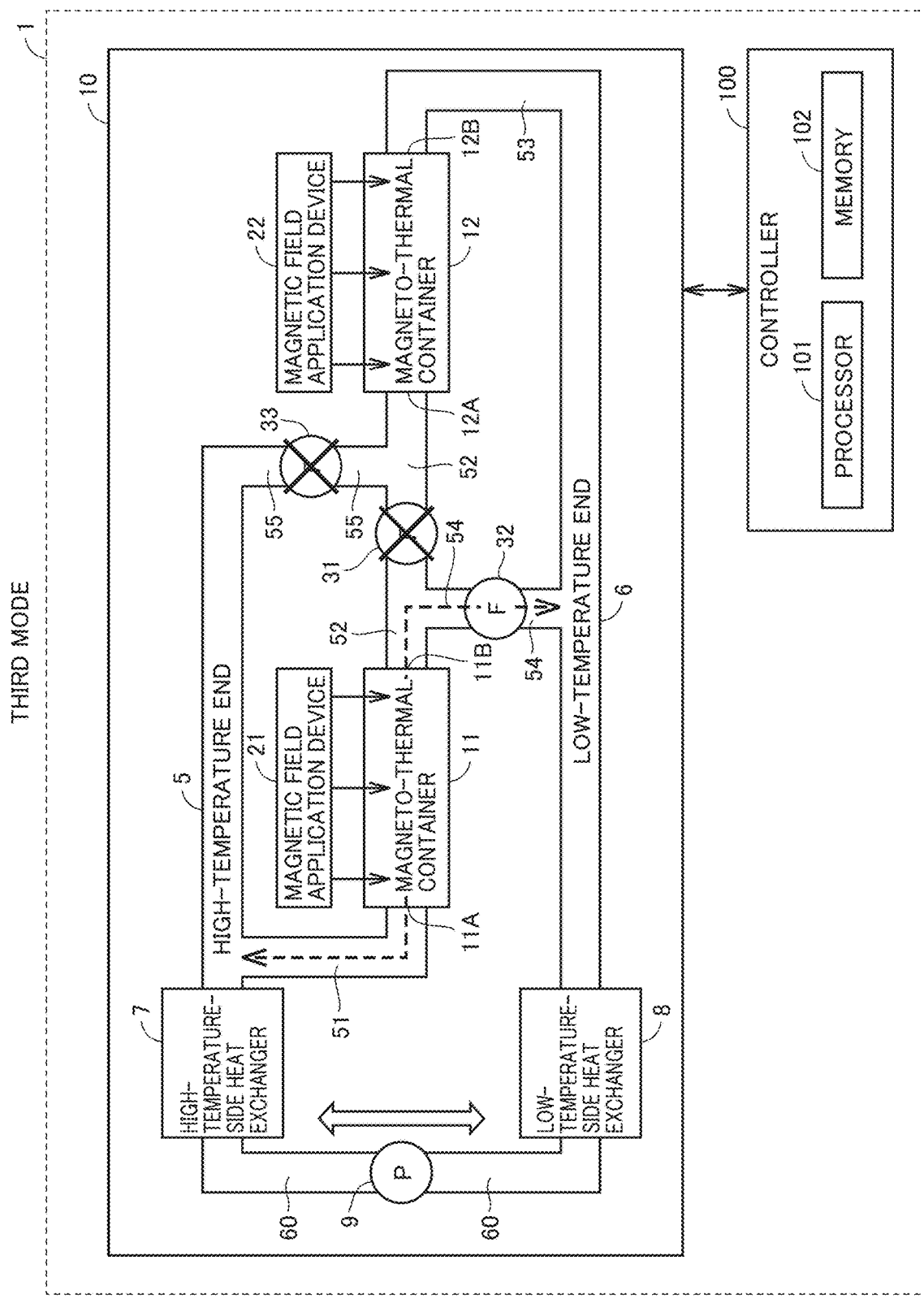
FIG. 4 is a diagram for illustrating the transport path of the heat transport medium in a third mode in the magnetic refrigerator according to the first embodiment.

FIG. 4 is a diagram for illustrating the transport path of the heat transport medium in a third mode in magnetic refrigerator 1 according to the first embodiment. As shown in FIG. 4, controller 100 controls the transport path to be set in the third mode to thereby control valve 32 to be in an opened state and also control each of valves 31 and 33 to be in a closed state. Thus, only magneto-thermal container 11 is connected between high-temperature end 5 and low-temperature end 6.

In the third mode in which such a transport path is formed, one transport path is formed such that the heat transport medium flows through pipe 51, magneto-thermal container 11, pipe 52, and pipe 54 between high-temperature end 5 and low-temperature end 6. Thereby, the heat transport medium flows only through magneto-thermal container 11 between high-temperature end 5 and low-temperature end 6. Therefore, the distance in which the heat transport medium flows through the magneto-thermal container is equal to the dimension of magneto-thermal container 11 in the direction parallel to the direction in which the heat transport medium flows. On the other hand, the cross-sectional area of the magneto-thermal container in the direction perpendicular to the direction in which the heat transport medium flows is equal to the cross-sectional area of magneto-thermal container 11.

In the second mode in which two magneto-thermal containers 11 and 12 are connected in parallel and in the third mode in which only one magneto-thermal container 11 is connected between high-temperature end 5 and low-temperature end 6, the pressure loss occurring during transport of the heat transport medium is smaller than that in the first mode in which two magneto-thermal containers 11 and 12 are connected in series between high-temperature end 5 and low-temperature end 6. Thus, in the second mode or the third mode, the electric power used for operating pump 9 can be made smaller than that in the first mode, and the power efficiency can be improved in the entire system including magnetic refrigerator 1.

Figure 5:
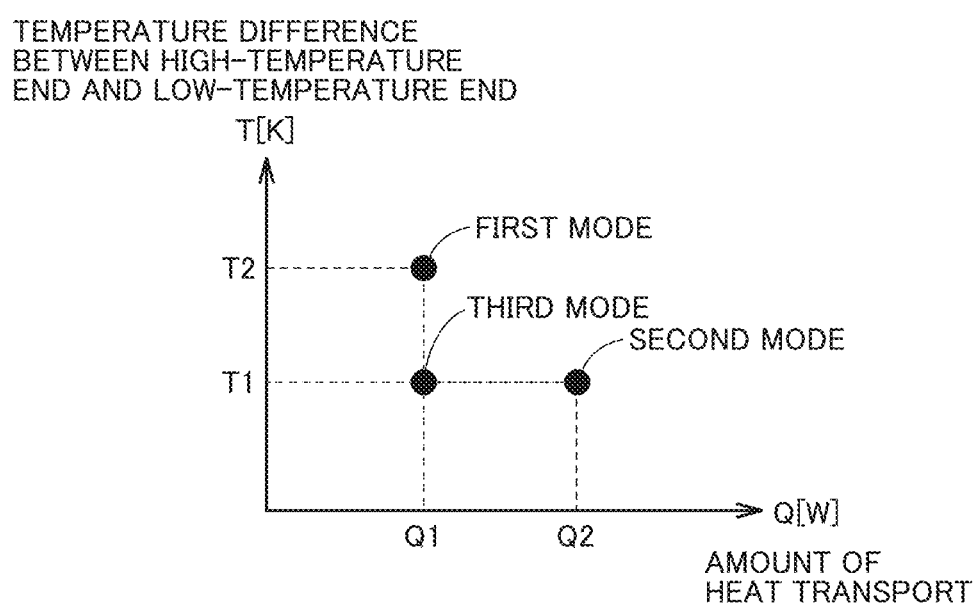
FIG. 5 is a diagram showing a temperature difference between a high-temperature end and a low-temperature end with respect to an amount of heat transport from the low-temperature end to the high-temperature end in each mode in the magnetic refrigerator according to the first embodiment.

FIG. 5 is a diagram showing a temperature difference between high-temperature end 5 and low-temperature end 6 with respect to the amount of heat transport from low-temperature end 6 to high-temperature end 5 in each mode in magnetic refrigerator 1 according to the first embodiment.

The distance in which the heat transport medium flows through the magneto-thermal containers in the first mode is equal to the sum of the dimensions of magneto-thermal containers 11 and 12, whereas the distance in which the heat transport medium flows through the magneto-thermal container(s) in the second mode or the third mode is equal to the dimension of magneto-thermal container 11 or 12. In other words, the distance in which the heat transport medium flows through the magneto-thermal containers in the first mode is longer than the distance in which the heat transport medium flows through the magneto-thermal container(s) in the second mode or the third mode. Thus, the temperature difference between high-temperature end 5 and low-temperature end 6 in the first mode is larger than the temperature difference between high-temperature end 5 and low-temperature end 6 in the second mode or the third mode.

In addition, when the dimensions of magneto-thermal containers 11 and 12 are the same, the distance in which the heat transport medium flows through the magneto-thermal containers in the second mode is equal to the distance in which the heat transport medium flows through the magneto-thermal container in the third mode. Thus, the temperature difference between high-temperature end 5 and low-temperature end 6 in the second mode is equal to the temperature difference between high-temperature end 5 and low-temperature end 6 in the third mode.

For example, as shown in FIG. 5, when the temperature difference between high-temperature end 5 and low-temperature end 6 in each of the second mode and the third mode is T1[K], the temperature difference between high-temperature end 5 and low-temperature end 6 in the first mode is T2[K] that is larger than T1[K].

The cross-sectional areas of the magneto-thermal containers in the direction perpendicular to the direction in which the heat transport medium flows in the second mode are equal to the sum of the cross-sectional areas of magneto-thermal containers 11 and 12, whereas the cross-sectional area(s) of the magneto-thermal container(s) in the direction perpendicular to the direction in which the heat transport medium flows in the first mode or the third mode is/are equal to the cross-sectional area of magneto-thermal container 11 or 12. In other words, the cross-sectional areas of the magneto-thermal containers in the direction perpendicular to the direction in which the heat transport medium flows in the second mode are larger than the cross-sectional area(s) of the magneto-thermal container(s) in the direction perpendicular to the direction in which the heat transport medium flows in the first mode or the third mode. Thus, the amount of heat transport from low-temperature end 6 to high-temperature end 5 in the second mode is larger than the amount of heat transport from low-temperature end 6 to high-temperature end 5 in the first mode or the third mode.

Further, when the cross-sectional area of magneto-thermal container 11 is equal to the cross-sectional area of magneto-thermal container 12, the cross-sectional area of each magneto-thermal container in the direction perpendicular to the direction in which the heat transport medium flows in the first mode is equal to the cross-sectional area of the magneto-thermal container in the direction perpendicular to the direction in which the heat transport medium flows in the third mode. Thus, the amount of heat transport from low-temperature end 6 to high-temperature end 5 in the first mode is equal to the amount of heat transport from low-temperature end 6 to high-temperature end 5 in the third mode.

For example, as shown in FIG. 5, when the amount of heat transport from low-temperature end 6 to high-temperature end 5 in each of the first mode and the third mode is Q1[W], the amount of heat transport from low-temperature end 6 to high-temperature end 5 in the second mode is Q2[W] that is larger than Q1[W].

Therefore, magnetic refrigerator 1 should only cause controller 100 to control the transport path to be set in the first mode when the target temperature difference between high-temperature end 5 and low-temperature end 6 is large, and also should only cause controller 100 to control the transport path to be set in the second mode or the third mode when the target temperature difference between high-temperature end 5 and low-temperature end 6 is small. Magnetic refrigerator 1 should only cause controller 100 to control the transport path to be set in the second mode when the target amount of heat transport from low-temperature end 6 to high-temperature end 5 is large, and also should only cause controller 100 to control the transport path to be set in the first mode or the third mode when the target amount of heat transport from low-temperature end 6 to high-temperature end 5 is small. This allows magnetic refrigerator 1 to perform an optimal magnetic refrigeration operation in accordance with the environment.

Variables related to the magnetic refrigeration operation for adjusting the performance of magnetic refrigerator 1 include, for example, the magnitudes of the magnetic fields applied by magnetic field application devices 21 and 22, the amount of the heat transport medium transported by pump 9, and the cycle of the magnetic refrigeration operation. Even in the first mode, adjusting these variables makes it possible to achieve a temperature difference between high-temperature end 5 and low-temperature end 6 as in the second mode and the third mode. However, in the second mode and the third mode, even adjusting the above-mentioned variables does not make it possible to achieve the same amount of heat transport from low-temperature end 6 to high-temperature end 5 as that in the first mode. In any of the first mode, the second mode, and the third mode, in an environment in which a target temperature difference between high-temperature end 5 and low-temperature end 6 as well as a target amount of heat transport from low-temperature end 6 to high-temperature end 5 can be achieved, magnetic refrigerator 1 controls the transport path to be set in the second mode or the third mode, and thereby can reduce the electric power used for operating pump 9, with the result that the power efficiency can be improved in the entire system including magnetic refrigerator 1.

In the third mode, the amount of heat transport from low-temperature end 6 to high-temperature end 5 is equal to that in the first mode, and the temperature difference between high-temperature end 5 and low-temperature end 6 is equal to that in the second mode. Further, in the third mode, the motive power for operating pump 9 is one-half of that in the second mode, so that the electric power used for operating pump 9 becomes smaller than that in the second mode. Thereby, magnetic refrigerator 1 controls the transport path to be set in the third mode, so that the power efficiency can be further improved in the entire system including magnetic refrigerator 1.

Figure 6:
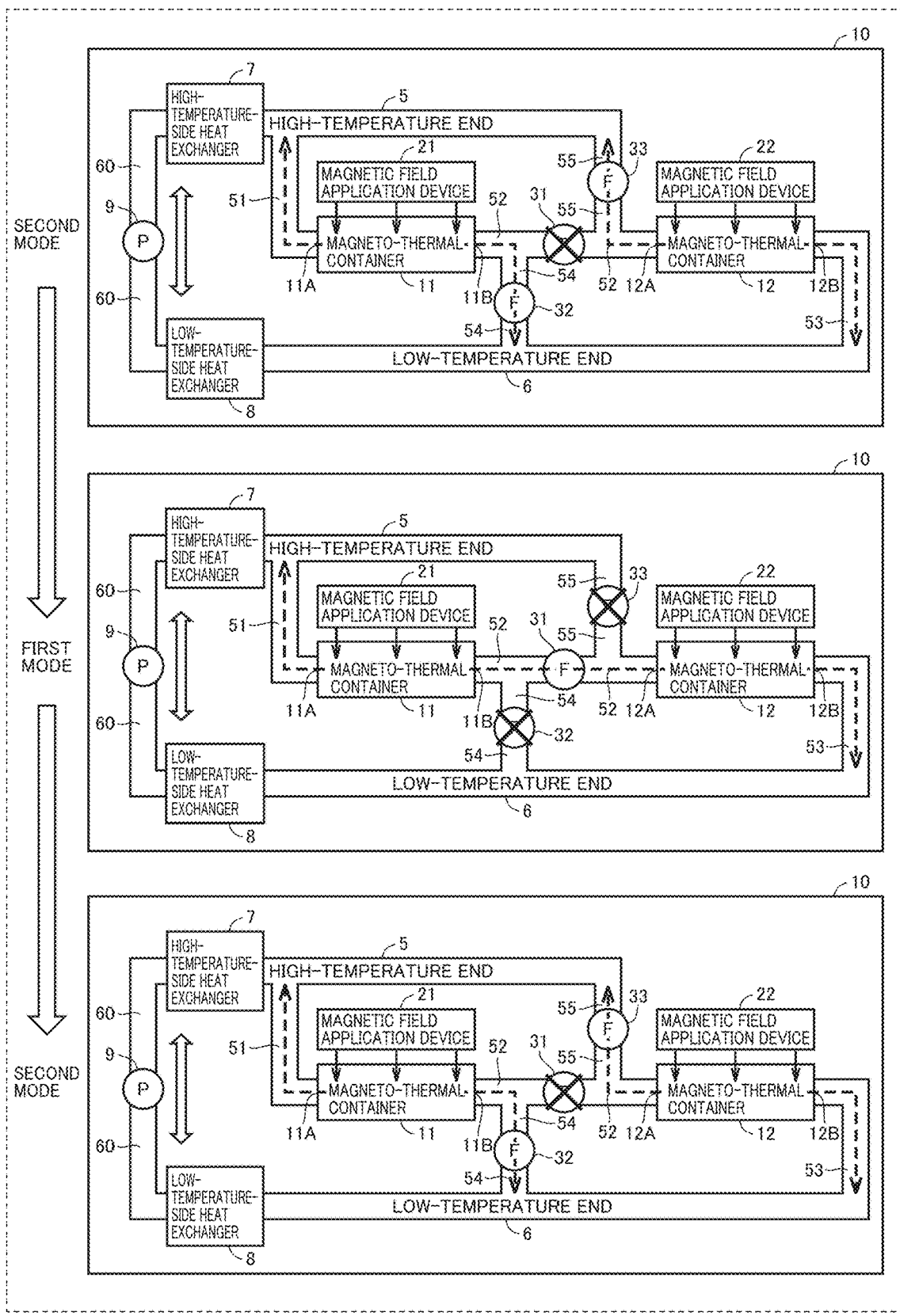
FIG. 6 is a diagram for illustrating mode switching in the magnetic refrigerator according to the first embodiment.
Figure 7:
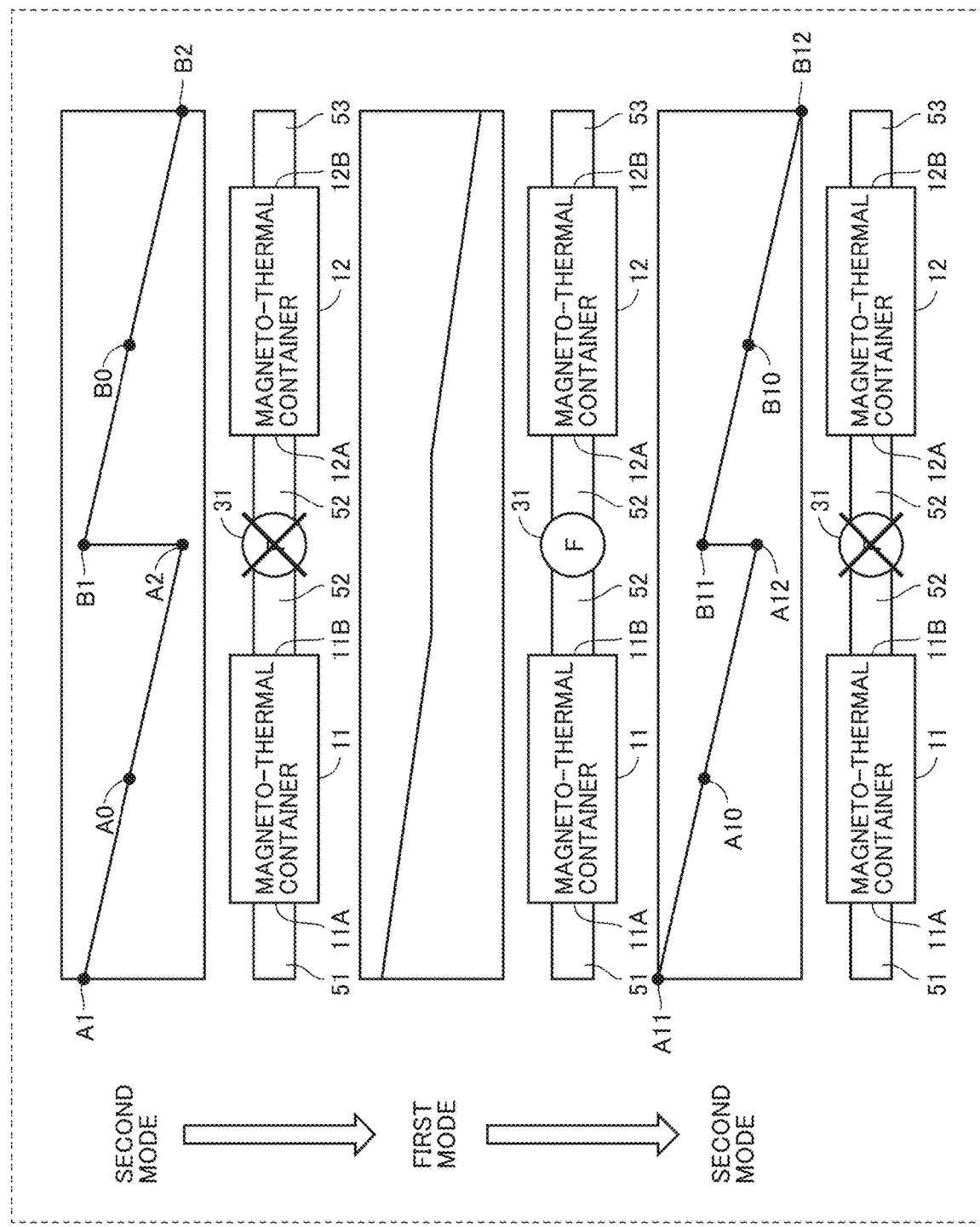
FIG. 7 is a diagram for illustrating a temperature distribution inside a magneto-thermal container occurring when mode switching is performed in the magnetic refrigerator according to the first embodiment.

FIG. 6 is a diagram for illustrating mode switching in magnetic refrigerator 1 according to the first embodiment. FIG. 7 is a diagram for illustrating a temperature distribution inside magneto-thermal containers 11, 12 occurring when mode switching is performed in magnetic refrigerator 1 according to the first embodiment.

As shown in FIG. 6, magnetic refrigerator 1 controls the transport path to be set in the second mode and performs the magnetic refrigeration operation for a certain period of time. Thereby, as shown in FIG. 7, a temperature difference occurs independently in each of magneto-thermal containers 11 and 12. Specifically, in magneto-thermal container 11 on the high-temperature end 5 side, when the temperature in the center portion of magneto-thermal container 11 is defined as a center temperature A0 of the temperature distribution, a temperature A1 at high-temperature-side port 11A is higher than center temperature A0, and a temperature A2 at low-temperature-side port 11B is lower than center temperature A0. In magneto-thermal container 12 on the low-temperature end 6 side, when the temperature in the center portion of magneto-thermal container 12 is defined as a center temperature B0 of the temperature distribution, a temperature B1 at high-temperature-side port 12A is higher than center temperature B0, and a temperature B2 at low-temperature-side port 12B is lower than center temperature B0.

Then, as shown in FIG. 6, magnetic refrigerator 1 controls the transport path to be set in the first mode and performs the magnetic refrigeration operation for a certain period of time.

Thereby, as shown in FIG. 7, heat conduction occurs between the heat transport medium at low-temperature-side port 11B of magneto-thermal container 11 on the high-temperature end 5 side and the heat transport medium at high-temperature-side port 12A of magneto-thermal container 12 on the low-temperature end 6 side. Then, the heat transport medium at low-temperature-side port 11B of magneto-thermal container 11 is slightly warmed while the heat transport medium at high-temperature-side port 12A of magneto-thermal container 12 is slightly cooled. In this case, magnetic refrigerator 1 may operate pump 9 for heat conduction or may perform the magnetic refrigeration operation in the first mode for heat conduction, each of which is however not indispensable.

Then, as shown in FIG. 6, magnetic refrigerator 1 controls the transport path to be set in the second mode again and performs the magnetic refrigeration operation for a certain period of time. Thereby, as shown in FIG. 7, a temperature difference occurs again independently in each of magneto-thermal containers 11 and 12.

At this time, in magneto-thermal container 11 on the high-temperature end 5 side, the heat transport medium at low-temperature-side port 11B is slightly warmed by heat conduction, so that the temperature distribution shifts more to the high temperature-side than in the initial second mode. Specifically, in magneto-thermal container 11, when the temperature in the center portion of magneto-thermal container 11 is defined as a center temperature A10 of the temperature distribution, a temperature A11 at high-temperature-side port 11A is higher than center temperature A10, and a temperature A12 at low-temperature-side port 11B is lower than center temperature A10. Further, center temperature A10 in magneto-thermal container 11 is higher than center temperature A0 in the initial second mode. Temperature A11 at high-temperature-side port 11A is higher than temperature A1 at high-temperature-side port 11A in the initial second mode. Temperature A12 at low-temperature-side port 11B is higher than temperature A2 at low-temperature-side port 11B in the initial second mode.

Further, in magneto-thermal container 12 on the low-temperature end 6 side, the heat transport medium at high-temperature-side port 12A is slightly cooled by heat conduction, so that the temperature distribution shifts more to the low temperature-side than in the initial second mode. Specifically, in magneto-thermal container 12, when the temperature in the center portion of magneto-thermal container 12 is defined as a center temperature B10 of the temperature distribution, a temperature B11 at high-temperature-side port 12A is higher than center temperature B10, and a temperature B12 at low-temperature-side port 12B is lower than center temperature B10. Further, center temperature B10 in magneto-thermal container 12 is lower than center temperature B0 in the initial second mode. Temperature B11 at high-temperature-side port 12A is lower than temperature B1 at high-temperature-side port 12A in the initial second mode. Temperature B12 at low-temperature-side port 12B is lower than temperature B2 at low-temperature-side port 12B in the initial second mode.

In this case, in the second mode for the second time, temperature A12 at low-temperature-side port 11B of magneto-thermal container 11 is higher than temperature B12 at low-temperature-side port 12B of magneto-thermal container 12, i.e., the temperature at low-temperature end 6. Thus, in the second mode, controller 100 controls the magnetic refrigeration operation performed using pump 9 such that a one-way path through which the heat transport medium is transported back and forth between low-temperature end 6 and low-temperature-side port 11B of magneto-thermal container 11 becomes shorter than the path between low-temperature end 6 and low-temperature-side port 11B of magneto-thermal container 11 (the path formed of a part of pipe 52 and pipe 54).

More specifically, controller 100 performs the magnetic refrigeration operation such that the reciprocating transport of the heat transport medium through magneto-thermal container 11 is synchronized with the reciprocating transport of the heat transport medium through magneto-thermal container 12. When the path between low-temperature end 6 and low-temperature-side port 11B of magneto-thermal container 11 (the path formed of a part of pipe 52 and pipe 54) is shorter than the path between low-temperature end 6 and low-temperature-side port 12B of magneto-thermal container 12 (the path formed of pipe 53), controller 100 should only perform the magnetic refrigeration operation such that the heat transport medium flowing through magneto-thermal container 12 reaches low-temperature end 6 while the heat transport medium flowing through magneto-thermal container 11 does not reach low-temperature end 6.

Thereby, even when the heat transport medium is transported back and forth between high-temperature end 5 and low-temperature end 6 through magneto-thermal container 11 by the magnetic refrigeration operation, it can be avoided that the heat transport medium flowing through magneto-thermal container 11 reaches low-temperature end 6 and thereby temperature A12 at low-temperature-side port 11B of magneto-thermal container 11 raises temperature B12 at low-temperature end 6, with the result that the heat loss can be reduced.

Further, in the second mode for the second time, temperature B11 at high-temperature-side port 12A of magneto-thermal container 12 is lower than temperature A11 at high-temperature-side port 11A of magneto-thermal container 11, i.e., the temperature at high-temperature end 5. Thus, in the second mode, controller 100 controls the magnetic refrigeration operation performed using pump 9 such that a one-way path through which the heat transport medium is transported back and forth between high-temperature end 5 and high-temperature-side port 12A of magneto-thermal container 12 becomes shorter than the path between high-temperature end 5 and high-temperature-side port 12A of magneto-thermal container 12 (the path formed of a part of pipe 52 and pipe 55).

More specifically, when the path between high-temperature end 5 and high-temperature-side port 12A of magneto-thermal container 12 (the path formed of a part of pipe 52 and pipe 55) is shorter than the path between high-temperature end 5 and high-temperature-side port 11A of magneto-thermal container 11 (the path formed of pipe 51), controller 100 should only perform the magnetic refrigeration operation such that the heat transport medium flowing through magneto-thermal container 11 reaches high-temperature end 5 while the heat transport medium flowing through magneto-thermal container 12 does not reach high-temperature end 5.

Thereby, even when the heat transport medium is transported back and forth between high-temperature end 5 and low-temperature end 6 through magneto-thermal container 12 by the magnetic refrigeration operation, it can be avoided that the heat transport medium flowing through magneto-thermal container 12 reaches high-temperature end 5 and thereby temperature B11 at high-temperature-side port 12A of magneto-thermal container 12 lowers temperature A11 at high-temperature end 5, with the result that the heat loss can be reduced.

In this way, magnetic refrigerator 1 causes controller 100 to switch the transport path in the order of the second mode, the first mode, and the second mode, and thereby can further raise temperature A11 at high-temperature-side port 11A of magneto-thermal container 11, i.e., the temperature at high-temperature end 5, and also can further lower temperature B12 at low-temperature-side port 12B of magneto-thermal container 12, i.e., the temperature at low-temperature end 6. Then, magnetic refrigerator 1 can implement the temperature difference between high-temperature end 5 and low-temperature end 6 in the first mode with the use of the motive power of the pump in the second mode. On the other hand, with regard to the amount of heat transport from low-temperature end 6 to high-temperature end 5, only magneto-thermal container 11 is involved in heat transport on the high-temperature end 5 side and only magneto-thermal container 12 is involved in heat transport on the low-temperature end 6 side. Thus, even in the second mode, the same amount of heat as that in the first mode can be transported. This eliminates the need to perform the magnetic refrigeration operation in the state in which magneto-thermal containers 11 and 12 are connected in series, with the result that pump 9 can be reduced in power consumption and size.

Second Embodiment

Referring to FIGS. 8 to 17, a magnetic refrigerator 1 according to the second embodiment will be hereinafter described. The following describes only portions of magnetic refrigerator 1 according to the second embodiment that are different from those in magnetic refrigerator 1 according to the first embodiment.

Figure 8:
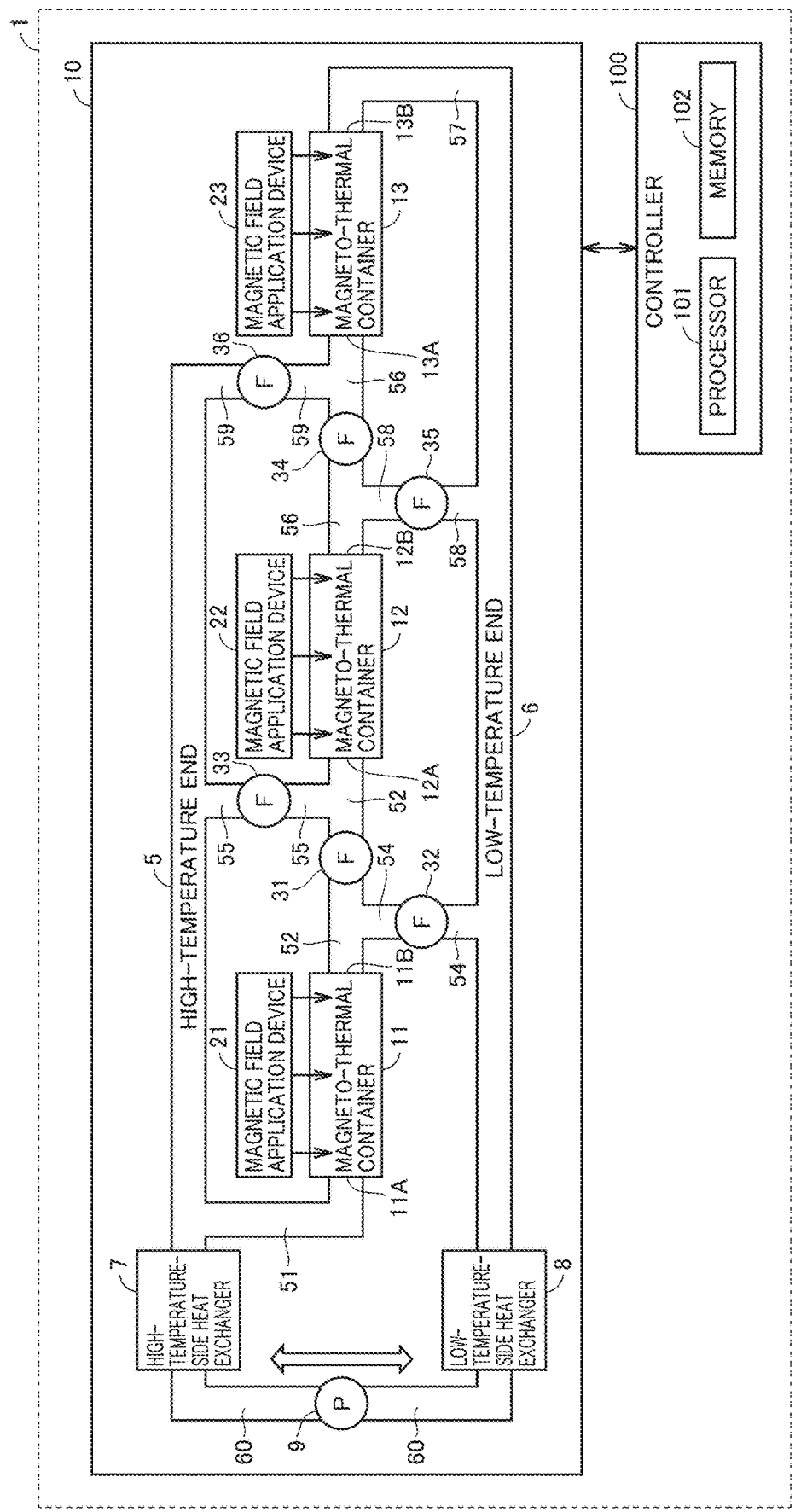
FIG. 8 is a diagram showing a configuration of a magnetic refrigerator according to a second embodiment.

FIG. 8 is a diagram showing a configuration of magnetic refrigerator 1 according to the second embodiment. As shown in FIG. 8, magnetic refrigerator 1 further includes a magneto-thermal container 13, a magnetic field application device 23, pipes 56 to 59, and valves 34 to 36 in magnetic refrigeration circuit 10.

Magneto-thermal container 13 is filled with a magneto-caloric material as in magneto-thermal containers 11 and 12. Magnetic field application device 23 is provided in magneto-thermal container 13. Magnetic field application device 23 applies a magnetic field to magneto-thermal container 13 to thereby apply a magnetic field to the magnetocaloric material filling magneto-thermal container 13. Under the control of controller 100, magnetic field application device 23 starts or stops applying the magnetic field to magneto-thermal container 13 to change the magnitude of the applying magnetic field.

Pipes 56 to 59, together with pipes 51 to 55, are disposed such that the heat transport medium can be transported between high-temperature end 5 and low-temperature end 6 through magneto-thermal containers 11, 12, and 13. Pipe 56 connects low-temperature-side port 12B of magneto-thermal container 12 and a high-temperature-side port 13A of magneto-thermal container 13. Pipe 57 connects a low-temperature-side port 13B of magneto-thermal container 13 and low-temperature end 6.

Pipe 58 branches off from pipe 56 and is connected to low-temperature end 6. In other words, low-temperature-side port 12B of magneto-thermal container 12 and high-temperature-side port 13A of magneto-thermal container 13 are connected to low-temperature end 6 through pipes 56 and 58. Pipe 59 branches off from pipe 56 and is connected to high-temperature end 5. In other words, low-temperature-side port 12B of magneto-thermal container 12 and high-temperature-side port 13A of magneto-thermal container 13 are connected to high-temperature end 5 through pipes 56 and 59.

Valve 34 is provided in pipe 56 and switches pipe 56 between an opened state and a closed state under the control of controller 100. Valve 35 is provided in pipe 58 and switches pipe 58 between an opened state and a closed state under the control of controller 100. Valve 36 is provided in pipe 59 and switches pipe 59 between an opened state and a closed state under the control of controller 100. When valve 31 is controlled to be in an opened state to set pipe 52 to be in an opened state, and valve 34 is controlled to be in an opened state to set pipe 56 to be in an opened state, magneto-thermal containers 11, 12, and 13 are connected in series between high-temperature end 5 and low-temperature end 6. When valve 32 is controlled to be in an opened state to set pipe 54 to be in an opened state, valve 33 is controlled to be in an opened state to set pipe 55 to be in an opened state, valve 35 is controlled to be in an opened state to set pipe 58 to be in an opened state, and valve 36 is controlled to be in an opened state to set pipe 59 to be in an opened state, then, magneto-thermal containers 11, 12, and 13 are connected in parallel between high-temperature end 5 and low-temperature end 6.

In this way, in magnetic refrigerator 1, magneto-thermal containers 11, 12, and 13 are connected in series between high-temperature end 5 and low-temperature end 6, low-temperature-side port 11B of magneto-thermal container 11 and high-temperature-side port 12A of magneto-thermal container 12 are connected to each other via valve 31, and low-temperature-side port 12B of magneto-thermal container 12 and high-temperature-side port 13A of magneto-thermal container 13 are connected to each other via valve 34. Further, low-temperature-side port 11B of magneto-thermal container 11 and high-temperature-side port 12A of magneto-thermal container 12 are connected to low-temperature end 6 via valve 32 and are connected to high-temperature end 5 via valve 33. Low-temperature-side port 12B of magneto-thermal container 12 and high-temperature-side port 13A of magneto-thermal container 13 are connected to low-temperature end 6 via valve 35 and are connected to high-temperature end 5 via valve 36.

In magnetic refrigerator 1 configured as described above, a magnetic refrigeration operation is performed as follows. First, magnetic refrigerator 1 increases the magnetic fields applied by magnetic field application devices 21, 22, and 23 to magneto-thermal containers 11, 12, and 13. When the applied magnetic fields are large, the magnetocaloric materials inside magneto-thermal containers 11, 12, and 13 generate heat, and the heat of each of the magnetocaloric materials is transmitted to the heat transport medium filling, together with the magnetocaloric material, a corresponding one of magneto-thermal containers 11, 12 and 13, so that each heat transport medium is increased in temperature. Then, magnetic refrigerator 1 transports the heat transport medium from low-temperature end 6 to high-temperature end 5 with the use of pump 9. Thereby, the heat transport medium that is increased in temperature due to absorption of heat from the magnetocaloric materials inside magneto-thermal containers 11, 12, and 13 is transported from low-temperature end 6 to high-temperature end 5. Then, magneto-thermal containers 11, 12, and 13 each are filled again with a relatively low-temperature heat transport medium from the low-temperature end 6 side.

Then, magnetic refrigerator 1 reduces the magnetic fields applied by magnetic field application devices 21, 22, and 23 to magneto-thermal containers 11, 12, and 13. When the applied magnetic fields are small, the magnetocaloric materials inside magneto-thermal containers 11, 12, and 13 absorb heat, and heat is removed from the heat transport medium filling, together with the magnetocaloric materials, magneto-thermal containers 11, 12, and 13, so that each heat transport medium is decreased in temperature. Then, magnetic refrigerator 1 transports the heat transport medium from high-temperature end 5 to low-temperature end 6 with the use of pump 9. Thereby, the heat transport medium that is low in temperature due to removal of heat therefrom by the magnetocaloric materials inside magneto-thermal containers 11, 12, and 13 is transported from high-temperature end 5 to low-temperature end 6. Then, magneto-thermal containers 11, 12, and 13 are filled again with a relatively low-temperature heat transport medium from the low-temperature end 6 side. Magnetic refrigerator 1 repeats the above-described operation to transport heat from low-temperature end 6 to high-temperature end 5, to thereby cause a temperature difference between high-temperature end 5 and low-temperature end 6.

Also in magnetic refrigerator 1 according to the second embodiment, controller 100 is configured to switch the transport path of the heat transport medium between high-temperature end 5 and low-temperature end 6, similarly to magnetic refrigerator 1 according to the first embodiment. The following specifically describes the switching of the transport path performed by controller 100.

Figure 9:
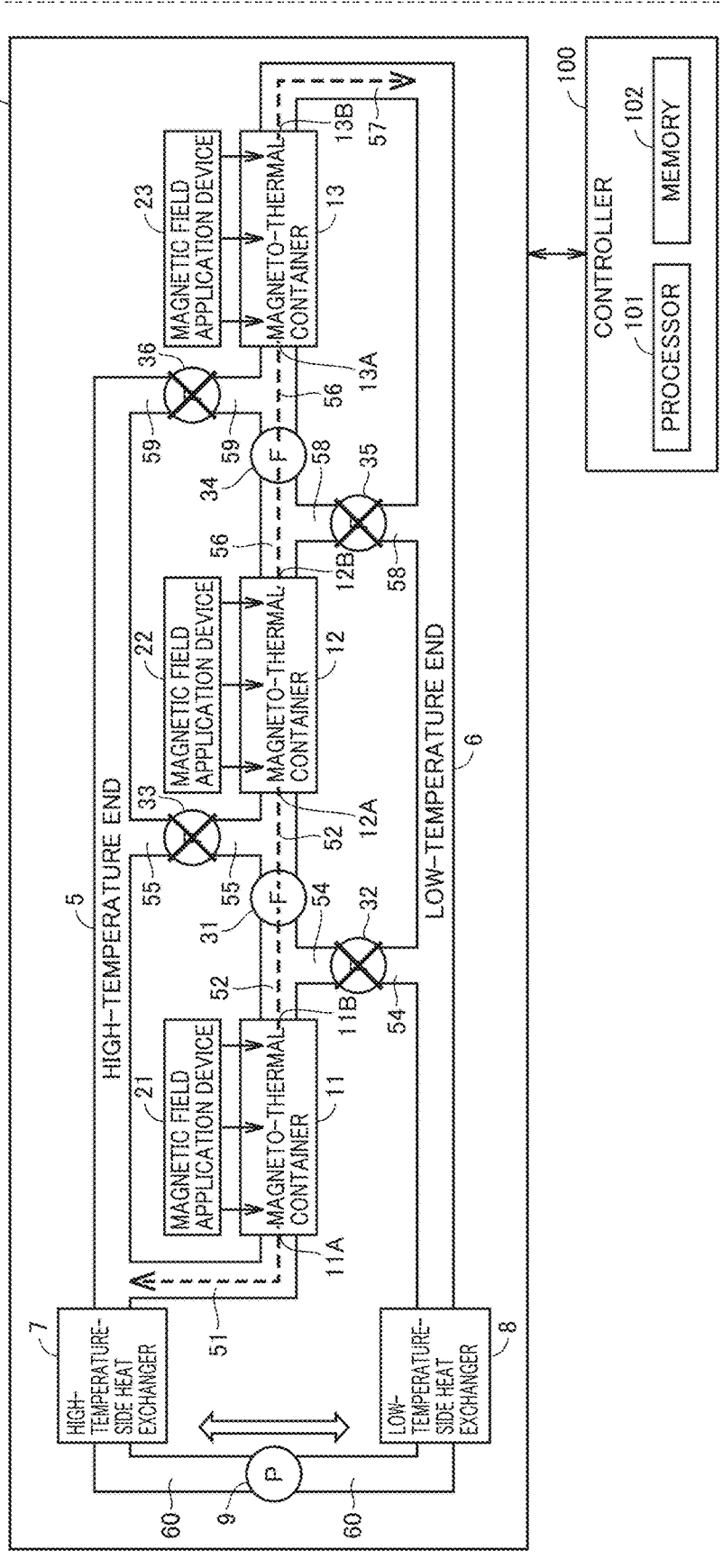
FIG. 9 is a diagram for illustrating a transport path of a heat transport medium in a first mode in the magnetic refrigerator according to the second embodiment.

FIG. 9 is a diagram for illustrating a transport path of the heat transport medium in the first mode in magnetic refrigerator 1 according to the second embodiment. As shown in FIG. 9, controller 100 controls the transport path to be set in the first mode to thereby control each of valves 31 and 34 to be in an opened state and also control each of valves 32, 33, 35, and 36 to be in a closed state. Thereby, magneto-thermal containers 11, 12, and 13 are connected only in series between high-temperature end 5 and low-temperature end 6.

In the first mode in which such a transport path is formed, a transport path is formed such that the heat transport medium flows through pipe 51, magneto-thermal container 11, pipe 52, magneto-thermal container 12, pipe 56, magneto-thermal container 13, and pipe 57 between high-temperature end 5 and low-temperature end 6. Thereby, between high-temperature end 5 and low-temperature end 6, the heat transport medium flows through magneto-thermal containers 11, 12, and 13. Thus, the distance in which the heat transport medium flows through the magneto-thermal containers is equal to the sum of the dimensions of magneto-thermal containers 11, 12, and 13 in the direction parallel to the direction in which the heat transport medium flows. On the other hand, the cross-sectional area of each magneto-thermal container in the direction perpendicular to the direction in which the heat transport medium flows is equal to the cross-sectional area of each of magneto-thermal containers 11, 12, and 13.

Figure 10:
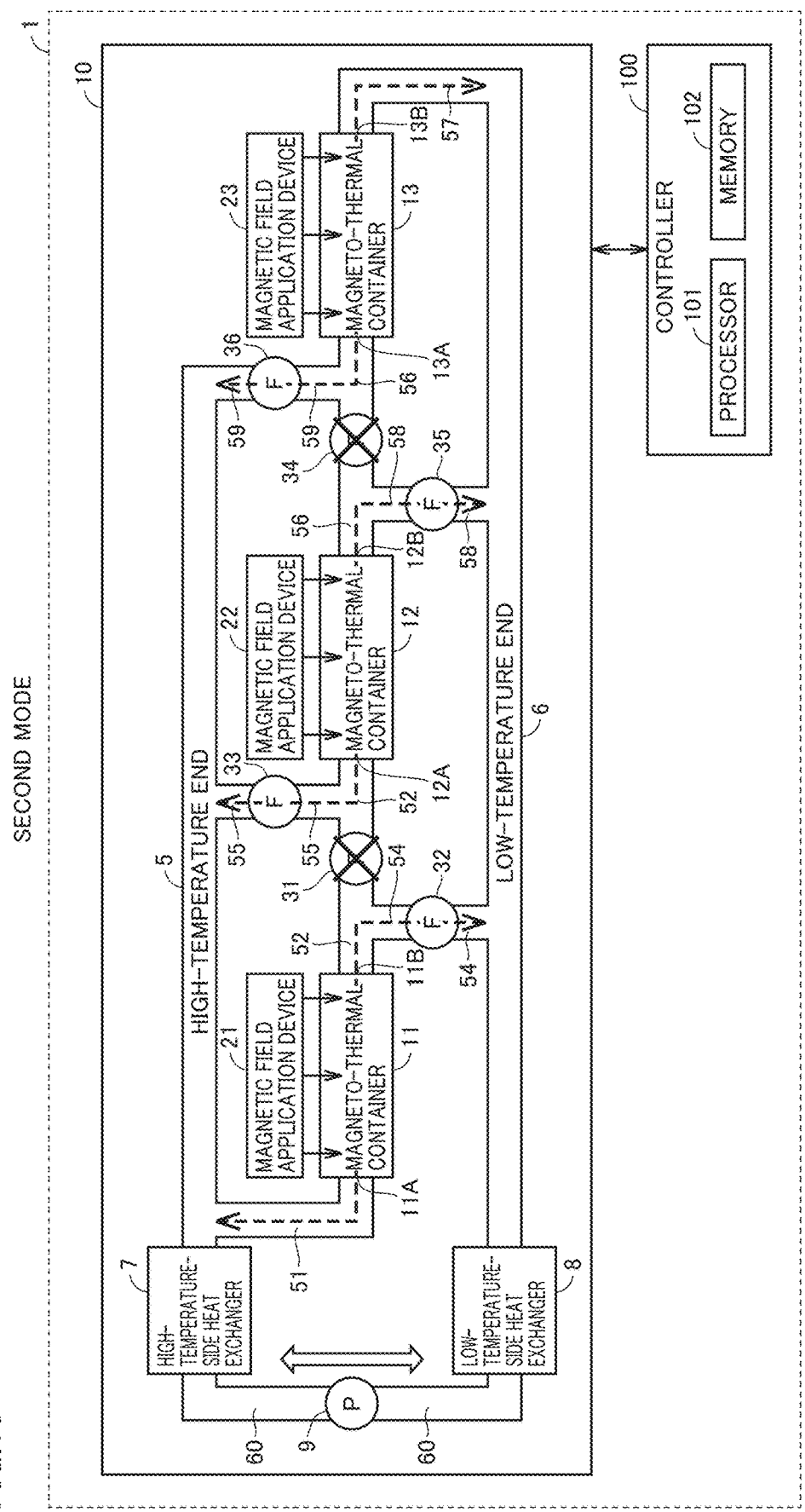
FIG. 10 is a diagram for illustrating the transport path of the heat transport medium in a second mode in the magnetic refrigerator according to the second embodiment.

FIG. 10 is a diagram for illustrating the transport path of the heat transport medium in the second mode in magnetic refrigerator 1 according to the second embodiment. As shown in FIG. 10, controller 100 controls the transport path to be set in the second mode to thereby control each of valves 32, 33, 35, and 36 to be in an opened state and also control each of valves 31 and 34 to be in a closed state. Thereby, magneto-thermal containers 11, 12, and 13 are connected only in parallel between high-temperature end 5 and low-temperature end 6.

In the third mode in which such a transport path is formed, three transport paths are formed that include: a transport path through which the heat transport medium flows through pipe 51, magneto-thermal container 11, pipe 52, and pipe 54 between high-temperature end 5 and low-temperature end 6; a transport path through which the heat transport medium flows through pipe 55, pipe 52, magneto-thermal container 12, and pipe 53 between high-temperature end 5 and low-temperature end 6; and a transport path through which the heat transport medium flows through pipe 59, pipe 56, magneto-thermal container 13, and pipe 57 between high-temperature end 5 and low-temperature end 6. Thereby, between high-temperature end 5 and low-temperature end 6, the heat transport medium independently flows through each of magneto-thermal containers 11, 12, and 13 without flowing through all of magneto-thermal containers 11, 12, and 13. Accordingly, the distance in which the heat transport medium flows through the magneto-thermal containers is equal to the dimension of each of magneto-thermal containers 11, 12, and 13 in the direction parallel to the direction in which the heat transport medium flows. On the other hand, the cross-sectional areas of the magneto-thermal containers in the direction perpendicular to the direction in which the heat transport medium flows are equal to the sum of the cross-sectional areas of magneto-thermal containers 11, 12, and 13 in the direction perpendicular to the direction in which the heat transport medium flows.

Figure 11:
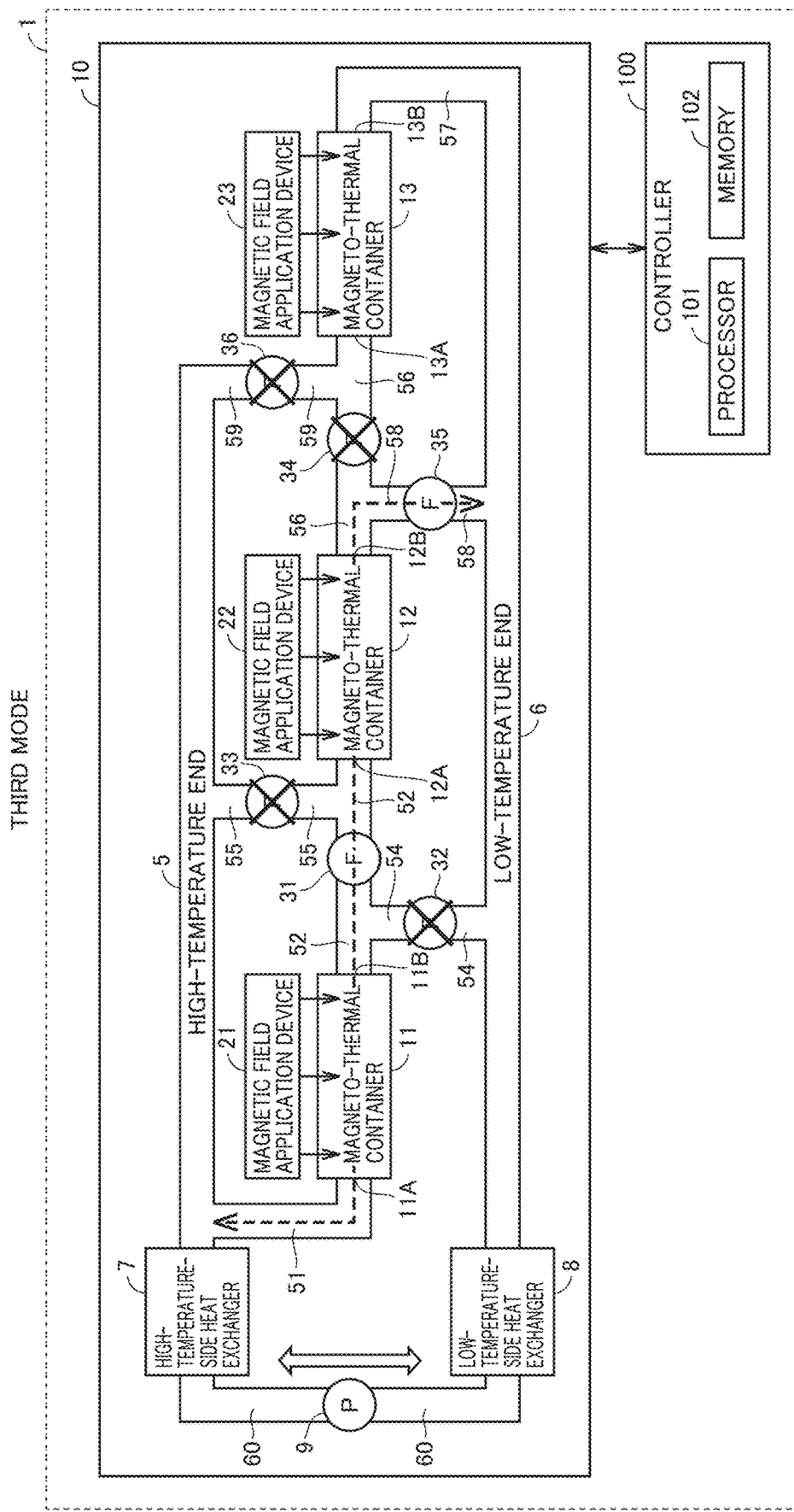
FIG. 11 is a diagram for illustrating the transport path of the heat transport medium in a third mode in the magnetic refrigerator according to the second embodiment.

FIG. 11 is a diagram for illustrating the transport path of the heat transport medium in the third mode in magnetic refrigerator 1 according to the second embodiment. As shown in FIG. 11, controller 100 controls the transport path to be set in the third mode to thereby control each of valves 31 and 35 to be in an opened state and also control each of valves 32, 33, 34, and 36 to be in a closed state. Thereby, only magneto-thermal containers 11 and 12 are connected in series between high-temperature end 5 and low-temperature end 6.

In the third mode in which such a transport path is formed, one transport path is formed such that the heat transport medium flows through pipe 51, magneto-thermal container 11, pipe 52, magneto-thermal container 12, pipe 56, and pipe 58 between high-temperature end 5 and low-temperature end 6. Thereby, between high-temperature end 5 and low-temperature end 6, the heat transport medium flows only through magneto-thermal containers 11 and 12. Thus, the distance in which the heat transport medium flows through the magneto-thermal containers is equal to the sum of the dimensions of magneto-thermal containers 11 and 12 in the direction parallel to the direction in which the heat transport medium flows. On the other hand, the cross-sectional areas of the magneto-thermal containers in the direction perpendicular to the direction in which the heat transport medium flows are equal to the cross-sectional area of each of magneto-thermal containers 11 and 12.

In the second mode in which three magneto-thermal containers 11, 12, and 13 are connected in parallel and in the third mode in which only two magneto-thermal containers 11 and 12 are connected in series between high-temperature end 5 and low-temperature end 6, the pressure loss occurring during transport of the heat transport medium is smaller than that in the first mode in which three magneto-thermal containers 11, 12, and 13 are connected in series between high-temperature end 5 and low-temperature end 6. Thus, in the second mode or the third mode, the electric power used for operating pump 9 can be made smaller than that in the first mode, and the power efficiency can be improved in the entire system including magnetic refrigerator 1.

Figure 12:
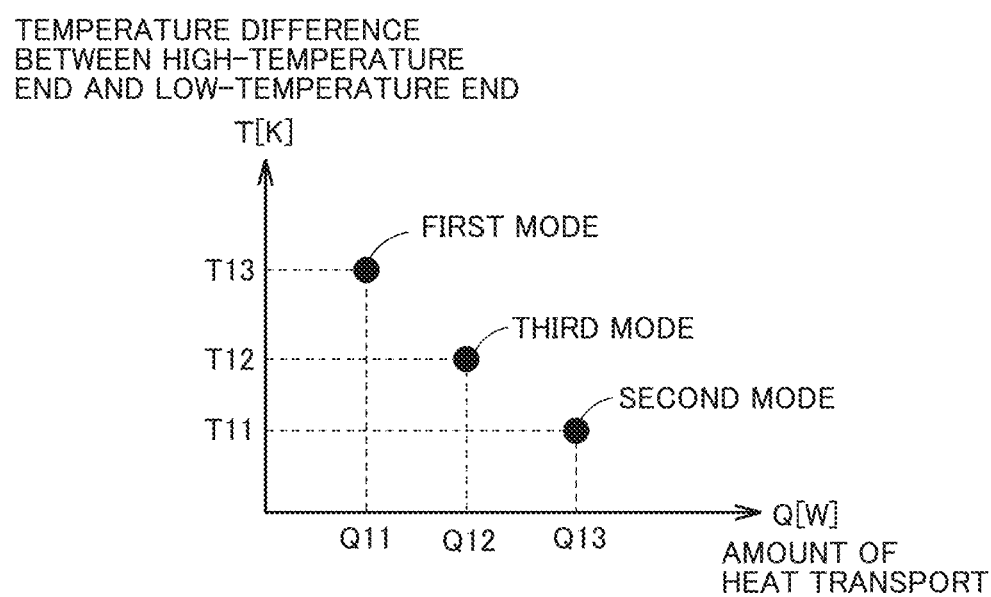
FIG. 12 is a diagram showing a temperature difference between a high-temperature end and a low-temperature end with respect to an amount of heat transport from the low-temperature end to the high-temperature end in each mode in the magnetic refrigerator according to the second embodiment.

FIG. 12 is a diagram showing a temperature difference between high-temperature end 5 and low-temperature end 6 with respect to the amount of heat transport from low-temperature end 6 to high-temperature end 5 in each mode in magnetic refrigerator 1 according to the second embodiment.

The distance in which the heat transport medium flows through the magneto-thermal containers in the first mode is equal to the sum of the dimensions of magneto-thermal containers 11, 12, and 13, whereas the distance in which the heat transport medium flows through the magneto-thermal container in the second mode is equal to the dimension of magneto-thermal container 11, 12, or 13, and the distance in which the heat transport medium flows through the magneto-thermal containers in the third mode is equal to the sum of the dimensions of magneto-thermal containers 11 and 12. In other words, the distance in which the heat transport medium flows through the magneto-thermal containers in the first mode is longer than the distance in which the heat transport medium flows through the magneto-thermal container in the second mode or the magneto-thermal containers in the third mode. Thus, the temperature difference between high-temperature end 5 and low-temperature end 6 in the first mode is larger than the temperature difference between high-temperature end 5 and low-temperature end 6 in the second mode or the third mode.

Further, the distance in which the heat transport medium flows through the magneto-thermal containers in the third mode is longer than the distance in which the heat transport medium flows through the magneto-thermal container in the second mode. Thus, the temperature difference between high-temperature end 5 and low-temperature end 6 in the third mode is larger than the temperature difference between high-temperature end 5 and low-temperature end 6 in the second mode.

For example, as shown in FIG. 12, when the temperature difference between high-temperature end 5 and low-temperature end 6 in the second mode is T11[K], the temperature difference between high-temperature end 5 and low-temperature end 6 in the third mode is T12[K] that is larger than T11[K], and the temperature difference between high-temperature end 5 and low-temperature end 6 in the first mode is T13[K] that is larger than T11[K] and T12[K]. When the characteristics of each of magneto-thermal containers 11, 12, and 13 are uniform, a temperature difference T11 in the second mode is ⅓ times a temperature difference T13 in the first mode, and a temperature difference T12 in the third mode is ⅔ times the temperature difference T13 in the first mode.

The cross-sectional areas of the magneto-thermal containers in the direction perpendicular to the direction in which the heat transport medium flows in the second mode are equal to the sum of the cross-sectional areas of magneto-thermal containers 11, 12, and 13, whereas the cross-sectional area of each magneto-thermal container in the direction perpendicular to the direction in which the heat transport medium flows in the first mode are equal to the cross-sectional area of magneto-thermal container 11, and the cross-sectional areas of the magneto-thermal containers in the direction perpendicular to the direction in which the heat transport medium flows in the third mode are equal to the sum of the cross-sectional areas of magneto-thermal containers 11 and 12. In other words, the cross-sectional areas of the magneto-thermal containers in the direction perpendicular to the direction in which the heat transport medium flows in the second mode are larger than the cross-sectional areas of the magneto-thermal containers in the direction perpendicular to the direction in which the heat transport medium flows in the first mode or the third mode. Thus, the amount of heat transport from low-temperature end 6 to high-temperature end 5 in the second mode is larger than the amount of heat transport from low-temperature end 6 to high-temperature end 5 in the first mode or the third mode.

Further, the cross-sectional areas of the magneto-thermal containers in the direction perpendicular to the direction in which the heat transport medium flows in the third mode are larger than the cross-sectional areas of the magneto-thermal containers in the direction perpendicular to the direction in which the heat transport medium flows in the first mode. Thus, the amount of heat transport from low-temperature end 6 to high-temperature end 5 in the third mode is larger than the amount of heat transport from low-temperature end 6 to high-temperature end 5 in the first mode.

For example, as shown in FIG. 12, when the amount of heat transport from low-temperature end 6 to high-temperature end 5 in the first mode is Q11[W], the amount of heat transport from low-temperature end 6 to high-temperature end 5 in the third mode is Q12[W] that is larger than Q11[W], and the amount of heat transport from low-temperature end 6 to high-temperature end 5 in the second mode is Q13[W] that is larger than Q12[W]. When the characteristics of each of magneto-thermal containers 11, 12, and 13 are uniform, an amount of heat transport Q13 in the second mode is ⅓ times an amount of heat transport Q11 in the first mode, and an amount of heat transport Q12 in the third mode is ⅔ times the amount of heat transport Q11 in the first mode.

Therefore, magnetic refrigerator 1 should only cause controller 100 to control the transport path to be set in the first mode when the target temperature difference between high-temperature end 5 and low-temperature end 6 is large, and should only cause controller 100 to control the transport path to be set in the second mode or the third mode when the target temperature difference between high-temperature end 5 and low-temperature end 6 is small. Magnetic refrigerator 1 should only cause controller 100 to control the transport path to be set in the second mode when the target amount of heat transport from low-temperature end 6 to high-temperature end 5 is large, and should only cause controller 100 to control the transport path to be set in the first mode or the third mode when the target amount of heat transport from low-temperature end 6 to high-temperature end 5 is small. This allows magnetic refrigerator 1 to perform an optimal magnetic refrigeration operation in accordance with the environment.

The third mode is not limited to a configuration in which magneto-thermal containers 11 and 12 are selected and connected in series. In magnetic refrigerator 1, a plurality of arbitrary adjacent magneto-thermal containers can be connected in series between high-temperature end 5 and low-temperature end 6. For example, a valve may be added to pipe 51 between high-temperature end 5 and high-temperature-side port 11A of magneto-thermal container 11. In this case, magnetic refrigerator 1 can also select and connect magneto-thermal containers 12 and 13 in series. Further, magnetic refrigerator 1 may have a configuration in which the third mode in which a plurality of arbitrary adjacent magneto-thermal containers are connected in series and the second mode in which a plurality of magneto-thermal containers are connected in parallel are adopted on the same system. For example, in magnetic refrigerator 1, magneto-thermal containers 11 and 12 may be selected and connected in series between high-temperature end 5 and low-temperature end 6, and also, magneto-thermal containers 11 and 12 connected in series and magneto-thermal container 13 may be connected in series between high-temperature end 5 and low-temperature end 6.

Figure 13:
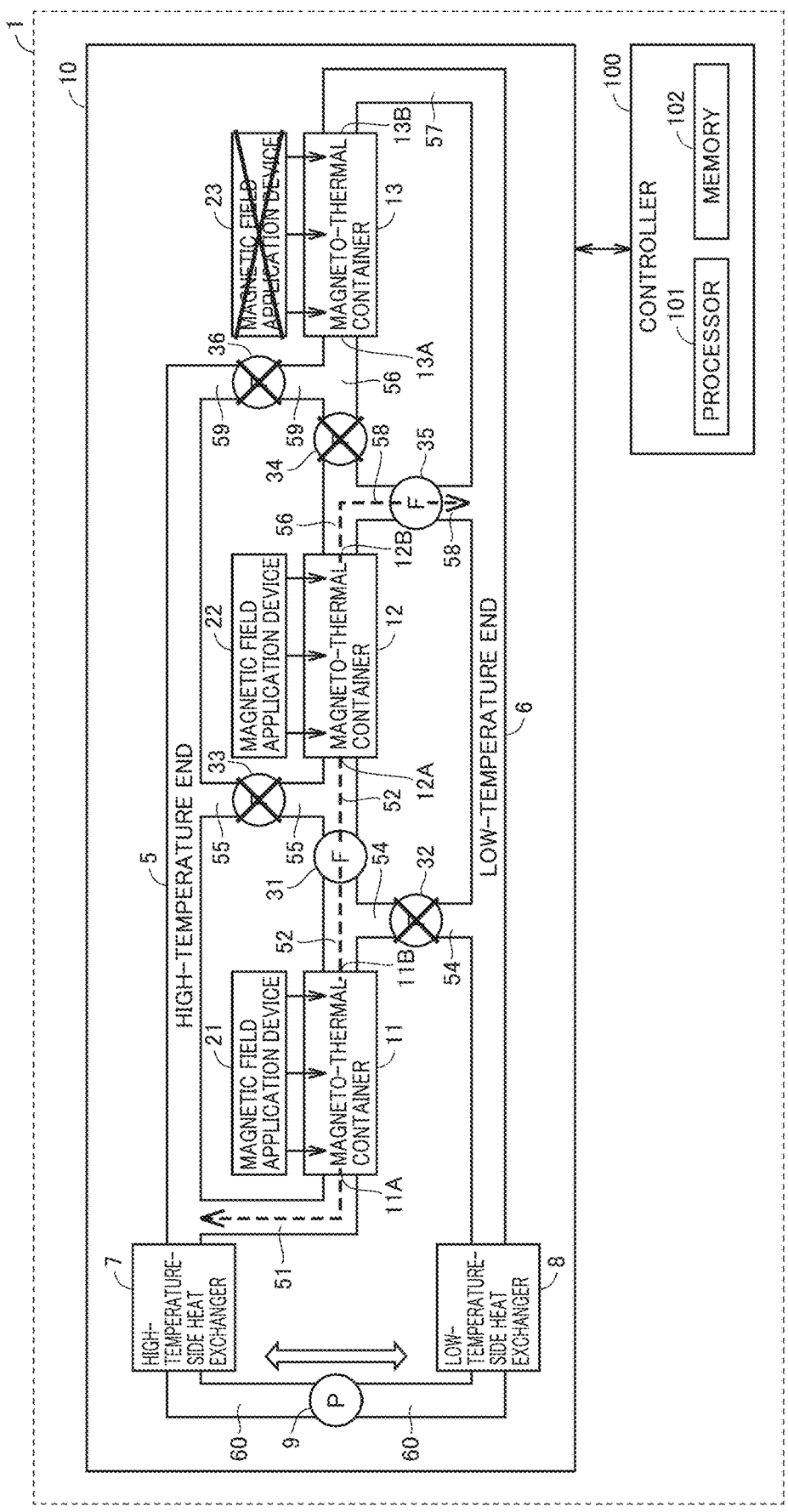
FIG. 13 is a diagram for illustrating a manner in which an operation of an unused magnetic field application device is stopped in the magnetic refrigerator according to the second embodiment.

FIG. 13 is a diagram for illustrating a manner in which an operation of an unused magnetic field application device is stopped in magnetic refrigerator 1 according to the second embodiment. In the magneto-thermal container disconnected from high-temperature end 5 and low-temperature end 6, the flow of the heat transport medium caused by pump 9 does not occur, and thus, the magnetic refrigeration operation is not performed. Accordingly, magnetic refrigerator 1 may stop the operation of an unused magnetic field application device so as to prevent occurrence of power loss caused by application of a magnetic field by the magnetic field application device. For example, in the third mode, the heat transport medium does not flow through magneto-thermal container 13, and thus, magnetic refrigerator 1 may stop the operation of magnetic field application device 23 so as to prevent occurrence of power loss caused by application of a magnetic field by magnetic field application device 23 provided in magneto-thermal container 13. Also in magnetic refrigerator 1 according to the first embodiment shown in FIG. 4, the operation of magnetic field application device 22 may be stopped so as to prevent occurrence of power loss caused by application of a magnetic field by magnetic field application device 22 provided in magneto-thermal container 12 in the third mode. In this way, the power loss can be reduced by stopping the application of the magnetic field and the demagnetization by an unused magnetic field application device.

When an electromagnet is used in the magnetic field application device, stopping a power supply of the electromagnet can be one method for stopping the application of the magnetic field and the demagnetization by the magnetic field application device. When a magnet is used in the magnetic field application device, the magnetic field fluctuations generally involve movement of the magnet or a yoke. Thus, also by switching the movement of the magnet or the yoke using a gear or the like, the application of the magnetic field and the demagnetization by the magnetic field application device can be stopped. In particular, in the case where the magnetic field application device is installed so as to sandwich the magneto-thermal container, the magnetic field fluctuations can be reduced by changing the movement position of the magnet or the yoke so as to increase the length in the direction in which the magneto-thermal container is sandwiched. Thus, the power loss can be sufficiently reduced even when the application of the magnetic field and the demagnetization are not completely stopped.

Figure 14:
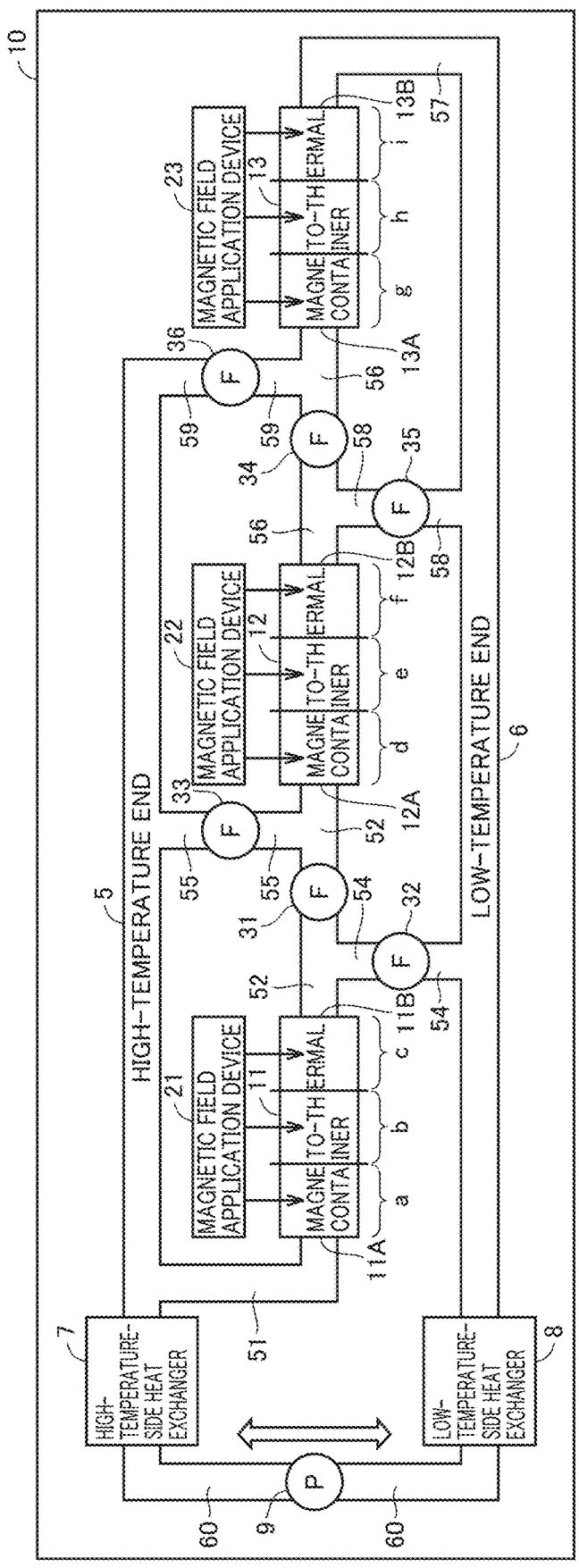
FIG. 14 is a diagram for illustrating a magnetocaloric material filling a magneto-thermal container in the magnetic refrigerator according to the second embodiment.

FIG. 14 is a diagram for illustrating magnetocaloric materials filling magneto-thermal containers 11, 12, and 13 in magnetic refrigerator 1 according to the second embodiment. As shown in FIG. 14, in magnetic refrigerator 1, the magnetocaloric materials are introduced sequentially from the high-temperature end 5 side to the low-temperature end 6 side of the plurality of magneto-thermal containers 11, 12, and 13 connected in series such that the internal temperature characteristics inside each of magneto-thermal containers 11, 12, and 13 are arranged in order from high to low in temperature.

For example, as shown in FIG. 14, a magnetocaloric material "a", a magnetocaloric material "b", and a magnetocaloric material "c" are introduced sequentially from high-temperature-side port 11A to low-temperature-side port 11B in magneto-thermal container 11. Then, a magnetocaloric material "d", a magnetocaloric material "e", and a magnetocaloric material "f" are introduced sequentially from high-temperature-side port 12A to low-temperature-side port 12B in magneto-thermal container 12. Also, a magnetocaloric material "g", a magnetocaloric material "h", and a magnetocaloric material "i" are introduced sequentially from high-temperature-side port 13A to low-temperature-side port 13B in magneto-thermal container 13. Note that each of magneto-thermal containers 11, 12, and 13 may be filled with one type of magnetocaloric material. For example, magneto-thermal container 11 may be filled with magnetocaloric material "a", magneto-thermal container 12 may be filled with magnetocaloric material "b", and magneto-thermal container 13 may be filled with magnetocaloric material "c".

Figure 15:
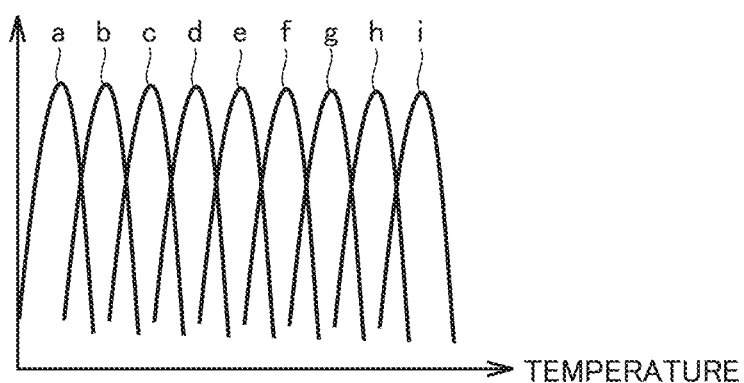
FIG. 15 is a diagram showing temperature characteristics of the magnetocaloric material in the magnetic refrigerator according to the second embodiment.

FIG. 15 is a diagram showing temperature characteristics of the magnetocaloric material in magnetic refrigerator 1 according to the second embodiment. In the temperature characteristics shown in FIG. 15, as the value on the vertical axis is larger, the performance of the magnetocaloric material is higher. In general, for the magnetocaloric material, the temperature at which the highest performance is exhibited is fixed, and the operating temperature range in which the performance is expected to be exhibited is fixed. As to the combination of a plurality of magnetocaloric materials introduced into a magneto-thermal container, it is desirable that the plurality of magnetocaloric materials are combined such that their temperature characteristics overlap with each other. This is because of the following reason. Specifically, the temperature distribution inside the magneto-thermal container is continuous. Thus, if the temperature characteristics of a plurality of magnetocaloric materials filling the magneto-thermal container do not overlap with each other, a region in which the magnetocaloric material does not function occurs inside the magneto-thermal container, with the result that the performance of the magnetic refrigeration operation deteriorates.

The performance peak value and the operating temperature range in terms of the temperature characteristics are different depending on the type of the magnetocaloric material. For example, in the case of a magnetocaloric material of lanthanum iron silicon, the performance peak value is high while the operating temperature range is narrow. In the case of a magnetocaloric material of gadolinium metal, the performance peak value is low while the operating temperature range is wide. A plurality of different types of magnetocaloric materials as mentioned above may be combined. For example, in a magneto-thermal container corresponding to a temperature range in which use frequency is high, a magnetocaloric material having a high peak value and a narrow operating temperature range may be used. In a magneto-thermal container corresponding to a temperature range in which use frequency is low, a magnetocaloric material having a low peak value and a wide operating temperature range may be used. Thereby, in the case of a magneto-thermal container corresponding to a temperature range in which use frequency is high, a plurality of magnetocaloric materials having narrow operating temperature ranges but still exhibiting high peak values are introduced to thereby exhibit high performance. In the case of a magneto-thermal container corresponding to a temperature range in which use frequency is low, only one magnetocaloric material exhibiting a low peak value but still having a wide operating temperature range is introduced to thereby enable a small-sized magneto-thermal container.

Not only in magnetic refrigerator 1 according to the second embodiment but also in magnetic refrigerator 1 according to the first embodiment, the plurality of magneto-thermal containers 11 and 12 may be filled with magnetocaloric materials from the high temperature-side to the low temperature-side in order from a type of magnetocaloric material having a higher operating temperature to a type of magnetocaloric material having a lower operating temperature.

Figure 16:
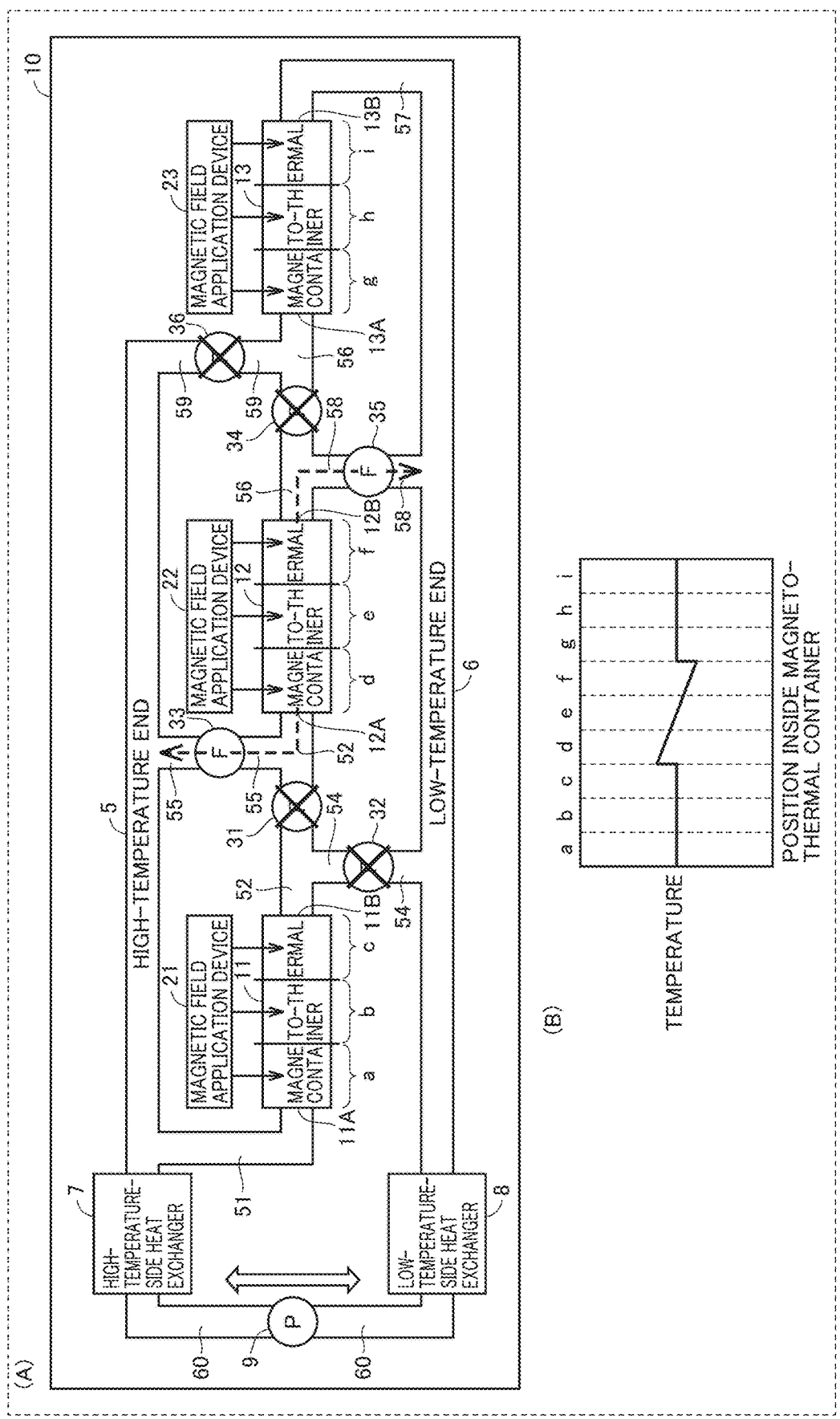
FIG. 16 is a diagram for illustrating a temperature distribution inside the magneto-thermal containers that occurs when the transport path of the heat transport medium is switched in the magnetic refrigerator according to the second embodiment.
Figure 17:
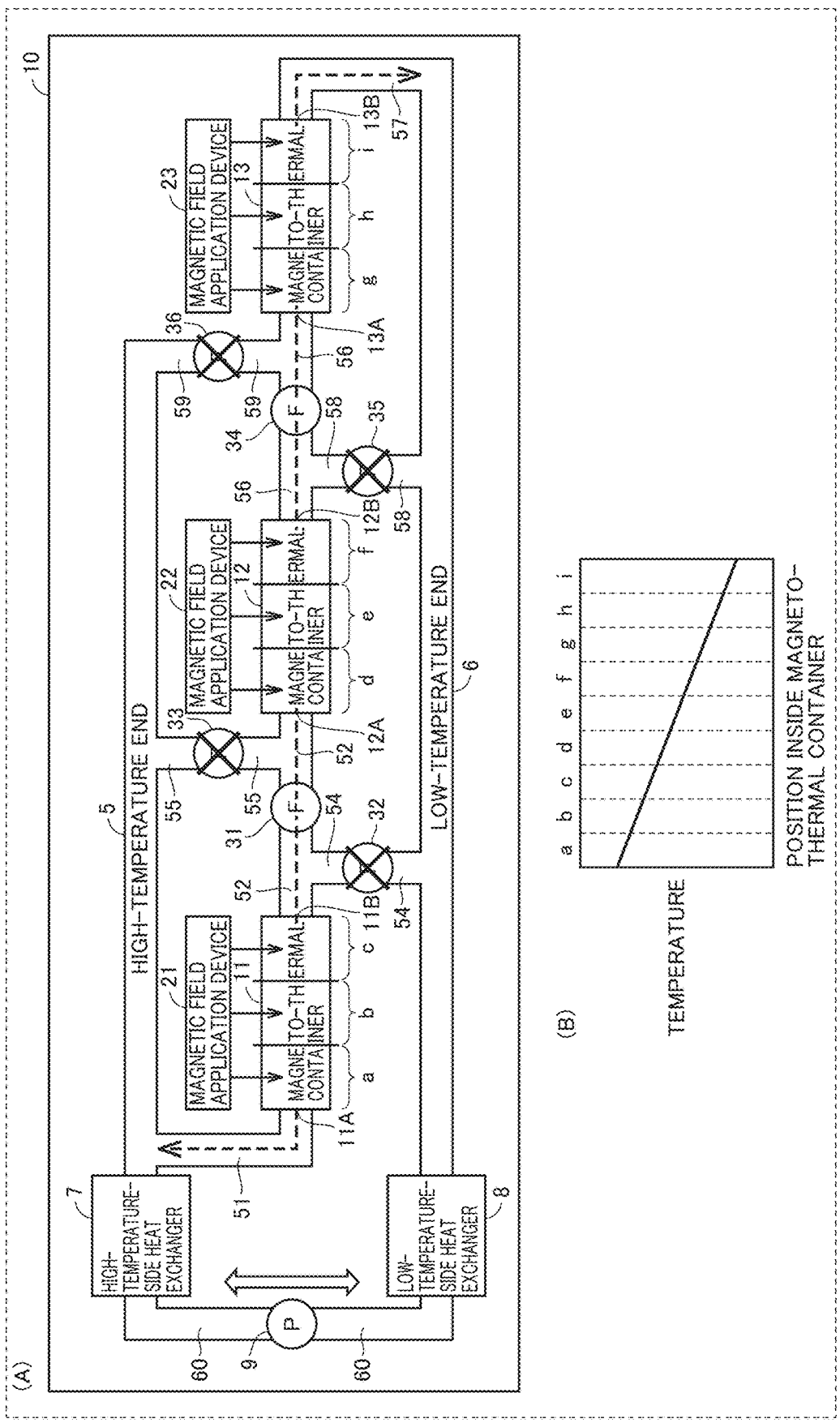
FIG. 17 is a diagram for illustrating the temperature distribution inside the magneto-thermal containers that occurs when the transport path of the heat transport medium is switched in the magnetic refrigerator according to the second embodiment.

FIGS. 16 and 17 each are a diagram for illustrating a temperature distribution inside magneto-thermal containers 11, 12, and 13 that occurs when the transport path of the heat transport medium is switched in magnetic refrigerator 1 according to the second embodiment. When the operating temperature of the magnetocaloric material in the magneto-thermal container is not equal to the actual temperature inside the magneto-thermal container, even application of a magnetic field to the magneto-thermal container does not cause heat generation or heat absorption resulting from the magnetocaloric effect, with the result that power loss may occur. For example, in the initial state shown in FIG. 16(A), when the actual temperature in each of magneto-thermal containers 11 and 13 is different from the operating temperature of the magnetocaloric material introduced therein, magnetic refrigerator 1 controls each of valves 31, 32, 34, and 36 to be in a closed state to disconnect the flow path extending through magneto-thermal containers 11 and 13, to thereby prevent the magnetic refrigeration operation from being performed in each of magneto-thermal containers 11 and 13, so as to prevent occurrence of any power loss. As shown in FIG. 16(B), in each of magneto-thermal containers 11 and 13, the temperature of the magnetocaloric material is constant.

On the other hand, when the actual temperature in magneto-thermal container 12 is equal to the operating temperature of the magnetocaloric material filling magneto-thermal container 12, magnetic refrigerator 1 controls each of valves 33 and 35 to be in an opened state to open the flow path extending through magneto-thermal container 12, to thereby perform a magnetic refrigeration operation in magneto-thermal container 12. When the magnetic refrigeration operation is performed in magneto-thermal container 12 for a certain period of time, as shown in FIG. 16(B), a temperature distribution occurs inside magneto-thermal container 12 in such a manner that high-temperature-side port 12A is high in temperature and low-temperature-side port 12B is low in temperature.

Then, as shown in FIG. 17(A), magnetic refrigerator 1 controls each of valves 31 and 34 to be in an opened state, and controls each of valves 32, 33, 35, and 36 to be in a closed state, to thereby connect magneto-thermal containers 11, 12, and 13 in series between high-temperature end 5 and low-temperature end 6, and then performs the magnetic refrigeration operation in each of magneto-thermal containers 11, 12, and 13. When the magnetic refrigeration operation is performed for a certain period of time in each of magneto-thermal containers 11, 12, and 13, heat conduction occurs between the heat transport medium at low-temperature-side port 11B of magneto-thermal container 11 and the heat transport medium at high-temperature-side port 12A of magneto-thermal container 12. Thereby, the temperature at low-temperature-side port 11B of magneto-thermal container 11 becomes higher than that in the initial state, and thus, the actual temperature in magneto-thermal container 11 and the operating temperature of the magnetocaloric material filling magneto-thermal container 11 become equal to each other. Further, heat conduction occurs between the heat transport medium at high-temperature-side port 13A of magneto-thermal container 13 and the heat transport medium at low-temperature-side port 12B of magneto-thermal container 12. Thereby, the temperature at high-temperature-side port 13A of magneto-thermal container 13 becomes lower than that in the initial state, and thus, the actual temperature in magneto-thermal container 13 and the operating temperature of the magnetocaloric material filling magneto-thermal container 13 become equal to each other.

As shown in FIG. 17(B), since the operating temperature of the magnetocaloric material in each of magneto-thermal containers 11, 12, and 13 is equal to the temperature of the heat transport medium, all magneto-thermal containers 11, 12, and 13 can generate heat and absorb heat by the magnetic refrigeration operation. Thereby, magnetic refrigerator 1 can cause a temperature distribution having a relatively large temperature difference between high-temperature end 5 and low-temperature end 6 among magneto-thermal containers 11, 12, and 13.

Third Embodiment

Figure 18:
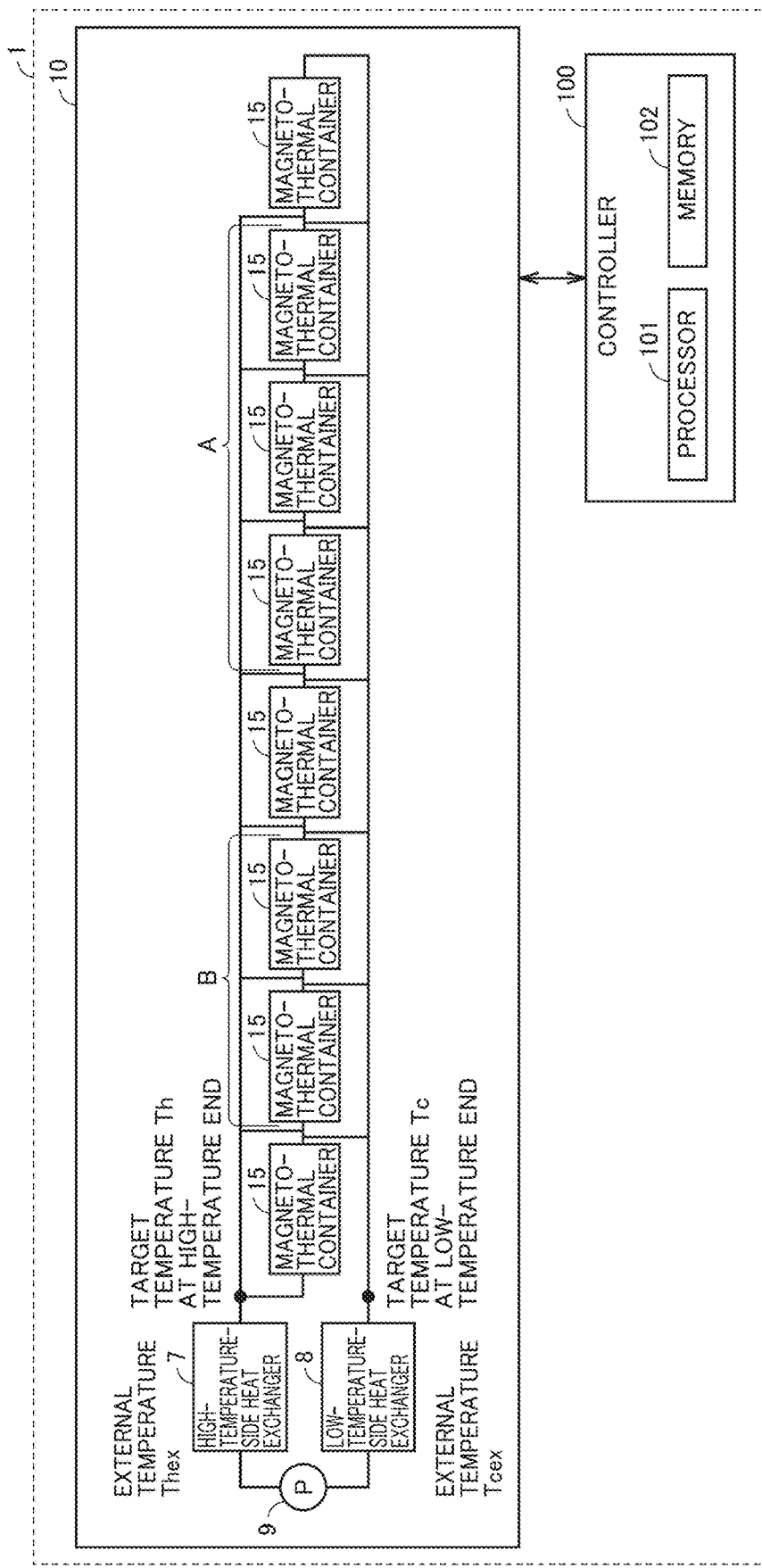
FIG. 18 is a diagram showing a configuration of a magnetic refrigerator according to a third embodiment.
Figure 19:
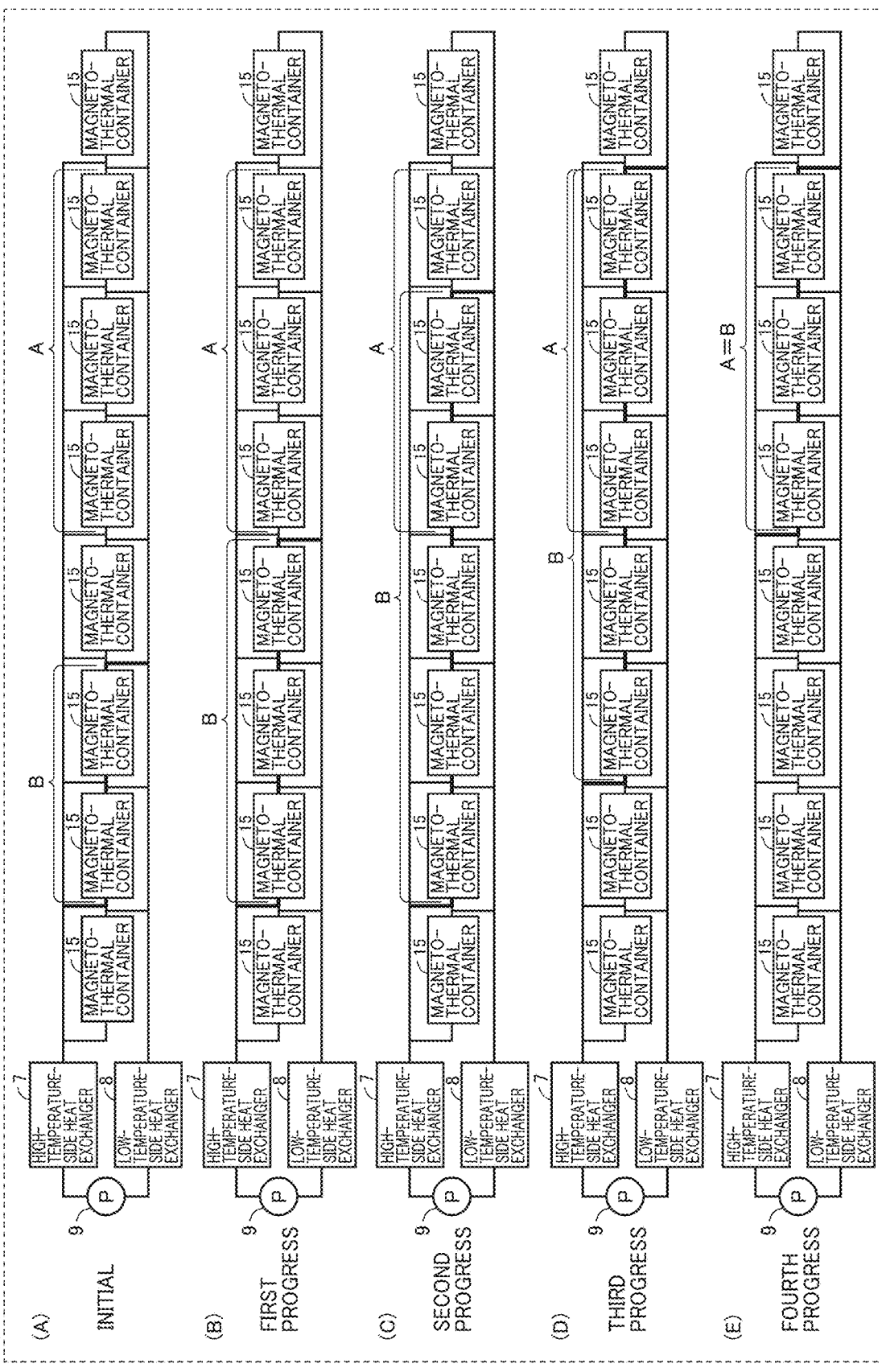
FIG. 19 is a diagram for illustrating a magneto-thermal container to which a magnetic field is applied when a target magneto-thermal container is determined in the magnetic refrigerator according to the third embodiment.
Figure 20:
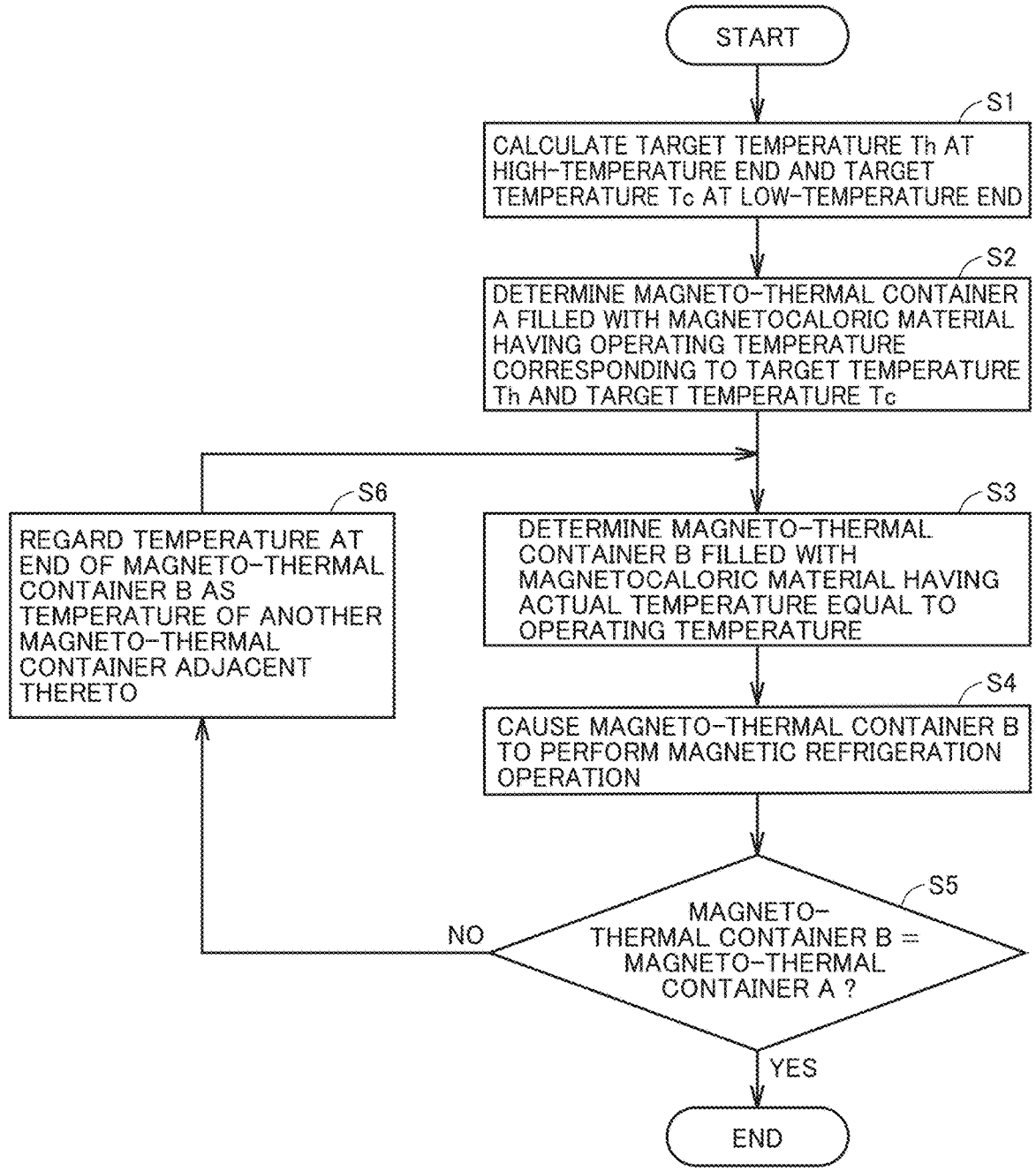
FIG. 20 is a flowchart related to a process for determining the target magneto-thermal container in the magnetic refrigerator according to the third embodiment.

Referring to FIGS. 18 to 20, a magnetic refrigerator 1 according to the third embodiment will be hereinafter described. The following describes only portions of magnetic refrigerator 1 according to the third embodiment that are different from those in magnetic refrigerator 1 according to each of the first and second embodiments.

FIG. 18 is a diagram showing a configuration of magnetic refrigerator 1 according to the third embodiment. As shown in FIG. 18, in magnetic refrigerator 1, a plurality of (eight in this example) magneto-thermal containers 15 are arranged to be connectable in series and in parallel through a plurality of pipes.

An amount of heat transport Q[W] extracted to the external medium by high-temperature-side heat exchanger 7 is substantially determined by the characteristics of high-temperature-side heat exchanger 7, the temperature at high-temperature end 5, the external temperature on the high-temperature-side heat exchanger 7 side, and the like. High-temperature-side heat exchanger 7 transports the heat, which is proportional to the temperature difference between the temperature at high-temperature end 5 and the external temperature, from the heat transport medium at high-temperature end 5 to the outside. Assuming that the external temperature on the high-temperature-side heat exchanger 7 side is defined as Thex[K] and the thermal resistance of high-temperature-side heat exchanger 7 is defined as θh[K/W], a target temperature Th[K] at high-temperature end 5 corresponding to amount of heat transport Q[W] to the outside is expressed by the following equation (1).

[Equation 1]

Target Temperature $Th[K] =$ (1)

amount of heat transport $Q[W]*$ thermal resistance $\theta h[K/W] +$ external temperature $Thex[K]$ Amount of heat transport Q[W] extracted to the external medium by low-temperature-side heat exchanger 8 is substantially determined by the characteristics of low-temperature-side heat exchanger 8, the temperature at low-temperature end 6, the external temperature on the low-temperature-side heat exchanger 8 side, and the like. Low-temperature-side heat exchanger 8 transports the heat, which is proportional to the temperature difference between the temperature at low-temperature end 6 and the external temperature, from the heat transport medium at low-temperature end 6 to the outside. Assuming that the external temperature on the low-temperature-side heat exchanger 8 side is defined as Tcex[K] and the thermal resistance of low-temperature-side heat exchanger 8 is defined as θc[K/W], a target temperature Tc[K] at low-temperature end 6 corresponding to amount of heat transport Q[W] to the outside is expressed by the following equation (2).

[Equation 2]

$$\text{Target Temperature } Tc[K] = \\ -(\text{amount of heat transport } Q[W] * \text{thermal resistance } \theta c[K/W]) + \\ \text{external temperature } Tcex[K] \qquad (2)$$

From among the plurality of magneto-thermal containers 15, controller 100 of magnetic refrigerator 1 finds target magneto-thermal container 15 filled with a magnetocaloric material having an operating temperature close to each of a calculated target temperature Th at high-temperature end 5 and a calculated target temperature Tc at low-temperature end 6, and then, brings the actual temperature in magneto-thermal container 15 close to the operating temperature of the magnetocaloric material filling this magneto-thermal container 15 such that the performance of the magnetocaloric material filling this magneto-thermal container 15 can be exhibited. The following describes a process of determining a target magneto-thermal container by magnetic refrigerator 1.

FIG. 19 is a diagram for illustrating a magneto-thermal container to which a magnetic field is applied when a target magneto-thermal container is determined in magnetic refrigerator 1 according to the third embodiment. As shown in FIG. 19(A), in the initial state, magnetic refrigerator 1 determines at least one magneto-thermal container A filled with a magnetocaloric material having an operating temperature close to each of target temperature Th at high-temperature end 5 and target temperature Tc at low-temperature end 6. At this point in time, the actual temperature in at least one magneto-thermal container A is not equal to the operating temperature of the magnetocaloric material filling this magneto-thermal container A.

Thus, from among at least one other magneto-thermal container 15 filled with the magnetocaloric material having an operating temperature close to the operating temperature of the magnetocaloric material filling magneto-thermal container A, magnetic refrigerator 1 determines at least one magneto-thermal container B having an actual temperature equal to the operating temperature of the magnetocaloric material introduced therein. For example, from among at least one other magneto-thermal container 15 filled with the magnetocaloric material having an operating temperature close to the operating temperature of the magnetocaloric material filling magneto-thermal container A, magnetic refrigerator 1 determines magneto-thermal container B as magneto-thermal container 15 having an actual temperature equal to the operating temperature of the magnetocaloric material filling this magneto-thermal containers 15. As shown in FIG. 19(A), in the initial state, at least one magneto-thermal container B does not overlap with at least one magneto-thermal container A.

Magnetic refrigerator 1 switches the transport path to allow the heat transport medium to be transported through magneto-thermal container B determined in the initial state, and performs the magnetic refrigeration operation in magneto-thermal container B for a certain period of time. Thereby, as described with reference to FIGS. 16 and 17, the temperature of the heat transport medium in magneto-thermal container B is thermally conducted to other adjacent magneto-thermal container 15 that has not yet been determined as magneto-thermal container B. Thus, the actual temperature inside other adjacent magneto-thermal container 15 that has not yet been determined as magneto-thermal container B and the operating temperature of the magnetocaloric material filling this other magneto-thermal container 15 become equal to each other.

As shown in FIG. 19(B), in the first progress, magnetic refrigerator 1 again determines magneto-thermal container B as magneto-thermal container 15 having an actual temperature equal to the operating temperature of the magnetocaloric material filling this magneto-thermal container 15. Magnetic refrigerator 1 switches the transport path to allow the heat transport medium to be transported through magneto-thermal container B determined in the first progress, and then performs a magnetic refrigeration operation in magneto-thermal container B for a certain period of time. Thereby, the temperature of the heat transport medium in magneto-thermal container B is thermally conducted to other adjacent magneto-thermal container 15 that has not yet been determined as magneto-thermal container B, so that the actual temperature inside this other magneto-thermal container 15 and the operating temperature of the magnetocaloric material filling this other magneto-thermal container 15 become equal to each other. As shown in FIG. 19(B), in the first progress, at least one magneto-thermal container B does not overlap with at least one magneto-thermal container A.

As shown in FIG. 19(C), in the second progress, magnetic refrigerator 1 again determines magneto-thermal container B as magneto-thermal container 15 having an actual temperature equal to the operating temperature of the magnetocaloric material filling this magneto-thermal container 15. Magnetic refrigerator 1 switches the transport path to allow the heat transport medium to be transported through magneto-thermal container B determined in the second progress, and then performs the magnetic refrigeration operation in magneto-thermal container B for a certain period of time. Thereby, the temperature of the heat transport medium in magneto-thermal container B is thermally conducted to other adjacent magneto-thermal container 15 that has not yet been determined as magneto-thermal container B, so that the actual temperature inside this other magneto-thermal container 15 and the operating temperature of the magnetocaloric material filling this other magneto-thermal container 15 become equal to each other. As shown in FIG. 19(C), in the second progress, some of at least one magneto-thermal container B overlap with at least one magneto-thermal container A.

As shown in FIG. 19(D), in the third progress, magnetic refrigerator 1 again determines magneto-thermal container B as magneto-thermal container 15 having an actual temperature equal to the operating temperature of the magnetocaloric material filling this magneto-thermal container 15. Magnetic refrigerator 1 switches the transport path to allow the heat transport medium to be transported through magneto-thermal container B determined in the third progress, and then performs the magnetic refrigeration operation in magneto-thermal container B for a certain period of time. Thereby, the temperature of the heat transport medium in magneto-thermal container B is thermally conducted to other adjacent magneto-thermal container 15 that has not yet been determined as magneto-thermal container B, so that the actual temperature inside this other magneto-thermal container 15 and the operating temperature of the magnetocaloric material filling this other magneto-thermal container 15 become equal to each other. As shown in FIG. 19(D), in the third progress, some of at least one magneto-thermal container B overlap with at least one magneto-thermal container A. Further, in the third progress, the number of overlapping magneto-thermal containers 15 between at least one magneto-thermal container B and at least one magneto-thermal container A is larger than that in the second progress.

As shown in FIG. 19(E), in the fourth progress, magnetic refrigerator 1 again determines magneto-thermal container B as magneto-thermal container 15 having an actual temperature equal to the operating temperature of the magnetocaloric material filling this magneto-thermal container 15. Magnetic refrigerator 1 switches the transport path to allow the heat transport medium to be transported through magneto-thermal container B determined in the fourth progress, and then performs the magnetic refrigeration operation in magneto-thermal container B for a certain period of time. Thereby, the temperature of the heat transport medium in magneto-thermal container B is thermally conducted to other adjacent magneto-thermal container 15 that has not yet been determined as magneto-thermal container B, so that the actual temperature inside this other magneto-thermal container 15 and the operating temperature of the magnetocaloric material filling this other magneto-thermal container 15 become equal to each other. As shown in FIG. 19(E), in the fourth progress, at least one magneto-thermal container B and at least one magneto-thermal container A completely overlap with each other.

In this way, magnetic refrigerator 1 first determines target magneto-thermal container A filled with a magnetocaloric material having the operating temperature close to each of target temperature Th at high-temperature end 5 and target temperature Tc at low-temperature end 6, then determines magneto-thermal container B as magneto-thermal container 15 having an actual temperature equal to the operating temperature of the magnetocaloric material filling this magneto-thermal container 15, and switches magneto-thermal container B until the determined magneto-thermal container B completely overlaps with magneto-thermal container A. Thereby, magnetic refrigerator 1 allows the actual temperature inside the target magneto-thermal container A to be equal to the operating temperature of the magnetocaloric material filling this magneto-thermal container A, so that the performance of the magnetocaloric material filling this magneto-thermal container A can be exhibited.

FIG. 20 is a flowchart related to a process for determining the target magneto-thermal container in magnetic refrigerator 1 according to the third embodiment. The process illustrated in FIG. 20 is executed by controller 100. In FIG. 20, "S" is used as an abbreviation for "STEP".

As shown in FIG. 20, controller 100 calculates target temperature Th at high-temperature end 5 and target temperature Tc at low-temperature end 6 (S1). Controller 100 determines at least one magneto-thermal container A filled with a magnetocaloric material having an operating temperature corresponding to each of target temperature Th at high-temperature end 5 and target temperature Tc at low-temperature end 6 (S2).

From among at least one other magneto-thermal container 15 filled with the magnetocaloric material having the operating temperature close to the operating temperature of the magnetocaloric material filling magneto-thermal container A, controller 100 determines at least one magneto-thermal container B having an actual temperature equal to the operating temperature of the magnetocaloric material introduced therein (S3). Controller 100 causes magneto-thermal container B to perform a magnetic refrigeration operation (S4).

Controller 100 determines whether or not magneto-thermal container B completely overlaps with magneto-thermal container A (S5). When magneto-thermal container B completely overlaps with magneto-thermal container A (YES in S5), controller 100 allows the actual temperature inside target magneto-thermal container A and the operating temperature of the magnetocaloric material filling this magneto-thermal container A to be equal to each other. Thus, controller 100 can appropriately perform the magnetic refrigeration operation using magneto-thermal container A while exhibiting the performance of the magnetocaloric material filling magneto-thermal container A.

On the other hand, when magneto-thermal container B does not completely overlap with magneto-thermal container A (NO in S5), controller 100 regards the temperature at the end of magneto-thermal container B as the temperature of another magneto-thermal container adjacent to magneto-thermal container B (S6). Then, from among at least one other magneto-thermal container 15 filled with the magnetocaloric material having the operating temperature close to the operating temperature of the magnetocaloric material filling magneto-thermal container A, controller 100 again determines at least one magneto-thermal container B having an actual temperature equal to the operating temperature of the magnetocaloric material introduced therein (S3). Controller 100 subsequently repeats the present process until magneto-thermal container B completely overlaps with magneto-thermal container A in S5.

In the example shown in FIG. 19, when the temperature on the high-temperature end side in magneto-thermal container B is higher than target temperature Th in a transient state such as "initial" and the "first progress" to the "fourth progress", the temperature of high-temperature-side heat exchanger 7 with respect to the outside may become excessively high. Thus, in an actual operation, the temperature on the high-temperature end side in magneto-thermal container B needs to be kept within a temperature range allowable by high-temperature-side heat exchanger 7 in the transient state. Accordingly, in the process shown in FIG. 20, controller 100 may set an upper limit value for the temperature on the high-temperature end side of magneto-thermal container B, and add a process of comparing the temperature on the high-temperature end side of magneto-thermal container B with the upper limit value.

When the temperature at high-temperature end 5 is as high as possible within an allowable range and the temperature at low-temperature end 6 is as low as possible within an allowable range, the amount of heat transport from the heat exchanger to the outside increases to thereby raise a rate at which the target temperature is reached. Depending on how to select magneto-thermal container B, there may be an influence upon the time taken until magneto-thermal container B overlaps with magneto-thermal container A, but magneto-thermal container B finally overlaps with magneto-thermal container A.

Fourth Embodiment

Figure 21:
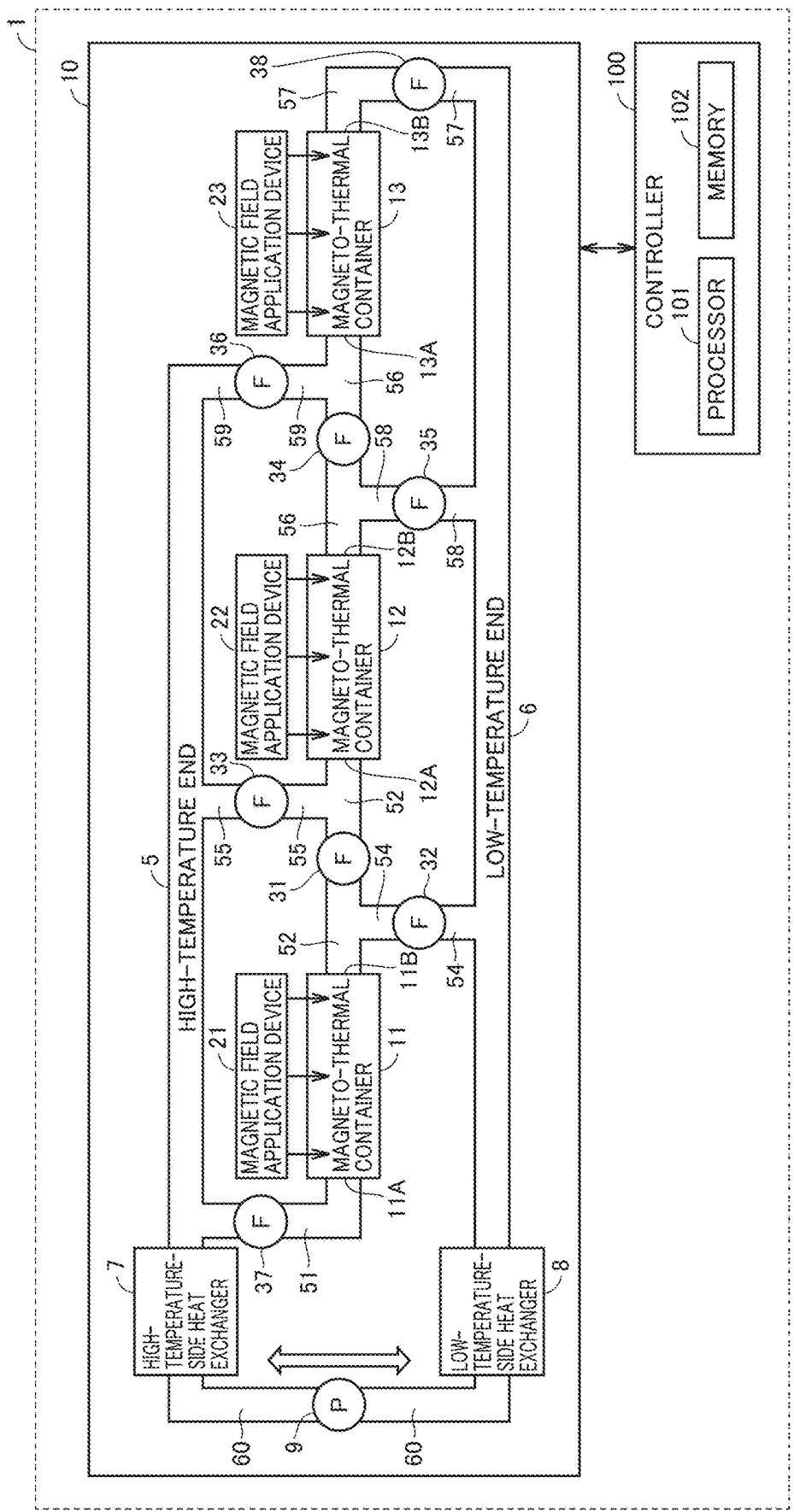
FIG. 21 is a diagram showing a configuration of a magnetic refrigerator according to a fourth embodiment.
Figure 22:
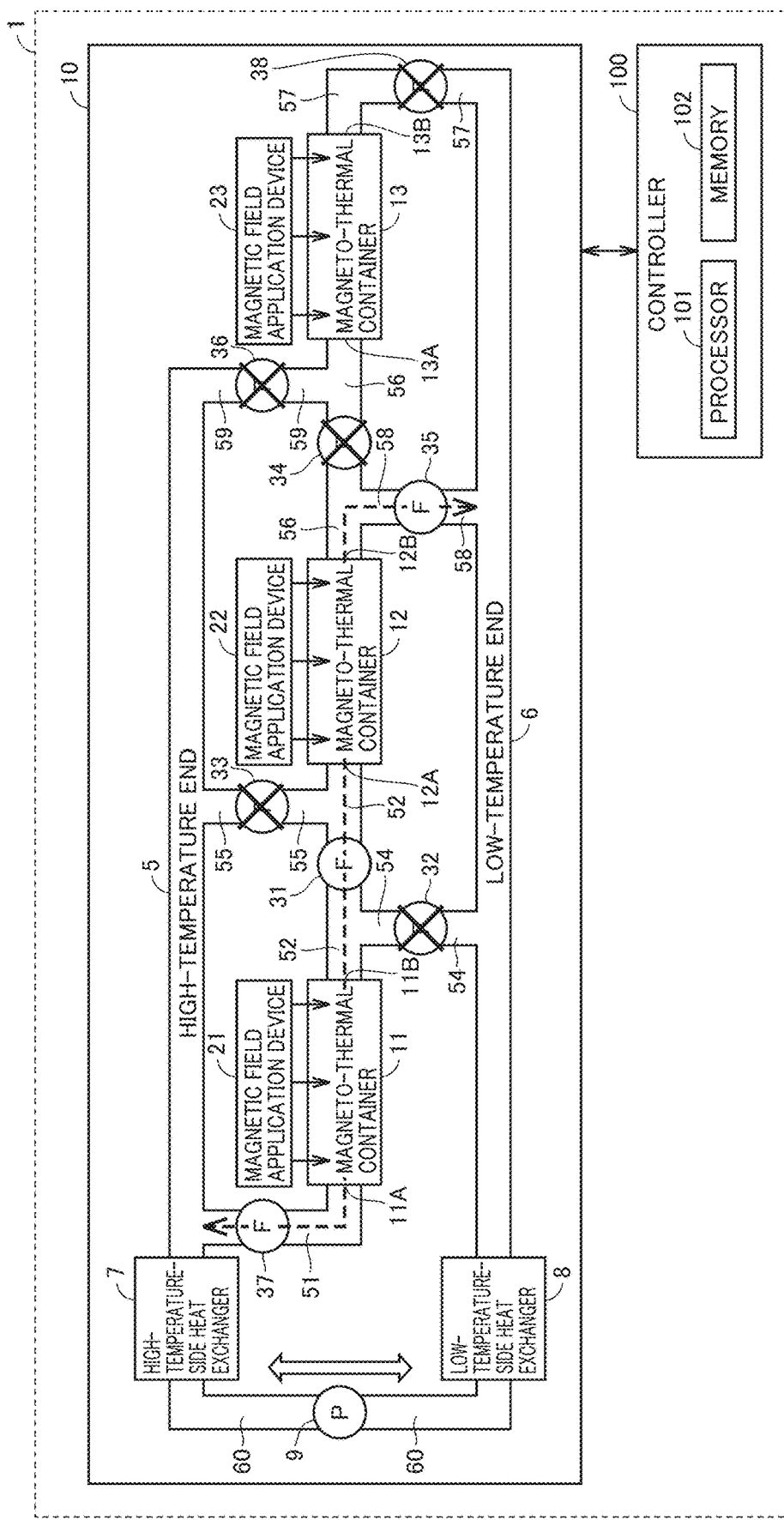
FIG. 22 is a diagram for illustrating switching of a transport path of a heat transport medium in the magnetic refrigerator according to the fourth embodiment.

Referring to FIGS. 21 and 22, a magnetic refrigerator 1 according to the fourth embodiment will be hereinafter described. The following describes only portions of magnetic refrigerator 1 according to the fourth embodiment that are different from those in magnetic refrigerator 1 according to each of the first to third embodiments.

FIG. 21 is a diagram showing a configuration of magnetic refrigerator 1 according to the fourth embodiment. As shown in FIG. 21, magnetic refrigerator 1 further includes valves 37 and 38 in magnetic refrigeration circuit 10.

Valve 37 is provided in pipe 51 connecting high-temperature-side port 11A of magneto-thermal container 11 and high-temperature end 5, and switches pipe 51 between an opened state and a closed state under the control of controller 100. Valve 38 is provided in pipe 57 connecting low-temperature-side port 13B of magneto-thermal container 13 and low-temperature end 6, and switches pipe 57 between an opened state and a closed state under the control of controller 100.

FIG. 22 is a diagram for illustrating switching of a transport path of a heat transport medium in magnetic refrigerator 1 according to the fourth embodiment. As shown in FIG. 22, when the transport path is controlled to be set in the third mode described with reference to FIG. 11, magnetic refrigerator 1 controls valve 37 to set pipe 51 to be in an opened state. In other words, when one of valves 31 and 32 is in an opened state that are adjacent to magneto-thermal container 11 connected to pipe 51 switched by valve 37 between the opened state and the closed state, magnetic refrigerator 1 controls valve 37 to set pipe 51 to be in an opened state in order to perform the magnetic refrigeration operation using magneto-thermal container 11. On the other hand, when valves 31 and 32 each are in a closed state, magnetic refrigerator 1 controls valve 37 to set pipe 51 to be in a closed state since it does not perform a magnetic refrigeration operation using magneto-thermal container 11.

Regardless of the presence or absence of valve 37, the state of connection between magneto-thermal container 11 and high-temperature end 5 can be controlled by valves 31 and 32. However, when the magnetic refrigeration operation is not performed using magneto-thermal container 11, magnetic refrigerator 1 controls valve 37 to be in a closed state and thereby can more reliably disconnect magneto-thermal container 11 from high-temperature end 5. Thereby, magnetic refrigerator 1 can prevent unnecessary mixing of heat, which is caused by the heat transport medium flowing into high-temperature end 5 from magneto-thermal container 11 that does not perform a magnetic refrigeration operation. Further, in the state in which valves 31 and 32 each are controlled to be in a closed state, magneto-thermal container 11 is disconnected from high-temperature end 5, and thus, magnetic refrigerator 1 can prevent the heat transport medium introduced in high-temperature end 5 from flowing out to magnetic refrigeration circuit 10 when magneto-thermal container 11 is replaced for maintenance or the like.

When one of valves 34 and 36 is in an opened state that are adjacent to magneto-thermal container 13 connected to pipe 57 switched by valve 38 between the opened state and the closed state, magnetic refrigerator 1 controls valve 38 to set pipe 57 to be in an opened state in order to perform the magnetic refrigeration operation using magneto-thermal container 13. On the other hand, as shown in FIG. 22, when valves 34 and 36 each are in a closed state, magnetic refrigerator 1 controls valve 38 to set pipe 57 to be in a closed state since it does not perform a magnetic refrigeration operation using magneto-thermal container 13.

Regardless of the presence or absence of valve 38, the state of connection between magneto-thermal container 13 and low-temperature end 6 can be controlled by valves 34 and 36. However, when the magnetic refrigeration operation is not performed using magneto-thermal container 13, magnetic refrigerator 1 controls valve 38 to be in a closed state and thereby can more reliably disconnect magneto-thermal container 13 from low-temperature end 6. Thereby, magnetic refrigerator 1 can prevent unnecessary mixing of heat, which is caused by the heat transport medium flowing into low-temperature end 6 from magneto-thermal container 13 that does not perform a magnetic refrigeration operation. Further, in the state in which valves 34 and 36 each are controlled to be in a closed state, magneto-thermal container 13 is disconnected from low-temperature end 6, and thus, magnetic refrigerator 1 can prevent the heat transport medium introduced in low-temperature end 6 from flowing out to magnetic refrigeration circuit 10 when magneto-thermal container 13 is replaced for maintenance or the like.

Fifth Embodiment

Figure 23:
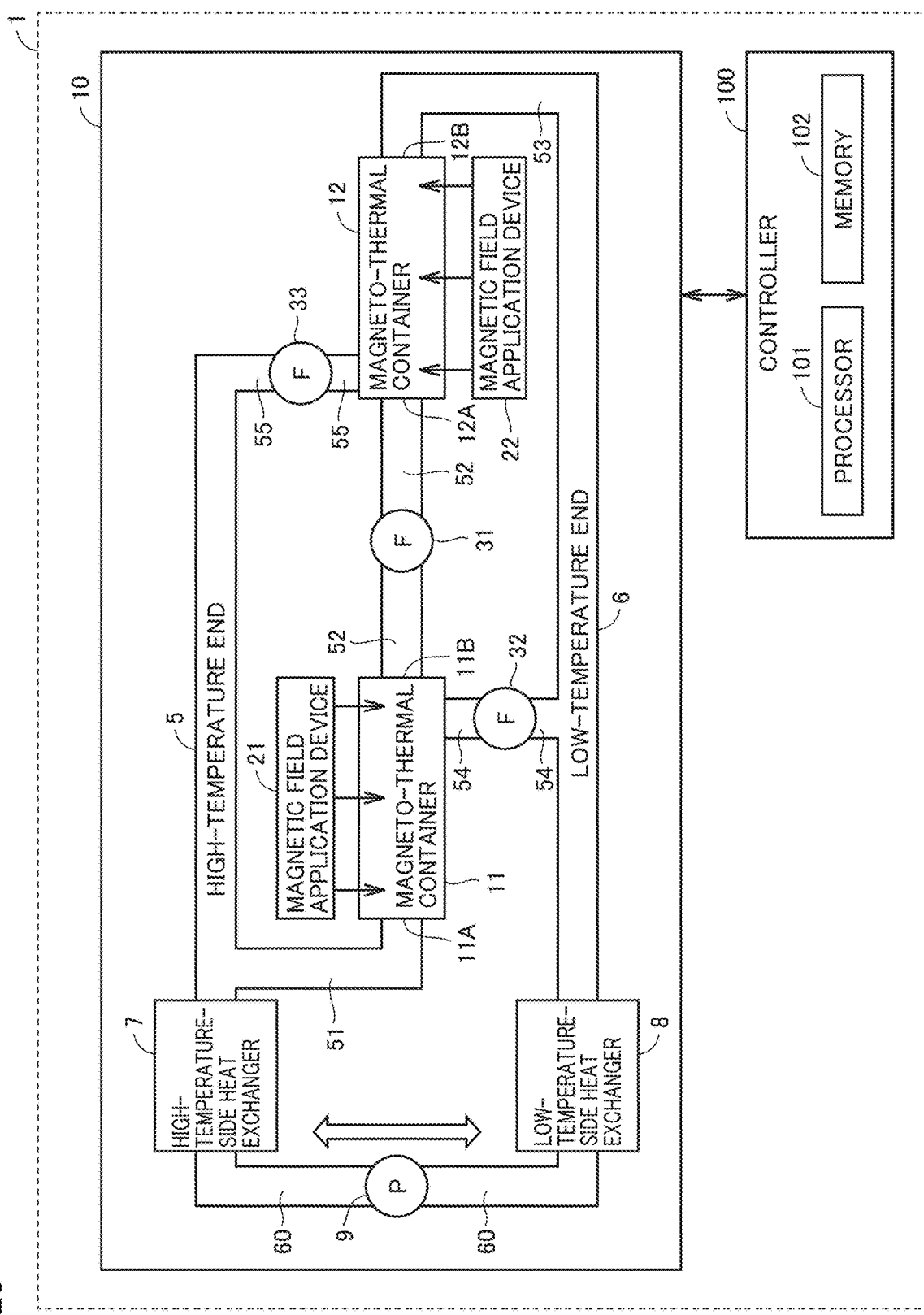
FIG. 23 is a diagram showing a configuration of a magnetic refrigerator according to a fifth embodiment.

Referring to FIG. 23, a magnetic refrigerator 1 according to the fifth embodiment will be hereinafter described. The following describes only portions of magnetic refrigerator 1 according to the fifth embodiment that are different from those in magnetic refrigerator 1 according to each of the first to fourth embodiments.

FIG. 23 is a diagram showing a configuration of magnetic refrigerator 1 according to the fifth embodiment. As shown in FIG. 23, magnetic refrigerator 1 is configured such that, in magnetic refrigeration circuit 10, pipe 55 connected to high-temperature end 5 is connected to a side surface of magneto-thermal container 12, and pipe 54 connected to low-temperature end 6 is connected to a side surface of magneto-thermal container 11.

Thereby, in magnetic refrigerator 1, the transport path does not have to branch off from pipe 52 to pipe 54 or 55, so that magnetic refrigeration circuit 10 can be simply configured. Further, in magnetic refrigerator 1, pipe 52 between magneto-thermal containers 11 and 12 can be reduced in length. Thus, when valve 31 provided in pipe 52 is controlled to set pipe 52 to be in an opened state, it is possible to reduce an area in which the magnetocaloric material flows through a portion other than magneto-thermal containers 11 and 12. Thereby, magnetic refrigerator 1 can improve the efficiency of heat transport between magneto-thermal containers 11 and 12.

Sixth Embodiment

Figure 24:
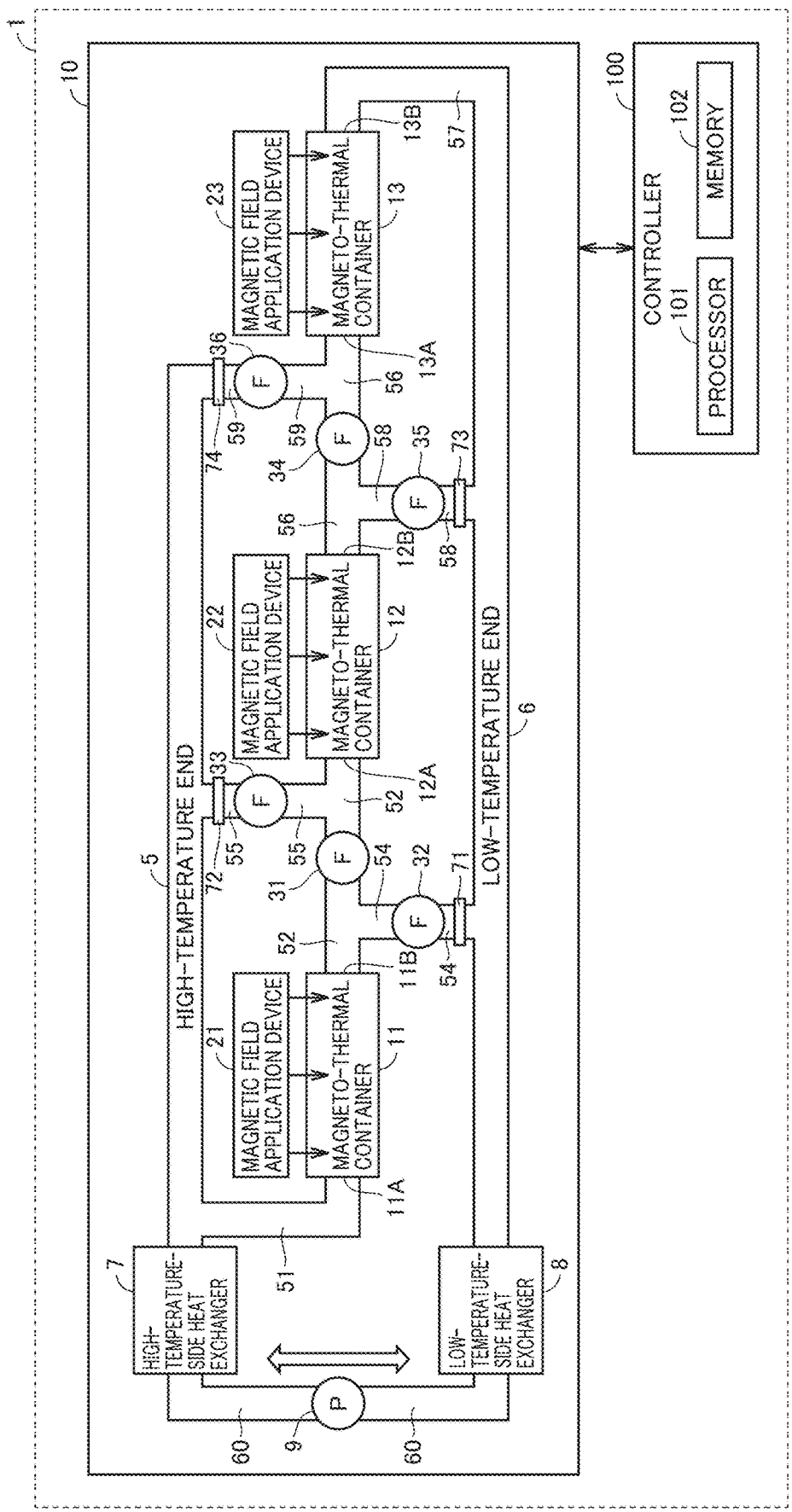
FIG. 24 is a diagram showing a configuration of a magnetic refrigerator according to a sixth embodiment.
Figure 25:
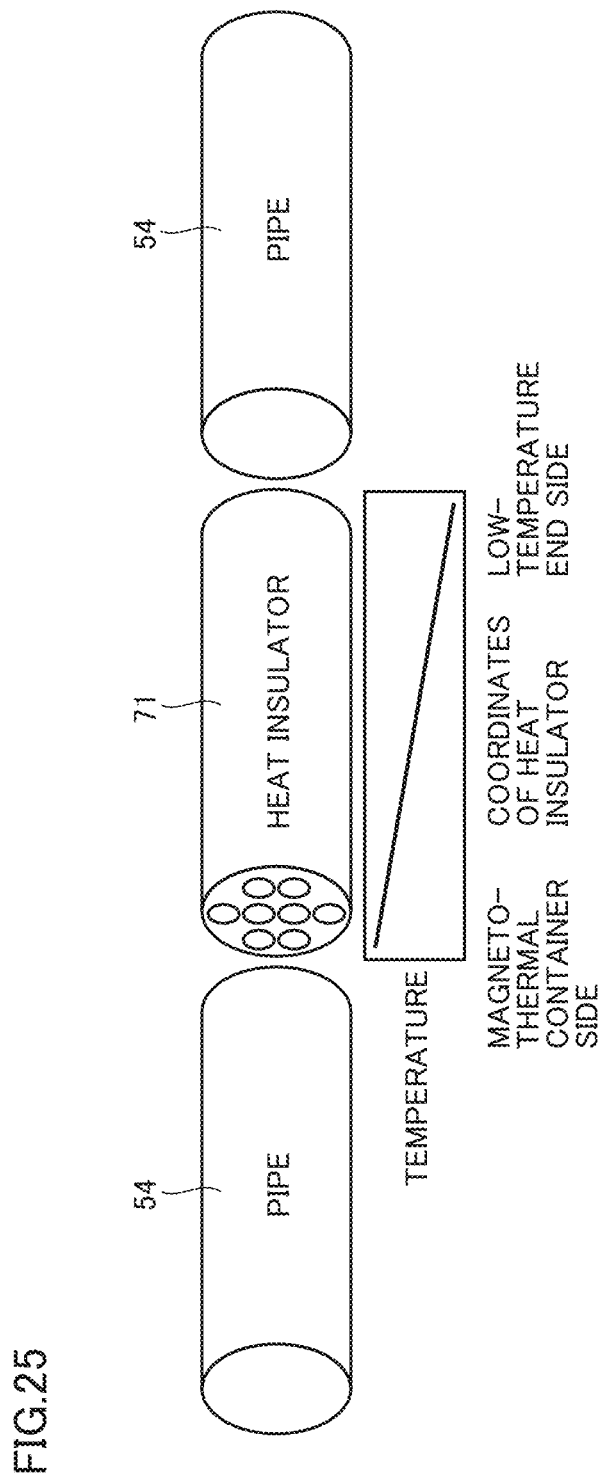
FIG. 25 is a diagram for illustrating a temperature distribution inside a heat insulator in the magnetic refrigerator according to the sixth embodiment.

Referring to FIGS. 24 and 25, a magnetic refrigerator 1 according to the sixth embodiment will be hereinafter described. The following describes only portions of magnetic refrigerator 1 according to the sixth embodiment that are different from those in magnetic refrigerator 1 according to each of the first to fifth embodiments.

FIG. 24 is a diagram showing a configuration of magnetic refrigerator 1 according to the sixth embodiment. As shown in FIG. 24, magnetic refrigerator 1 further includes heat insulators 71 to 74 in magnetic refrigeration circuit 10.

Heat insulator 71 is provided in pipe 54 that connects each of magneto-thermal containers 11 and 12 to low-temperature end 6. Specifically, heat insulator 71 is provided between valve 32 provided in pipe 54 and low-temperature end 6. Heat insulator 72 is provided in pipe 55 that connects each of magneto-thermal containers 11 and 12 to high-temperature end 5. Specifically, heat insulator 72 is provided between valve 33 provided in pipe 55 and high-temperature end 5. Heat insulator 73 is provided in pipe 58 that connects each of magneto-thermal containers 12 and 13 to low-temperature end 6. Specifically, heat insulator 73 is provided between valve 35 provided in pipe 58 and low-temperature end 6. Heat insulator 74 is provided in pipe 59 that connects each of magneto-thermal containers 12 and 13 to high-temperature end 5. Specifically, heat insulator 74 is provided between valve 36 provided in pipe 59 and high-temperature end 5.

FIG. 25 is a diagram for illustrating a temperature distribution inside heat insulator 71 in magnetic refrigerator 1 according to the sixth embodiment. Although FIG. 25 illustrates the configuration of heat insulator 71, other heat insulators 72 to 74 each also have the same configuration as that of heat insulator 71.

As shown in FIG. 25, heat insulators 71 to 74 each are configured, for example, of a microchannel structure. Heat insulators 71 to 74 each absorb heat from the heat transport medium to cause a temperature gradient between the magneto-thermal container side connected thereto and high-temperature end 5 or low-temperature end 6. The heat transport medium flows back and forth between the magneto-thermal container and high-temperature end 5 or low-temperature end 6 through the microchannels of heat insulators 71 to 74. However, since the heat of the heat transport medium is absorbed by heat insulators 71 to 74, the heat transport medium does not transport heat between the magneto-thermal container and high-temperature end 5 or low-temperature end 6. Heat insulators 71 to 74 each are made, for example, of a material such as plastic or paper having high specific heat and low thermal conductivity. Heat insulators 71 to 74 each may not be made of a uniform material. For example, in each of heat insulators 71 to 74, a portion on the magneto-thermal container side, the high-temperature end 5 side, or the low-temperature end 6 side may be made of metal having high thermal conductivity while an intermediate portion of each heat insulator may be made of a silicon material having a low thermal conductivity.

In this way, in magnetic refrigerator 1, heat insulators 71 to 74 are provided between the magneto-thermal container and high-temperature end 5 or low-temperature end 6, to thereby prevent the temperatures of magneto-thermal containers 11, 12, and 13 from being mixed with the temperature at high-temperature end 5 or low-temperature end 6, so that the thermal efficiency can be improved.

Seventh Embodiment

Figure 26:
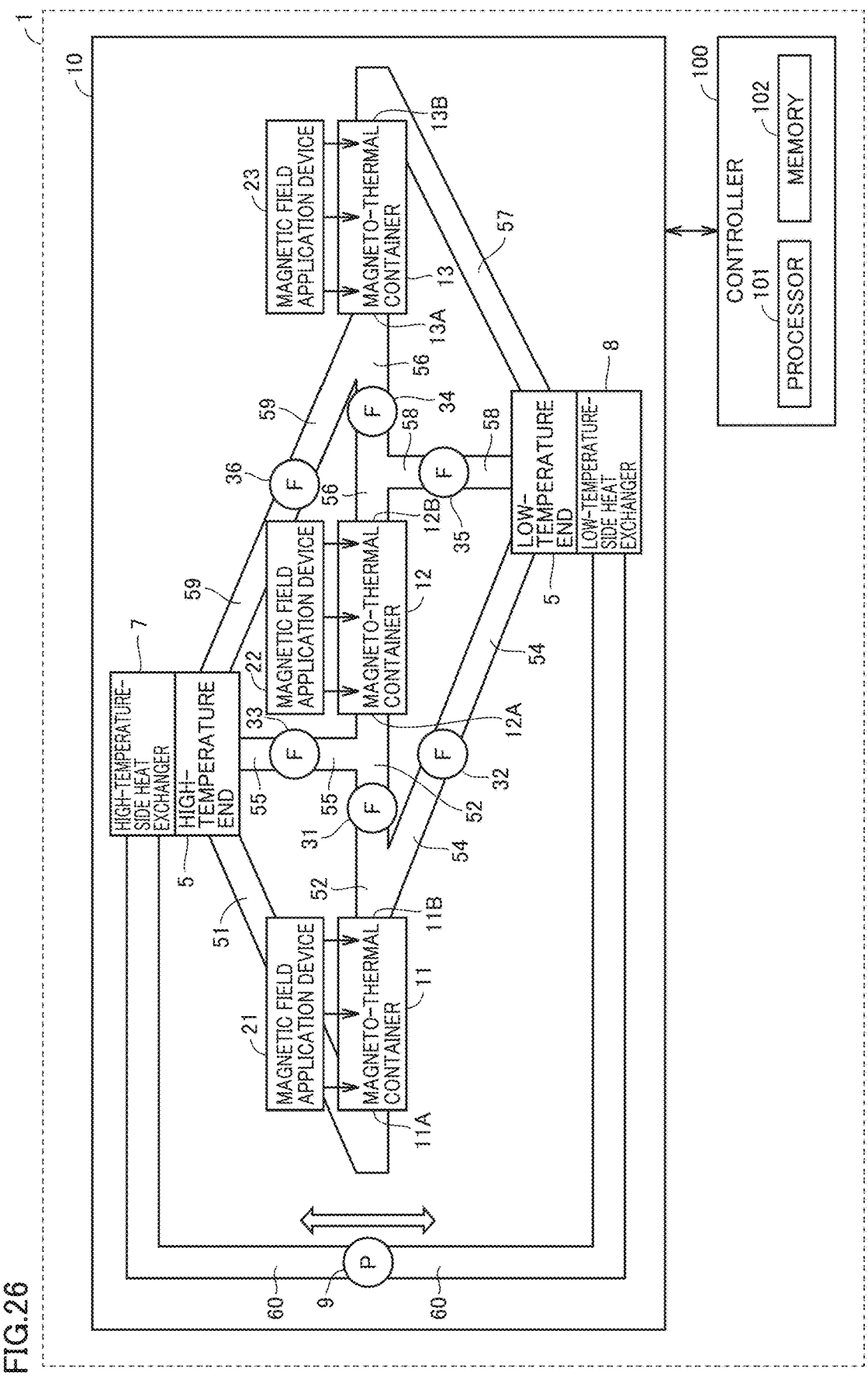
FIG. 26 is a diagram showing a configuration of a magnetic refrigerator according to a seventh embodiment.

Referring to FIG. 26, a magnetic refrigerator 1 according to the seventh embodiment will be hereinafter described. The following describes only portions of magnetic refrigerator 1 according to the seventh embodiment that are different from those in magnetic refrigerator 1 according to each of the first to sixth embodiments.

FIG. 26 is a diagram showing a configuration of magnetic refrigerator 1 according to the seventh embodiment. As shown in FIG. 26, magnetic refrigerator 1 includes magnetic refrigeration circuit 10 in which each of high-temperature end 5 and low-temperature end 6 is configured of a storage tank in which a heat transport medium is stored.

Thereby, in magnetic refrigerator 1, a relatively large amount of the heat transport medium can be stored inside high-temperature end 5 and low-temperature end 6 each configured as a storage tank, so that the heat storage properties at high-temperature end 5 and low-temperature end 6 can be enhanced. Therefore, magnetic refrigerator 1 can slow down the change in temperature at high-temperature end 5 resulting from the heat exchange by high-temperature-side heat exchanger 7 or the change in temperature at low-temperature end 6 resulting from the heat exchange by low-temperature-side heat exchanger 8, and thus, can stably perform the magnetic refrigeration operation.

Eighth Embodiment

Figure 27:
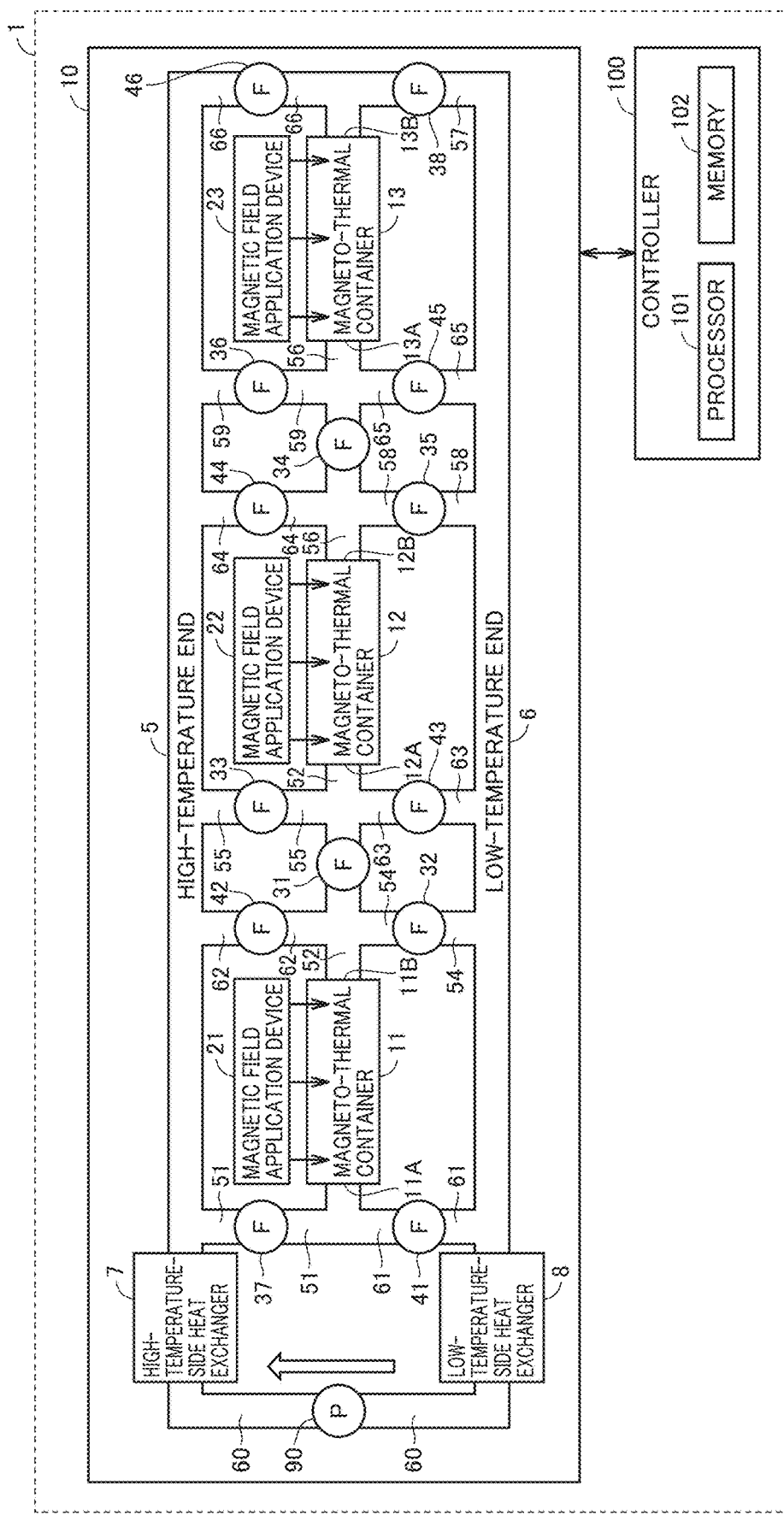
FIG. 27 is a diagram showing a configuration of a magnetic refrigerator according to an eighth embodiment.
Figure 28:
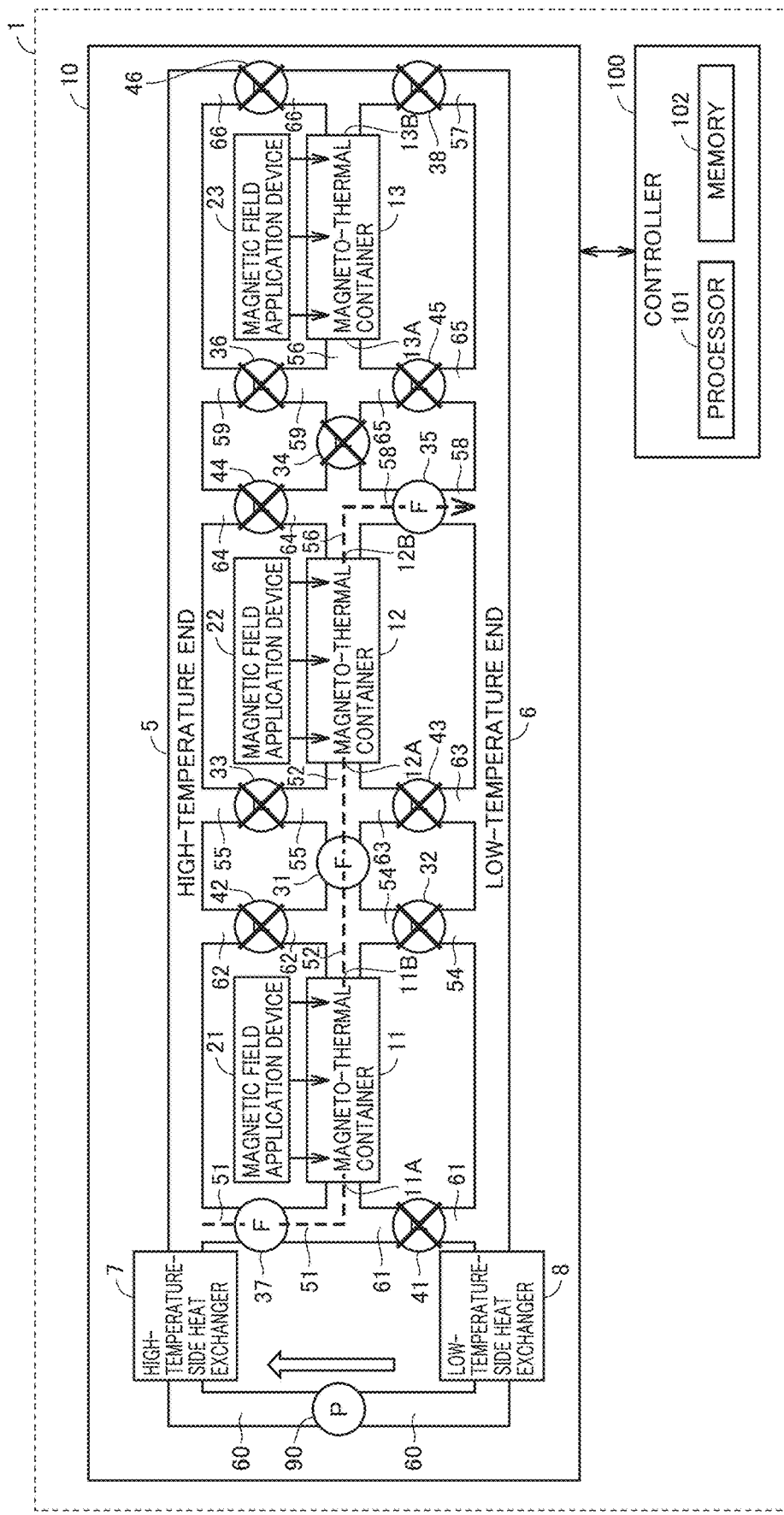
FIG. 28 is a diagram for illustrating switching of a transport path of a heat transport medium that is controlled to be set in a forward mode in the magnetic refrigerator according to the eighth embodiment.
Figure 29:
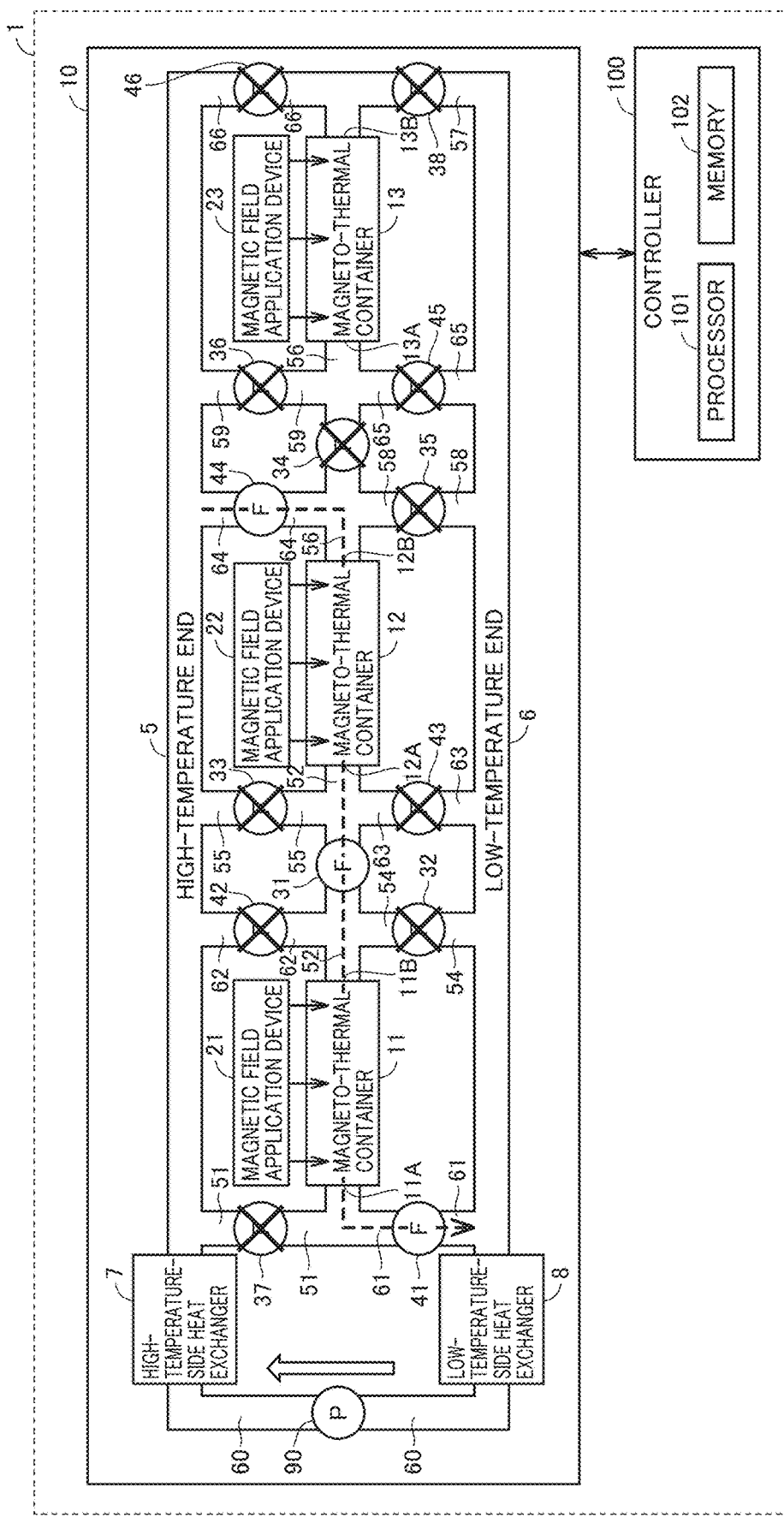
FIG. 29 is a diagram for illustrating switching of the transport path of the heat transport medium that is controlled to be set in a reverse mode in the magnetic refrigerator according to the eighth embodiment.

Referring to FIGS. 27 to 29, a magnetic refrigerator 1 according to the eighth embodiment will be hereinafter described. The following describes only portions of magnetic refrigerator 1 according to the eighth embodiment that are different from those in magnetic refrigerator 1 according to each of the first to seventh embodiments.

FIG. 27 is a diagram showing a configuration of magnetic refrigerator 1 according to the eighth embodiment. As shown in FIG. 27, magnetic refrigerator 1 further includes pipes 61 to 66, valves 41 to 46, and a pump 90 in magnetic refrigeration circuit 10.

Pipe 61 connects low-temperature end 6 and high-temperature-side port 11A of magneto-thermal container 11. Pipe 62 branches off from pipe 52 and is connected to high-temperature end 5. In other words, low-temperature-side port 111B of magneto-thermal container 11 and high-temperature-side port 12A of magneto-thermal container 12 are connected to high-temperature end 5 through pipes 52 and 62. Pipe 63 branches off from pipe 52 and is connected to low-temperature end 6. In other words, low-temperature-side port 11B of magneto-thermal container 11 and high-temperature-side port 12A of magneto-thermal container 12 are connected to low-temperature end 6 through pipes 52 and 63. Pipe 64 branches off from pipe 56 and is connected to high-temperature end 5. In other words, low-temperature-side port 12B of magneto-thermal container 12 and high-temperature-side port 13A of magneto-thermal container 13 are connected to high-temperature end 5 through pipes 56 and 64. Pipe 65 branches off from pipe 56 and is connected to low-temperature end 6. In other words, low-temperature-side port 12B of magneto-thermal container 12 and high-temperature-side port 13A of magneto-thermal container 13 are connected to low-temperature end 6 through pipes 56 and 65. Pipe 66 connects low-temperature-side port 13B of magneto-thermal container 13 and high-temperature end 5.

Valve 41 is provided in pipe 61 and switches pipe 61 between an opened state and a closed state under the control of controller 100. Valve 42 is provided in pipe 62 and switches pipe 62 between an opened state and a closed state under the control of controller 100. Valve 43 is provided in pipe 63 and switches pipe 63 between an opened state and a closed state under the control of controller 100. Valve 44 is provided in pipe 64 and switches pipe 64 between an opened state and a closed state under the control of controller 100. Valve 45 is provided in pipe 65 and switches pipe 65 between an opened state and a closed state under the control of controller 100. Valve 46 is provided in pipe 66 and switches pipe 66 between an opened state and a closed state under the control of controller 100.

Pump 90 is provided in pipe 60 connecting high-temperature-side heat exchanger 7 and low-temperature-side heat exchanger 8, and serves as a one-way pump to transport the heat transport medium from low-temperature end 6 to high-temperature end 5 in one direction.

FIG. 28 is a diagram for illustrating switching of a transport path of a heat transport medium that is controlled to be set in a forward mode in magnetic refrigerator 1 according to the eighth embodiment. As shown in FIG. 28, magnetic refrigerator 1 causes controller 100 to control the transport path to be set in a forward mode to thereby control each of valves 31, 35, and 37 to be in an opened state and also control each of valves 32, 33, 34, 36, 38, 41, 42, 43, 44, 45, and 46 to be in a closed state. Thereby, a transport path from magneto-thermal container 11 on the high temperature-side to magneto-thermal container 12 on the low temperature-side is provided between high-temperature end 5 and low-temperature end 6.

Thereby, the heat transport medium flows from high-temperature end 5 to low-temperature end 6 in the order of magneto-thermal container 11 on the high temperature-side and magneto-thermal container 12 on the low temperature-side. Thereafter, magnetic refrigerator 1 causes controller 100 to control pump 90 so as to return the heat transport medium accumulated in low-temperature end 6 from low-temperature end 6 to high-temperature end 5.

FIG. 29 is a diagram for illustrating switching of the transport path of the heat transport medium that is controlled to be set in a reverse mode in magnetic refrigerator 1 according to the eighth embodiment. As shown in FIG. 29, magnetic refrigerator 1 causes controller 100 to control the transport path to be set in a reverse mode to thereby control each of valves 31, 41, and 44 to be in an opened state and also control each of valves 32, 33, 34, 35, 36, 37, 38, 42, 43, 45, and 46 to be in a closed state. Thereby, a transport path from magneto-thermal container 12 on the low temperature-side to magneto-thermal container 11 on the high temperature-side is provided between high-temperature end 5 and low-temperature end 6.

Thereby, the heat transport medium flows from high-temperature end 5 to low-temperature end 6 in the order of magneto-thermal container 12 on the low temperature-side and magneto-thermal container 11 on the high temperature-side. Thereafter, magnetic refrigerator 1 causes controller 100 to control pump 90 so as to return the heat transport medium accumulated in low-temperature end 6 from low-temperature end 6 to high-temperature end 5.

Magnetic refrigerator 1 causes controller 100 to switch the transport path alternately between the forward mode and the reverse mode, to allow the heat transport medium to be transported back and forth through the plurality of magneto-thermal containers adjacent to each other.

In magnetic refrigerator 1, in the state in which not only magneto-thermal containers 11 and 12, but also magneto-thermal containers 12 and 13 are connected in series between high-temperature end 5 and low-temperature end 6 to control the heat transport medium to be transportable, the transport path may be switched alternately between the forward mode and the reverse mode. Further, in magnetic refrigerator 1, in the state in which magneto-thermal containers 11, 12, and 13 are connected in series between high-temperature end 5 and low-temperature end 6 to control the heat transport medium to be transportable, the transport path may be switched alternately between the forward mode and the reverse mode.

Summary

As shown in FIG. 1, magnetic refrigerator 1 according to the present disclosure includes: high-temperature-side heat exchanger 7; low-temperature-side heat exchanger 8; high-temperature end 5 from which heat on the high temperature-side is supplied to high-temperature-side heat exchanger 7; low-temperature end 6 from which heat on the low temperature-side is supplied to low-temperature-side heat exchanger 8; the plurality of magneto-thermal containers 11 and 12 each filled with a magnetocaloric material; the plurality of magnetic field application devices 21 and 22 each to apply a magnetic field to a corresponding one of the plurality of magneto-thermal containers 11 and 12; at least one pipe 51 to 55 to allow the heat transport medium to be transported between high-temperature end 5 and low-temperature end 6 through the plurality of magneto-thermal containers 11 and 12; pump 9 to transport the heat transport medium between high-temperature end 5 and low-temperature end 6 through at least one pipe 51 to 55; at least one valve 31 to 33 to switch at least one pipe 51 to 55 between an opened state and a closed state; and controller 100 to control at least one valve 31 to 33 to switch the transport path of the heat transport medium. Controller 100 is configured to control the at least one valve to switch the transport path between a first mode and a second mode. In the first mode, the plurality of magneto-thermal containers 11 and 12 are connected in series between high-temperature end 5 and low-temperature end 6 to allow transport of the heat transport medium. In the second mode, the plurality of magneto-thermal containers 11 and 12 are connected in parallel between high-temperature end 5 and low-temperature end 6 to allow transport of the heat transport medium.

By providing such a configuration, magnetic refrigerator 1 switches the transport path between the first mode in which the plurality of magneto-thermal containers 11 and 12 are connected in series between high-temperature end 5 and low-temperature end 6 to allow transport of the heat transport medium, and the second mode in which the plurality of magneto-thermal containers 11 and 12 are connected in parallel between high-temperature end 5 and low-temperature end 6 to allow transport of the heat transport medium, and thus can change the cross-sectional area and the length of the transport path of the heat transport medium flowing through the plurality of magneto-thermal containers 11 and 12. In other words, magnetic refrigerator 1 can cause controller 100 to control the transport path to be set in the first mode when the target temperature difference between high-temperature end 5 and low-temperature end 6 is large, and to control the transport path to be set in the second mode when the target temperature difference between high-temperature end 5 and low-temperature end 6 is small. Further, magnetic refrigerator 1 can control the transport path to be set in the second mode when the target amount of heat transport from low-temperature end 6 to high-temperature end 5 is large, and can control the transport path to be set in the first mode when the target amount of heat transport from low-temperature end 6 to high-temperature end 5 is small. Thereby, magnetic refrigerator 1 can perform an optimal magnetic refrigeration operation according to the environment, and thereby can improve the power efficiency.

As shown in FIG. 3, at least one valve 31 to 33 includes: at least one valve 31 to connect the plurality of magneto-thermal containers 11 and 12 in series between high-temperature end 5 and low-temperature end 6; and at least one valve 32, 33 to connect the plurality of magneto-thermal containers 11 and 12 in parallel between high-temperature end 5 and low-temperature end 6. In the first mode, controller 100 is configured to control at least one valve 31 to set at least one pipe 52 to be in an opened state, and control at least one valve 32, 33 to set at least one pipe 54, 55 to be in a closed state. In the second mode, controller 100 is configured to control at least one valve 32, 33 to set at least one pipe 54, 55 to be in an opened state, and control at least one valve 31 to set at least one pipe 52 to be in a closed state.

By providing such a configuration, magnetic refrigerator 1 controls at least one valve 31 to 33 and thereby can switch the transport path between the first mode and the second mode.

As shown in FIGS. 6 and 7, controller 100 is configured to switch the transport path in the order of the second mode, the first mode, and the second mode.

By providing such a configuration, magnetic refrigerator 1 can further raise the temperature at high-temperature end 5 and further lower the temperature at low-temperature end 6, and also can achieve the temperature difference between high-temperature end 5 and low-temperature end 6 in the first mode by the motive power of the pump in the second mode.

As shown in FIG. 4, controller 100 is configured to switch the transport path to be set in the third mode. In the third mode, the heat transport medium is transported between high-temperature end 5 and low-temperature end 6 through magneto-thermal container 11 among the plurality of magneto-thermal containers 11 and 12, and the heat transport medium is not transported between high-temperature end 5 and low-temperature end 6 through magneto-thermal container 12 among the plurality of magneto-thermal containers 11 and 12.

By providing such a configuration, magnetic refrigerator 1 controls the transport path to be set in the third mode to thereby allow the amount of heat transport from low-temperature end 6 to high-temperature end 5 to be equal to that in the first mode, and also allow the temperature difference between high-temperature end 5 and low-temperature end 6 to be equal to that in the second mode, so that the power efficiency can be further improved in the entire system including magnetic refrigerator 1.

The plurality of magnetic field application devices 21 and 22 include: magnetic field application device 21 to apply a magnetic field to magneto-thermal container 11; and magnetic field application device 22 to apply a magnetic field to magneto-thermal container 12. In the third mode, magnetic field application device 21 applies a magnetic field to magneto-thermal container 11, and magnetic field application device 22 does not apply a magnetic field to magneto-thermal container 12.

By providing such a configuration, magnetic refrigerator 1 stops the application of the magnetic field and the demagnetization by unused magnetic field application device 22 and thereby can reduce the power loss.

The plurality of magneto-thermal containers 11 and 12 include: magneto-thermal container 11 located on the high temperature-side in the first mode; and magneto-thermal container 12 located on the low temperature-side in the first mode. In the second mode, a one-way path through which the heat transport medium is transported back and forth between low-temperature end 6 and magneto-thermal container 11 is shorter than a path between low-temperature end 6 and magneto-thermal container 11. In the second mode, a one-way path through which the heat transport medium is transported back and forth between high-temperature end 5 and magneto-thermal container 12 is shorter than a path between high-temperature end 5 and magneto-thermal container 12.

By providing such a configuration, in magnetic refrigerator 1, even when the heat transport medium is transported back and forth between high-temperature end 5 and low-temperature end 6 through magneto-thermal container 11 by the magnetic refrigeration operation, it can be avoided that the heat transport medium flowing through magneto-thermal container 11 reaches low-temperature end 6 and thereby the temperature of magneto-thermal container 11 raises the temperature at low-temperature end 6. As a result, the heat loss can be reduced. Further, in magnetic refrigerator 1, even when the heat transport medium is transported back and forth between high-temperature end 5 and low-temperature end 6 through magneto-thermal container 12 by the magnetic refrigeration operation, it can be avoided that the heat transport medium flowing through magneto-thermal container 12 reaches high-temperature end 5 and thereby the temperature of magneto-thermal container 12 lowers the temperature at high-temperature end 5. As a result, the heat loss can be reduced.

As shown in FIG. 15, the number of types of the magnetocaloric material is more than one in accordance with an operating temperature at which performance of the magnetocaloric material is exhibited. As shown in FIG. 14, the plurality of magneto-thermal containers 11, 12, and 13 are filled with magnetocaloric materials from the high temperature-side to the low temperature-side in an order from a type of a magnetocaloric material having a higher operating temperature to a type of a magnetocaloric material having a lower operating temperature.

By providing such a configuration, magnetic refrigerator 1 can achieve different temperature distributions in the plurality of magneto-thermal containers 11, 12, and 13 in order from the high temperature-side to the low temperature-side.

As shown in FIG. 16 and FIG. 17, controller 100 is configured to determine, from among the plurality of magneto-thermal containers 11 and 12, magneto-thermal container 12 having a temperature corresponding to the operating temperature of the magnetocaloric material introduced therein, switch the transport path to allow the heat transport medium to be transported only through magneto-thermal container 12, and, switch the transport path to allow the heat transport medium to be transported through adjacent magneto-thermal containers 11 and 13 that are adjacent to the specific magneto-thermal container among the plurality of magneto-thermal containers, when a temperature of each of adjacent magneto-thermal containers 11 and 13 reaches the operating temperature of the magnetocaloric material filling each of adjacent magneto-thermal containers 11 and 13.

By providing such a configuration, magnetic refrigerator 1 can cause a temperature distribution having a relatively large temperature difference between high-temperature end 5 and low-temperature end 6 among magneto-thermal containers 11, 12, and 13.

As shown in FIGS. 18 to 20, controller 100 is configured to determine, from among the plurality of magneto-thermal containers 15, at least one magneto-thermal container A filled with the magnetocaloric material having an operating temperature corresponding to a target temperature at high-temperature end 5 and a target temperature at low-temperature end 6 (S2), determine, from among the plurality of magneto-thermal containers 15, at least one magneto-thermal container B having an actual temperature equal to an operating temperature of the magnetocaloric material (S3), switch the transport path to allow the heat transport medium to be transported only through at least one magneto-thermal container B (S4), determine whether or not at least one magneto-thermal container B is the same as at least one magneto-thermal container A (S5), and determines again, from among the plurality of magneto-thermal containers 15, at least one magneto-thermal container B having an actual temperature equal to the operating temperature of the magnetocaloric material (S3), when at least one magneto-thermal container B is not the same as at least one magneto-thermal container A (NO in S5).

By providing such a configuration, magnetic refrigerator 1 allows the actual temperature inside target magneto-thermal container A and the operating temperature of the magnetocaloric material filling magneto-thermal container A to be equal to each other, so that the performance of the magnetocaloric material filling magneto-thermal container A can be exhibited.

As shown in FIGS. 21 and 22, at least one valve includes: valve 38 provided in a path between low-temperature end 6 and magneto-thermal container 13 among the plurality of magneto-thermal containers 11, 12, and 13, magneto-thermal container 13 being located on the lowest temperature-side in the first mode; and valves 34 and 36 adjacent to magneto-thermal container 13. Controller 100 is configured to control valve 38 to be in a closed state when adjacent valves 34 and 36 each are in a closed state, and control valve 38 to be in an opened state when adjacent valves 34 and 36 each are in an opened state.

By providing such a configuration, magnetic refrigerator 1 can prevent unnecessary mixing of heat, which is caused by the heat transport medium flowing into low-temperature end 6 from magneto-thermal container 13 that does not perform a magnetic refrigeration operation.

As shown in FIGS. 21 and 22, at least one valve includes: valve 37 provided in a path between high-temperature end 5 and magneto-thermal container 11 among the plurality of magneto-thermal containers 11, 12, and 13, magneto-thermal container 11 being located on the highest temperature-side in the first mode; and valves 31 and 32 adjacent to magneto-thermal container 11. Controller 100 is configured to control valve 37 to be in a closed state when adjacent valves 31 and 32 each are in a closed state, and control valve 37 to be in an opened state when adjacent valves 31 and 32 each are in an opened state.

By providing such a configuration, magnetic refrigerator 1 can prevent unnecessary mixing of heat, which is caused by the heat transport medium flowing into high-temperature end 5 from magneto-thermal container 11 that does not perform a magnetic refrigeration operation.

As shown in FIG. 23, each of high-temperature end 5 and low-temperature end 6 is connected to a side surface of each of the plurality of magneto-thermal containers 11 and 12 through at least one pipe 54, 55.

By providing such a configuration, in magnetic refrigerator 1, magnetic refrigeration circuit 10 can be simply configured, and the efficiency of heat transport between magneto-thermal containers 11 and 12 can be improved.

As shown in FIGS. 24 and 25, magnetic refrigerator 1 further includes heat insulators 71 to 74 through which the heat transport medium passes, heat insulators 71 to 74 each being provided between: the plurality of magneto-thermal containers 11, 12, and 13; and high-temperature end 5 and low-temperature end 6.

By providing such a configuration, magnetic refrigerator 1 can prevent the temperatures of magneto-thermal containers 11, 12, and 13 from being mixed with the temperature at high-temperature end 5 or low-temperature end 6, so that the thermal efficiency can be improved.

As shown in FIG. 26, high-temperature end 5 and low-temperature end 6 each are a storage tank in which the heat transport medium is stored.

By providing such a configuration, in magnetic refrigerator 1, a relatively large amount of heat transport medium can be stored inside high-temperature end 5 and low-temperature end 6 each configured as a storage tank, so that the heat storage properties at high-temperature end 5 and low-temperature end 6 can be enhanced. Therefore, magnetic refrigerator 1 can slow down the change in temperature at high-temperature end 5 resulting from the heat exchange by high-temperature-side heat exchanger 7 or the change in temperature at low-temperature end 6 resulting from the heat exchange by low-temperature-side heat exchanger 8, and thus, can stably perform the magnetic refrigeration operation.

As shown in FIGS. 27 to 29, pump 90 is a one-way pump to transport the heat transport medium from low-temperature end 6 to high-temperature end 5. The plurality of magneto-thermal containers 11, 12, and 13 include magneto-thermal container 11 located on the high temperature-side in the first mode and magneto-thermal container 12 located on the low temperature-side in the first mode. Controller 100 is configured to switch the transport path to allow the heat transport medium to be transported from high-temperature end 5 to low-temperature end 6 in an order of magneto-thermal containers 11 and 12, and subsequently switch the transport path to allow the heat transport medium to be transported from high-temperature end 5 to low-temperature end 6 in an order of magneto-thermal containers 12 and 11.

By providing such a configuration, even when the one-way pump is used, magnetic refrigerator 1 controls the valve to switch the transport path to thereby allow the heat transport medium to be transported back and forth through the plurality of adjacent magneto-thermal containers.

Note that magnetic refrigerator 1 according to each of the above-described first to eighth embodiments may have respective configurations and functions individually or in combination.

It should be understood that the embodiments disclosed herein are illustrative and non-restrictive in every respect. The scope of the present disclosure is defined by the scope of the claims, rather than the description of the embodiments provided above, and is intended to include any modifications within the meaning and scope equivalent to the scope of the claims.

REFERENCE SIGNS LIST 1 magnetic refrigerator, 5 high-temperature end, 6 low-temperature end, 7 high-temperature-side heat exchanger, 8 low-temperature-side heat exchanger, 9, 90 pump, 10 magnetic refrigeration circuit, 11, 12, 13, 15 magneto-thermal container, 21, 22, 23 magnetic field application device, 11A, 12A, 13A high-temperature-side port, 11B, 12B, 13B low-temperature-side port, 31, 32, 33, 34, 35, 36, 37, 38, 41, 42, 43, 44, 45, 46 valve, 51, 52, 53, 54, 55, 56, 57, 58, 59, 60, 61, 62, 63, 64, 65, 66 pipe, 71, 72, 73, 74 heat insulator, 100 controller, 101 processor, 102 memory.

The invention claimed is:

1. A magnetic refrigerator comprising:
a high-temperature-side heat exchanger;
a low-temperature-side heat exchanger;
a high-temperature end from which heat on a high temperature-side is supplied to the high-temperature-side heat exchanger;
a low-temperature end is connected to the low-temperature-side heat exchanger on a low temperature-side;
a plurality of magneto-thermal containers each filled with a magnetocaloric material;
a plurality of magnetic field application devices each including a permanent magnet or an electromagnet to apply a magnetic field to a corresponding one of the plurality of magneto-thermal containers;
at least one pipe through which a heat transport medium is transported through the plurality of magneto-thermal containers between the high-temperature end and the low-temperature end;

a pump to transport the heat transport medium through the at least one pipe between the high-temperature end and the low-temperature end;

at least one valve to switch the at least one pipe between an opened state and a closed state; and a controller to control the at least one valve to switch a transport path of the heat transport medium, wherein the controller is configured to control the at least one valve to switch the transport path between a first mode and a second mode, in the first mode, the plurality of magneto-thermal containers are connected in series between the high-temperature end and the low-temperature end to allow transport of the heat transport medium, and in the second mode, the plurality of magneto-thermal containers are connected in parallel between the high-temperature end and the low-temperature end to allow transport of the heat transport medium.

2. The magnetic refrigerator according to claim 1, wherein the at least one valve includes at least one first valve to connect the plurality of magneto-thermal containers in series between the high-temperature end and the low-temperature end, and at least one second valve to connect the plurality of magneto-thermal containers in parallel between the high-temperature end and the low-temperature end, and in the first mode, the controller is configured to control the at least one first valve to set the at least one pipe to be in an opened state, and control the at least one second valve to set the at least one pipe to be in a closed state, and in the second mode, the controller is configured to control the at least one second valve to set the at least one pipe to be in an opened state, and control the at least one first valve to set the at least one pipe to be in a closed state.

3. The magnetic refrigerator according to claim 1, wherein the controller is configured to switch the transport path in an order of the second mode, the first mode, and the second mode.

4. The magnetic refrigerator according to claim 1, wherein the controller is configured to switch the transport path to be set in a third mode, and in the third mode, the heat transport medium is transported between the high-temperature end and the low-temperature end through a first magneto-thermal container among the plurality of magneto-thermal containers, and the heat transport medium is not transported between the high-temperature end and the low-temperature end through a second magneto-thermal container among the plurality of magneto-thermal containers.

5. The magnetic refrigerator according to claim 4, wherein the plurality of magnetic field application devices include a first magnetic field application device to apply a magnetic field to the first magneto-thermal container, and a second magnetic field application device to apply a magnetic field to the second magneto-thermal container, and in the third mode, the first magnetic field application device applies a magnetic field to the first magneto-thermal container, and the second magnetic field application device does not apply a magnetic field to the second magneto-thermal container.

6. The magnetic refrigerator according to claim 1, wherein the plurality of magneto-thermal containers include a high-temperature-side magneto-thermal container located on the high temperature-side in the first mode and a low-temperature-side magneto-thermal container located on the low temperature-side in the first mode, in the second mode, a one-way path through which the heat transport medium is transported back and forth between the low-temperature end and the high-temperature-side magneto-thermal container is shorter than a path between the low-temperature end and the high-temperature-side magneto-thermal container, and in the second mode, a one-way path through which the heat transport medium is transported back and forth between the high-temperature end and the low-temperature-side magneto-thermal container is shorter than a path between the high-temperature end and the low-temperature-side magneto-thermal container.

7. The magnetic refrigerator according to claim 1, wherein a number of types of the magnetocaloric material is more than one in accordance with an operating temperature at which performance of the magnetocaloric material is exhibited, and the plurality of magneto-thermal containers are filled with the magnetocaloric materials from the high temperature-side to the low temperature-side in an order from a type of the magnetocaloric material having a higher operating temperature to a type of the magnetocaloric material having a lower operating temperature.

8. The magnetic refrigerator according to claim 7, wherein the controller is configured to determine, from among the plurality of magneto-thermal containers, a specific magneto-thermal container having a temperature corresponding to an operating temperature of the magnetocaloric material filling the specific magneto-thermal container, switch the transport path to allow the heat transport medium to be transported only through the specific magneto-thermal container, and switch the transport path to allow the heat transport medium to be transported through an adjacent magneto-thermal container adjacent to the specific magneto-thermal container among the plurality of magneto-thermal containers, when a temperature of the adjacent magneto-thermal container reaches an operating temperature of the magnetocaloric material filling the adjacent magneto-thermal container.

9. The magnetic refrigerator according to claim 7, wherein the controller is configured to determine, from among the plurality of magneto-thermal containers, at least one target magneto-thermal container filled with the magnetocaloric material having an operating temperature range corresponding to a target temperature at the high-temperature end and a target temperature at the low-temperature end, determine, from among the plurality of magneto-thermal containers, at least one temporary magneto-thermal container having an actual temperature equal to an operating temperature of the magnetocaloric material, switch the transport path to allow the heat transport medium to be transported only through the at least one temporary magneto-thermal container,
determine whether or not the at least one temporary magneto-thermal container is the same as the at least one target magneto-thermal container, and
determine again, from among the plurality of magneto-thermal containers, the at least one temporary magneto-thermal container having an actual temperature equal to the operating temperature of the magnetocaloric material, when the at least one temporary magneto-thermal container is not the same as the at least one target magneto-thermal container.

10. The magnetic refrigerator according to claim 1, wherein
the at least one valve includes
a low-temperature-side valve provided in a path between the low-temperature end and a low-temperature-side magneto-thermal container among the plurality of magneto-thermal containers, the low-temperature-side magneto-thermal container being located on a lowest temperature side in the first mode, and
an adjacent valve adjacent to the low-temperature-side magneto-thermal container, and
the controller is configured to
control the low-temperature-side valve to be in a closed state when the adjacent valve adjacent to the low-temperature-side magneto-thermal container is in a closed state, and
control the low-temperature-side valve to be in an opened state when the adjacent valve adjacent to the low-temperature-side magneto-thermal container is in an opened state.

11. The magnetic refrigerator according to claim 1, wherein
the at least one valve includes
a high-temperature-side valve provided in a path between the high-temperature end and a high-temperature-side magneto-thermal container among the plurality of magneto-thermal containers, the high-temperature-side magneto-thermal container being located on a highest temperature side in the first mode, and
an adjacent valve adjacent to the high-temperature-side magneto-thermal container, and
the controller is configured to
control the high-temperature-side valve to be in a closed state when the adjacent valve adjacent to the high-temperature-side magneto-thermal container is in a closed state, and
control the high-temperature-side valve to be in an opened state when the adjacent valve adjacent to the high-temperature-side magneto-thermal container is in an opened state.

12. The magnetic refrigerator according to claim 1, wherein each of the high-temperature end and the low-temperature end is connected to a side surface of each of the plurality of magneto-thermal containers through the at least one pipe.

13. The magnetic refrigerator according to claim 1, further comprising a heat insulator through which the heat transport medium passes, the heat insulator being provided between: the plurality of magneto-thermal containers; and the high-temperature end and the low-temperature end.

14. The magnetic refrigerator according to claim 1, wherein the high-temperature end and the low-temperature end each are a storage tank in which the heat transport medium is stored.

15. The magnetic refrigerator according to claim 1, wherein
the pump is a one-way pump to transport the heat transport medium from the low-temperature end to the high-temperature end,
the plurality of magneto-thermal containers include
a high-temperature-side magneto-thermal container located on the high temperature-side in the first mode, and
a low-temperature-side magneto-thermal container located on the low temperature-side in the first mode, and
the controller is configured to
switch the transport path to allow the heat transport medium to be transported from the high-temperature end to the low-temperature end in an order of the high-temperature-side magneto-thermal container and the low-temperature-side magneto-thermal container, and
subsequently switch the transport path to allow the heat transport medium to be transported from the high-temperature end to the low-temperature end in an order of the low-temperature-side magneto-thermal container and the high-temperature-side magneto-thermal container.

16. A magnetic refrigerator comprising:
a high-temperature-side heat exchanger;
a low-temperature-side heat exchanger;
a high-temperature end from which heat on a high temperature-side is supplied to the high-temperature-side heat exchanger;
a low-temperature end is connected to the low-temperature-side heat exchanger on a low temperature-side;
a plurality of magneto-thermal containers each filled with a magnetocaloric material;
a plurality of magnetic field application devices each to apply a magnetic field to a corresponding one of the plurality of magneto-thermal containers;
at least one pipe through which a heat transport medium is transported through the plurality of magneto-thermal containers between the high-temperature end and the low-temperature end;
a pump to transport the heat transport medium through the at least one pipe between the high-temperature end and the low-temperature end;
at least one valve to switch the at least one pipe between an opened state and a closed state; and
a controller to control the at least one valve to switch a transport path of the heat transport medium, wherein
the controller is configured to control the at least one valve to switch the transport path between a first mode and a second mode,
in the first mode, the plurality of magneto-thermal containers are connected in series between the high-temperature end and the low-temperature end to allow transport of the heat transport medium, and
in the second mode, the plurality of magneto-thermal containers are connected in parallel between the high-temperature end and the low-temperature end to allow transport of the heat transport medium.

* * * * *